US009773099B2

(12) United States Patent
Odom et al.

(10) Patent No.: US 9,773,099 B2
(45) Date of Patent: *Sep. 26, 2017

(54) SYSTEM, METHOD, AND DEVICE FOR DELIVERING COMMUNICATIONS AND STORING AND DELIVERING DATA

(71) Applicants: Wayne Odom, Tucson, AZ (US); Karolyn Gee, Tucson, AZ (US)

(72) Inventors: Wayne Odom, Tucson, AZ (US); Karolyn Gee, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/489,275

(22) Filed: Apr. 17, 2017

(65) Prior Publication Data
US 2017/0220781 A1 Aug. 3, 2017

Related U.S. Application Data

(63) Continuation-in-part of application No. 15/418,399, filed on Jan. 27, 2017, now Pat. No. 9,628,473, which
(Continued)

(51) Int. Cl.
G06F 21/12 (2013.01)
G06F 21/62 (2013.01)
G06F 17/30 (2006.01)
G11B 20/00 (2006.01)
G06F 9/50 (2006.01)

(52) U.S. Cl.
CPC .......... *G06F 21/121* (2013.01); *G06F 9/5016* (2013.01); *G06F 9/5038* (2013.01); *G06F 17/30091* (2013.01); *G06F 17/30171* (2013.01); *G06F 17/30433* (2013.01);
(Continued)

(58) Field of Classification Search
CPC .... G06F 21/121; G06F 9/5016; G06F 9/5038; G06F 17/30091; G06F 17/30171
See application file for complete search history.

(56) References Cited

U.S. PATENT DOCUMENTS 6,356,941 B1 * 3/2002 Cohen ................. G06F 21/6272
709/219
7,484,245 B1 * 1/2009 Friedman ................ G06F 21/52
380/283

(Continued)

OTHER PUBLICATIONS

You, Fu Cheng, "Application of Mobile Agent and Trusted Third Party on Digital Copyright Protecting in E-Commerce", Dec. 2008, 2008 International Symposium on Computer Science and Computational Technology, pp. 800-804.*

Primary Examiner — Kenneth Chang
(74) Attorney, Agent, or Firm — Robert Ryan Morishita; Morishita Law Firm, LLC

(57) ABSTRACT

A system, method, and device includes a platform data storage that stores a wrap that secures an executable controller and executable sensors. The wrap is verified, optionally through a downloaded authentication driver. After verifying the wrap, the wrap is opened and a sister of the executable controller is installed into the platform memory to cooperate with the executable controller. Additionally or alternatively, the authentication driver may cooperate with the executable controller. The executable controller allows the platform processor to access data secured in a vault and/or verify the platform to create a connection to an application server.

27 Claims, 30 Drawing Sheets

Related U.S. Application Data is a continuation-in-part of application No. 15/194,551, filed on Jun. 27, 2016, now Pat. No. 9,590,981, which is a continuation-in-part of application No. 14/720,925, filed on May 25, 2015, now Pat. No. 9,378,339, which is a continuation-in-part of application No. 14/493,284, filed on Sep. 22, 2014, now Pat. No. 9,043,934, which is a continuation-in-part of application No. 14/216,438, filed on Mar. 17, 2014, now Pat. No. 8,844,054, which is a continuation-in-part of application No. 14/065,402, filed on Oct. 28, 2013, now Pat. No. 8,677,510, which is a continuation-in-part of application No. 13/898,460, filed on May 20, 2013, now Pat. No. 8,572,720, which is a continuation-in-part of application No. 13/708,661, filed on Dec. 7, 2012, now Pat. No. 8,448,236, which is a continuation-in-part of application No. 13/441,675, filed on Apr. 6, 2012, now Pat. No. 8,375,455.

(52) U.S. Cl.
CPC .... *G06F 17/30893* (2013.01); *G06F 21/6281* (2013.01); *G11B 20/00731* (2013.01); *G06Q 2220/10* (2013.01)

(56) References Cited

U.S. PATENT DOCUMENTS

| | | | | |
|---|---|---|---|---|
| 7,698,555 | B2* | 4/2010 | Jiang | H04L 63/10 |
| | | | | 713/168 |
| 8,127,345 | B2* | 2/2012 | Gregg | G06F 21/335 |
| | | | | 726/4 |
| 8,468,591 | B2* | 6/2013 | Silverstone | G06F 21/53 |
| | | | | 713/164 |
| 2003/0037237 | A1* | 2/2003 | Abgrall | G06F 21/53 |
| | | | | 713/166 |
| 2005/0138406 | A1* | 6/2005 | Cox | G06F 21/105 |
| | | | | 726/26 |
| 2009/0037515 | A1* | 2/2009 | Zapata | H04L 43/0811 |
| | | | | 709/202 |
| 2011/0085667 | A1* | 4/2011 | Berrios | G06F 21/445 |
| | | | | 380/282 |
| 2011/0215921 | A1* | 9/2011 | Ben Ayed | G08B 1/08 |
| | | | | 340/539.11 |
| 2014/0338004 | A1* | 11/2014 | Camiel | G06F 21/62 |
| | | | | 726/30 |

* cited by examiner

SYSTEM, METHOD, AND DEVICE FOR DELIVERING COMMUNICATIONS AND STORING AND DELIVERING DATA

RELATED APPLICATION DATA

The present application is a continuation-in-part of U.S. patent application Ser. No. 15/418,399, entitled "System, Method, and Device for Delivering Communications and Storing and Delivering Data," filed Jan. 27, 2017, which, in turn, was a continuation-in-part of U.S. patent application Ser. No. 15/194,551, entitled "System, Method, and Device for Delivering Communications and Storing and Delivering Data," filed Jun. 27, 2016, which, in turn, was a continuation-in-part of U.S. patent application Ser. No. 14/720,925, now U.S. Pat. No. 9,378,339, entitled "System, Method, and Device for Delivering Communications and Storing and Delivering Data," filed May 25, 2015, which, in turn, was a continuation-in-part of U.S. patent application Ser. No. 14/493,284, now U.S. Pat. No. 9,043,934, entitled "System, Method, and Device for Delivering Communications and Storing and Delivering Data," filed Sep. 22, 2014, which, in turn, was a continuation-in-part of U.S. patent application Ser. No. 14/216,438, entitled "System, Method, and Device for Communicating and Storing and Delivering Data," now U.S. Pat. No. 8,844,054, filed Mar. 17, 2014, which, in turn, was a continuation-in-part of U.S. patent application Ser. No. 14/065,402, entitled "System, Method, and Device for Communicating and Storing and Delivering Data," now U.S. Pat. No. 8,677,510, filed Oct. 28, 2013, which, in turn, was a continuation-in-part of U.S. patent application Ser. No. 13/898,460, now U.S. Pat. No. 8,572,720, entitled "System, Method, and Device for Communicating and Storing and Delivering Data," filed May 20, 2013 which, in turn, was a continuation-in-part of U.S. patent application Ser. No. 13/708,661, now U.S. Pat. No. 8,448,236, entitled "System, Method, and Device for Storing and Delivering Data, filed Dec. 7, 2012, which in turn, was a continuation-in-part of U.S. patent application Ser. No. 13/441,675, now U.S. Pat. No. 8,375,455, entitled "System, Method, and Device for Storing and Delivering Data," filed Apr. 6, 2012.

FIELD OF THE INVENTION

The present invention relates to communications as well as data storage and delivery. More specifically, the present invention relates to a method, system, and device for storing and delivering data and communications to a platform such as a computer, game console, cellular telephone, PDA, tablet device, or the like from a server.

BACKGROUND OF THE INVENTION

Data may be stored in many different forms and delivered to many different types of platforms. For example, movies, music, and games may be stored on a CD (or compact disc) or DVD (or digital versatile disc), which can be read by a personal computer, game console, or disc player for delivery to the user. The primary drawbacks of a physical format such as a CD or DVD are the portability of the disc, the portability of the player, the potential loss of the data if the disc is physically damaged, and the inability to control copying and piracy of the data. More recently, electronic formats have enabled movies, music, books, photographs, and games to be downloaded or streamed via the Internet or local area network ("LAN") to a device connected to a server that stores the data, such as media content. These electronic formats are usually more portable than physical media and the players used to view such electronic formats, such as PDAs (or personal digital assistants) and cellular telephones, are typically more portable than a disc player. However, electronic formats are generally very easy to copy, e.g. pirate.

Digital rights management ("DRM") schemes have been developed to control piracy. A common DRM measure is to only permit data to play on a registered device. For example, some data providers require the user to install proprietary software on the user's computer to download data then only allow the user to transfer the downloaded content to attached devices that are "registered" by the software. Since this data is only playable on registered devices (even if the user has a legitimate, paid-for copy of the data), the data will not play on, for example, a new device or a new computer until the user changes the settings on the user's account. Ultimately, however, this form of DRM is not closely tailored to the problem of copying and piracy because the user with a legitimate, paid-for copy of the data may be unduly burdened by the requirement to register each device to play the data while the user who wishes to pirate a copy of the data can easily find utilities online to "crack" the DRM and pirate the data, such as media content.

SUMMARY OF THE INVENTION

The present invention includes a system for storing and delivering data. According to an optional embodiment, the present system includes a platform, which could be software, hardware, or firmware. In an optional embodiment in which the platform is hardware, such as a general purpose computer, specific use computer, cell phone, handheld device, or the like, the platform has a platform processor. Optionally, the platform processor is physically associated with memory, such as random access memory ("RAM").

In one optional embodiment, the present invention includes a system with a hardware modified permission access device (or a plurality of modified permission access devices) in communication with an application server. The modified permission access device may take any physical form. In one optional embodiment, the modified permission access device includes a modified permission access device processor physically associated, and in communication, with memory and a data storage physically separate from the memory and readable by the modified permission access device processor. The data storage stores, in non-volatile storage, an executable sensor and a vault that secures data. In an optional embodiment, the data secured by the wrap includes a permissions file defining transaction requests permitted by the modified permission access device. The data storage also stores, in non-volatile storage, at least one wrap. In an optional embodiment, the data storage stores an executable wrap that secures an executable controller and an executable detector. Each wrap is an executable program, or group of executable programs, that includes program instructions to: (a) contact a remote server separate from the modified permission access device to transmit an executable authentication driver to the modified permission access device; (b) authenticate the modified permission access device using the authentication driver; and (c) only when the modified permission access device is authenticated by the authentication driver, install the executable sensor in the memory. The data is secured in the vault by the authentication driver in the memory cooperating with the executable controller in the data storage to automatically and continuously permit or deny access by the modified permission access device processor to secured data in the vault. In this manner, the data protected by the vault are only accessible to the modified permission access device processor when both the authentication driver in the memory and the executable controller in the data storage are accessible to the modified permission access device processor. Put another way, if either the executable controller in the data storage or the authentication driver in the memory is missing, the data protected by the vault cannot be accessed.

In an optional embodiment, the executable sensor monitors at least one of the modified permission access device and the data storage for anomalies and, upon detecting an anomaly, denies access to the data secured by the wrap. In an optional embodiment, the executable sensor denies access to the data secured by the wrap by deleting the authentication driver from the memory upon detecting an anomaly. In an optional embodiment, the modified permission access device includes at least one data port and a power supply that supplies power to the modified permission access device including the data storage. Moreover, the modified permission access device operates in an operating environment controlled by an operating system that allocates system resources of the modified permission access device. In one such optional embodiment, the anomalies monitored by the executable sensor may include: a data port open on the modified permission access device, the amount of power delivered to the data storage by the modified permission access device, access to system resources used by the executable controller, access to system resources used by the authentication driver, and access to system resources used by the wrap.

The executable detector confirms the integrity of the data secured by said vault. In one optional embodiment, the integrity is confirmed by the executable detector by comparing at least a portion of the vault data to confirmation data stored at an application server (described in greater detail below). In the event that the integrity of the data is unconfirmed, the executable detector renders the executable controller inoperable for any unconfirmed data.

Optionally, the secure data within the vault may only be accessible on a modified permission access device uniquely identified with the wrap. For example, in one optional embodiment, the authentication driver and/or the wrap stores a unique identifier of the modified permission access device in the executable controller such that the secured data are accessible only to a modified permission access device processor associated with a modified permission access device with a unique identifier matching the unique identifier stored in the authentication driver and/or the wrap. In a further optional embodiment, the secure data within the vault includes instructions for instructions for the modified permission access device to transmit a transaction request from the modified permission access device to an application server. For example, the instructions may include the address of the application server which is hidden unless and until the contents of the wrap can be accessed by the modified permission access device.

In an optional embodiment, the modified permission access device communicates with an application server and an authentication server. The application server is in communication with a data server. In an optional embodiment, the modified permission access device transmits to the application server (and/or the application server receives from the modified permission access device) a transaction request. The transaction request may be a request for any type of transaction, including, but not limited to, such examples as access to data, download of data, streaming of data, communication of data, a financial or account transaction (including payments, withdrawals, deposits, wagers, or the like), or any other form of transaction. The application server authenticates the modified permission access device. In one optional embodiment, The modified permission access device is authenticated using a unique identifier assigned to the modified permission access device, a unique identifier stored inside a vault, an authentication driver (as described in greater detail above), or any other authentication procedure. After the modified permission access device is authenticated, the application server generates a transaction code.

In an optional embodiment, an application server port identified by an application server port address is opened after authentication. The application server reconnects to the authenticated modified permission access device via the application server port at the application server port address and communicates with the authenticated modified permission access device via the application server port.

In a further optional embodiment, the application server communicates with an authorization server in communication with the application server. The authorization server has an authorization server processor to receive a transaction code from the application server and authenticate the transaction code. The authorization server records the receipt of the transaction code from the application server in a database of database records. In an optional embodiment, the transaction code is recorded with a transaction authorization key that is received at the authorization server in a manner described in greater detail below. In an optional embodiment, the database of records is generated in a chronological sequence, with only the current record being unlocked, and all past records being locked, so that past transaction records cannot be altered, deleted, or otherwise edited. In an optional embodiment, the chain of records includes references within each record to the chronologically adjacent records so that deletion of a record from the locked chain of records may be detected.

In an optional embodiment, the application server further communicates with at least one (and in an optional embodiment, a plurality of) custodian servers. In an optional embodiment, each custodian server has a custodian server processor. In an optional embodiment, the custodian servers open a connection to the application server after the authorization server has authenticated the transaction code. In an optional embodiment, the application server and custodian servers form a mesh network such that the any transaction request from the application server is received by the custodian servers in parallel. The custodian servers receive the transaction request from the application server and verify the transaction request. In an optional embodiment, multiple different custodian servers must verify the transaction request. The custodian servers generate a transaction authorization key after verifying the transaction request. In an optional embodiment in which multiple custodian servers are present in the system, the transaction authorization key includes multiple parts, with each part of the transaction authorization key being generated by a different custodian server. In such an optional embodiment, multiple custodian servers must verify the transaction request and each of them must generate a part of the transaction authorization key. These transaction authorization key parts are assembled into a valid transaction authorization key. In an optional embodiment, verification of the transaction request may include viewing an account stored at a data server relating to the transaction request. In one such optional embodiment, the data server and the custodian server(s) form a mesh network such that the data server and custodian server(s) all share the same view of the data stored at the data server, e.g., the account(s) and each corresponding account history.

The transaction authorization key is transmitted by the custodian servers to the application server after the transaction request has been verified by the custodian servers. This transaction authorization key authorizes the transaction request.

Embodiments of the present invention may include a data server with a data server processor, a data server communication device controlled by the data server processor, and a data server data storage readable by the data server processor. In an optional embodiment, the data server communication device is configured for selective communication with an application server and/or custodian server(s) via random ports. In an optional embodiment, the application server, custodian server(s), and/or data server form a mesh network. In one such optional embodiment, the mesh network includes a software-based identification manager stored and executed at one or more of the devices (e.g., the application server, custodian server(s), and/or data server) within the mesh network. In such an optional embodiment, the random ports connecting the application server, custodian server(s), and/or data server are randomly selected by the identification manager.

The data server data storage is configured to store, in non-volatile storage, program instructions executable by the data server processor. In one such optional embodiment, the data server processor permits access to the secured data stored on data server data storage by the application server in response to the authorization of a transaction request. In another optional embodiment, the data server processor permits communication (such as email, voice over IP, voice over PSTN or cell network, SMS, messaging over IP, or the like) by allowing the application server to use the data server in response to the authorization of a transaction request. In yet another optional embodiment, the data server processor records data received from the application server and/or custodian server(s) in a database of records. For example, in an optional embodiment, the data server data storage stores secured data such as accounts and an account history for each account. In a further optional embodiment, the secured data may also include an overall transaction registry for all accounts. In one such optional embodiment, the data server processor conducts a transaction in response to the authorization of the transaction request and records the transaction in the account history for the account (and, optionally, the transaction registry). In an optional embodiment, only the current record of the account history is unlocked, with past records being locked, thereby preventing the past records from being altered, written, rewritten, erased, or the like. In an optional embodiment, the permissions file stored in the vault of a modified permission access device determine the records and/or the data within those records that may be viewed on the modified permission access device.

DESCRIPTION

Figure 1:
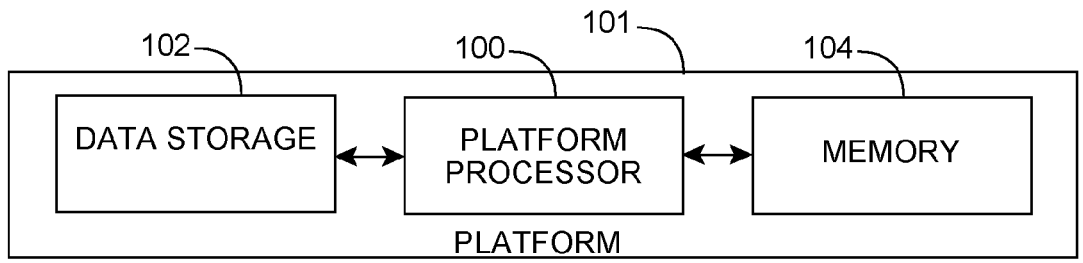
FIG. 1 is a block diagram of a system according to an embodiment of the present invention.

Reference is now made to the figures wherein like parts are referred to by like numerals throughout. Referring to FIGS. 1-4, a system, method, and device for storing and delivering data includes a platform 101. The platform 101 may be hardware, software, or firmware. For example, in one optional embodiment, the platform 101 is hardware having a platform processor 100 and memory 104. The platform 101 having a platform processor 100 could take many different forms including a general purpose computer, such as a personal computer or PC, a handheld device, such as a personal data assistant or PDA, a cellular telephone, a kiosk, a specific purpose gaming device, or any other type of device having a data processor. The functioning of the platform 101, platform processor 100, and memory 104 is described in greater detail below.

The present invention also includes a data storage 102 connected to the platform 101. The data storage 102 may be fixed to the platform 101, such as a hard drive or device memory; remote from the platform 101, such as a network file server, network storage, "cloud storage," or the like that connects to the platform via a computer network; or adapted to be removably connected to the platform 101, such as a flash drive, data card, removable hard drive, or the like that directly connects to the platform 101 rather than connecting to the platform via a network.

For example, in one optional embodiment, the data storage 102 is a hard drive that communicates with the platform processor 100 via a hard drive controller. In another example, the data storage 102 is cloud storage remote from the platform 101 that communicates with the platform processor 100 via a computer network. In another example, the data storage 102 is flash memory that is physically separate and removable from the platform processor 100 in that the data storage 102 communicates with the platform processor 100 through a serial port, such as a universal serial bus ("USB") port, a card slot, or other interface. In alternate optional embodiments, the data storage 102 may be a network-attached device or other remote device, or multiple networked or remote devices working in concert.

It is noted that in an optional embodiment, the data storage 102 may include other features and functions beyond data storage 102 functions. For example, in an optional embodiment, the data storage 102 may be integral with a cellular telephone, handheld device, PDA or the like that includes display and input functions. In such an optional embodiment, the data storage 102 may communicate directly or indirectly with an interface to display the data or data relating to the data and receive input for delivery of the data, such as media content.

In an optional embodiment, the data storage 102 stores data, optionally in non-volatile data storage. The data is secured in a vault. In one optional embodiment, the vault is inside of, and secured by, an executable wrap. In an alternate optional embodiment, the vault is outside of an executable wrap. Generally, the executable wrap is a set (or collection of sets) of executable program instructions. In an optional embodiment, the wrap includes program instructions to carry out one or more of: providing an interface or menu to utilize the wrap functions; encrypting and decrypting data secured by the wrap; copying executable sensors to a memory 104 associated with a platform processor 100; copying (or instructing an executable controller to copy) a sister to an executable controller into a memory 104; and/or cooperating with an authentication driver to open the vault.

In a further optional embodiment, a wrap may additionally generate an identifier (optionally a unique identifier) to identify the data storage 102 containing the wrap and/or assign (or read) an unique identifier for the platform 101 or platform processor 100 accessing the wrap. For example, the identifier for the data storage 102 may be generated using a software or firmware random number generator wrapped by the wrap or incorporated into the executable wrap or executable controller. Similarly, in an optional embodiment, the identifier for the platform 101 or platform processor 100 may include a serial number, IP address, network address, internet mobile equipment identity ("IMEI") number, media access control ("MAC") address, or other means for identifying the platform 101 or platform processor 100. In an optional embodiment, the identifier for the platform 101 or platform processor 100 may be stored in the wrap and may be used by the wrap to prevent the wrap from executing on platforms having a platform identifier that does not match the stored platform identifier. For example, in an optional embodiment, a unique identifier may be generated during an initial set up and stored in an executable wrap. In an optional embodiment, the unique identifier may be transmitted to a server 301 (such as an application server 1002, described in greater detail below), where it may be stored and used in later verification of the platform 101 by the server 301 (e.g., application server 1002). After an identifier has been received from the platform 101, further steps may be taken to register and authorize the platform, including receiving an authorization key from the server 301 (e.g., application server 1002) directly, through alternative communications (such as email, short messaging service ("SMS") at a mobile phone, or other communication to the platform 101 or other device), or the like. In a further optional embodiment, the authorization key may be broken into multiple parts, with various parts delivered through different communications means and/or devices. In an optional embodiment, each platform 101 within a plurality of platforms may be required to be authorized separately using different wraps so that the unique identifier for that platform 101 may be stored within the wrap for that platform 101. In such an optional embodiment, the set up process may be repeated for each platform 101. For example, if a user desired to register and authorize a mobile phone, a tablet device, and a personal computer, the user would require three separate wraps, with a separate wrap installed on each platform 101. The set up process would be repeated for each platform 101 so that an identifier for that device and an authorization key for that wrap may be uniquely generated for each platform 101. In one such embodiment, however, multiple platforms may be registered from a single platform 101, with the multiple platform registration encoded into an electronic receipt (described in greater detail below). In such an optional embodiment, the initial process of registering the user and identifying (and paying for, in an optional embodiment in which a fee is charged for each platform 101 requiring a wrap) multiple platforms may be accomplished from a single platform 101, thus only leaving the set up on each platform 101 to install the wrap and authorize the wrap and the platform 101 through the generation of an identifier and authorization key for that platform 101.

As a general overview, the vault secures data while an executable controller on the data storage 102 cooperates with a sister of the executable controller and/or an authentication driver installed in the memory 104 cooperate with the wrap to "unlock" the vault so that the data stored inside the vault can be accessed at the platform 101, e.g., retrieve data from the vault to be used, edited, viewed, or the like, at the platform, as well as save or store data at the platform in the vault. The vault may be inside the wrap or outside the wrap, i.e., may be accessed along with the wrap or accessed separately from the wrap. To clarify, the term "sister of the executable controller" refers to an executable program installed in the memory 104 by the wrap, while the term "authentication driver" refers to an executable program installed in the memory 104 after being downloaded from an authentication server 2002 by the wrap. Both of these executable programs are described in greater detail below.

In an optional embodiment in which the platform 101 communicates with a server 301, the server 301 may also include a sister to an executable controller in server memory 304 which cooperates with the executable controller executed from the data storage 102 to enable the server 301 to access the wrap. Sensors, running in the memory 104, monitor the platform 101 and/or server 301 (if provided) for any anomalies (described in greater detail below) and, upon detecting an anomaly, block access by a platform 101 and/or a server 301 (if provided) to the wrapped data. In one optional embodiment, access to the data is blocked by the sensors removing the sister of the executable controller from the memory 104. Since both the executable controller in the data storage 102 and the sister of the executable controller in the memory 104 are necessary to access the wrapped data in this optional embodiment, the sensors can block access to the data by blocking, deleting, or otherwise removing access to the sister of the executable controller in the memory 104.

In one such optional embodiment, the platform 101 includes a platform processor 100 and an associated memory 104. The memory 104 may store an executable controller executable by the platform processor 100 to control the flow of data to and from the data storage 102. In a further optional embodiment, the memory 104 may store an application, such as a video player, music player, photograph viewer, book viewer, game player, or the like that is executed by the platform processor 100 to play or display the data read from the data storage 102. The memory 104 may also be used temporarily in retrieving the data from the data storage 102 as well as confirming to the data storage 102 that the data storage 102 is connected to the platform.

In an optional embodiment, a server 301 having a server processor 300 and a server data storage 302 communicates with the platform 101. The server data storage 302 may include a record associated with the identifier stored on the data storage 102. When the wrap on the data storage 102 is mounted at the platform 101, the platform 101 may verify the data storage 102 by comparing the unique identifier stored at the data storage 102 with the record stored at the server 301 and, only if the data storage 102 is verified, transfers data to the platform 101. Optionally, as the data is delivered, a use record (described in greater detail below) may be stored at the server 301 and/or the data storage 102. In an optional embodiment, an electronic receipt may also be stored at the server 301 and/or the data storage 102. A purpose of the electronic receipt would be to provide a record of a transaction using the data storage 102 and/or the data stored thereon. For example, in an embodiment in which the data include media content, such as a movie, music, game, or the like, an electronic receipt may be stored in the use record to evidence the transaction in which the media content was purchased or rented and the use record may include an electronic record that the user had used the media content, e.g., viewed the movie, listened to the music, played the game, or the like. In such an optional embodiment, the electronic receipt and use record may, in combination, provide a history of the transaction. As noted above, the electronic receipt may also store the quantity of platforms registered to (and/or paid for by) the user for use. In an optional embodiment including a server 301, an electronic receipt may be stored at the server 301, optionally in server data storage 302, and in the wrap on the data storage 102 at the platform 101. These electronic receipts may enable resolution of disputes since, in this optional embodiment, the electronic receipt in the wrap on the data storage 102 may be secured by the wrap from tampering. In a further optional embodiment, the electronic receipt at the server 301 may likewise be secured from tampering with encryption, a wrap at the server 301, or the like.

In one optional embodiment, the data storage 102 stores an executable controller governing how the platform determines accessibility of the data by the platform. In such an optional embodiment, the data may be stored at a platform 101 and/or a server 301. The data in such an optional embodiment may be pre-stored at the platform 101 and/or the server 301, or may be loaded onto the platform 101 and/or server 301 through the programming instructions at the data storage 102, or may be loaded onto the platform 101 from the server 301 (or vice versa).

Additionally or alternatively, the data in the vault at the data storage 102 may be readable by a platform processor 100. The data storage 102 containing the data secured in the vault may be readable or readable-writable. That is, the data stored in the vault on the data storage 102 may be fixed, or may be changeable. For example, in one optional embodiment, data may be updated, exchanged, or supplemented by storing revised, different, or additional data. For example, in one optional embodiment, discussed in greater detail below, the data storage 102 may communicate directly or indirectly with a server 301 that delivers data to the data storage 102 such as through a file transfer or other communication protocol. Alternatively, the data storage 102 storing the data is readable only. In such an optional embodiment, the data may be fixed.

In one optional embodiment, the secured data may be encrypted in bulk and stored in the vault by a loading program. In use, the wrap may act to decrypt the data when the executable controller and sister of the executable controller (or authentication driver) cooperate to access the data secured in the vault. In a further optional embodiment, the wrap may encrypt the data going into the vault. For example, when saving or updating wrapped data, the updated data file may be passed by the sister of the executable controller (or the authentication driver) to the executable controller where the wrap can encrypt the data file for storage in the vault and, optionally, overwrite the outdated file already in the vault. In an optional embodiment, the data secured in the vault may be hidden from browsing at the platform 101. In one optional embodiment, so that the data secured in the vault may only be viewed through the menu page of the wrap and accessed, i.e., read and written, via an executable controller in cooperation with a sister of the executable controller (or the authentication driver). In one such optional embodiment, the data in the hidden sub-components may not be browsed through the operating system of the platform, applications, application program interfaces, or the like, but rather can only be accessed by the wrap, executable controller, and sister of the executable controller (or authentication driver) which can display and access the contents of the vault.

In an alternate optional embodiment, encryption may occur at the direction of the user based on input by the user. For example, in an optional embodiment, the wrap or authentication server may provide input to the platform that may be used in combination with input from a user (e.g., a word, phrase, number, biometric data, or the like) to generate an encryption key. An encryption key generated in this manner would be unique to the user, thus, the secured data in the vault that has been encrypted using the encryption key could not be decrypted without the user's input. Likewise, the user cannot generate an encryption key and encrypt or decrypt the data in the vault without the wrap and/or authentication server. The decryption would proceed in the same manner, with input from the user being combined with input from the authentication server or wrap to generate a decryption key. In the event that the input from the user used to generate the decryption key matches the input from the user used to generate the encryption key, the decryption key will decrypt the encrypted data in the vault.

In another optional embodiment, an additional feature of using physically hidden areas in the data storage may be combined with the encryption. For example, in the example illustrated in FIG. 4, a data storage 102 may include a firmware area 406 and a flash memory area 422. The firmware area 406 may include a firmware controller 408, device mounting firmware 410 (e.g., firmware or, alternatively software, that communicates with an operating system to mount the device), a file-based command channel 412, and the like. In an optional embodiment, a security module 414 may function alone, or in part, to access data within the wrap and move data from inside the wrap to outside the wrap. The flash memory area 422 of the data storage 102 may be partitioned into sub-components, some of which may or may not be hidden from browsing at the platform, which contain the data as well as a use record, an executable controller, or the like. In one optional embodiment, the hidden sub-components may not be accessible, except through an executable controller described in greater detail elsewhere. Specifically, hidden sub-components may be configured such that the data in the hidden sub-components may not be browsed through the operating system of the platform, or the like, but rather can only be accessed by the executable controller which can locate and access the hidden sub-components. For example, in the optional embodiment of FIG. 4, a data hidden area 420 may contain data, such as media, executable programs, and the like, while a use record hidden area 418 may store a record of use history, credit history, or the like (as discussed below). Conversely, a read-only autorun 416 may be stored in a non-hidden area, thereby making the autorun file available without proceeding through an executable wrap. In an optional embodiment, the autorun may initiate a menu within the wrap to enable the wrap to install sensors, monitor the platform 101, install a sister to the executable controller, and thereby provide access to data secured in the vault.

It is noted that the data may not necessarily all be contained in a single hidden sub-component or hidden area. That is, the data may be split among multiple sub-components. In one such optional embodiment, a file may be split, with separate segments stored in multiple different hidden sub-components. An executable controller may locate and access the hidden sub-components to deliver the data in a coherent order. Thus, when the file is played back by the platform processor, the data appears in order, even though it was accessed from multiple hidden sub-components in segments. In like manner, an executable game may exist in multiple parts in various hidden sub-components. In using the executable controller to access the executable game files, the platform processor may execute the executable game properly only when those executable game files are retrieved by the executable controller from the various hidden sub-components. This creates a substantial obstacle to hacking and copying since the data (e.g., data files, executable programs, executable games, and the like), is segmented into hidden sub-components which can only be accessed by the executable controller and, in fact, can only be located by the executable controller since the operating system, application program interfaces ("APIs"), applications, and the like are prevented from locating the hidden sub-components. Moreover, since the data is segmented, even if some of the hidden sub-components could be located and hacked, only a portion of the data stored therein could be compromised.

In either case, in one optional embodiment, the data storage 102 stores data in a single area or partition of the data storage 102 alone or with other additional data. In another optional embodiment, the data storage 102 is partitioned into multiple sub-components so that other data may be stored separately on the data storage 102 with the data in one sub-component and other data in a separate sub-component (s). For example, in certain optional embodiments, the data storage 102 is partitioned into one or more sub-components, with data stored in one of the sub-components. In an optional embodiment in which sub-components or areas are hidden, the data may be stored in a separate hidden area 420.

In an optional embodiment, the executable controller of the wrap may "open," retrieve, then "close" the vault only when needed so that the vault is only "open" when data is read from, or written to, the vault. Where the vault contains sub-components, the sub-components of the vault (whether physically hidden or not) are only opened as needed. In other words, in one optional embodiment, the executable controller only accesses the sub-component containing the data called for, and does not leave "open" any sub-components not currently being accessed. For example, if a media file is divided among twelve sub-components, the executable controller may access the sub-component containing the first segment of the media file and, after that first segment of the media file is cached, close the sub-component before accessing the sub-component containing the second segment of the media file. In this manner, a data sniffing program or other surreptitious data monitor may not be presented with an opportunity to access any data, other than the data being immediately accessed.

Figure 2:
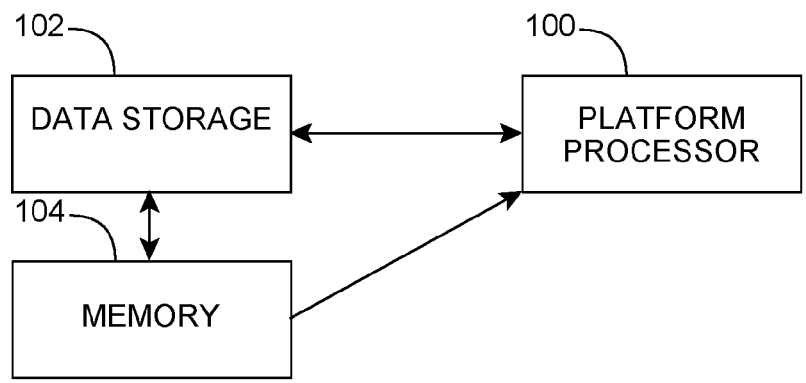
FIG. 2 is a block diagram of a system according to an embodiment of the present invention.
Figure 3:
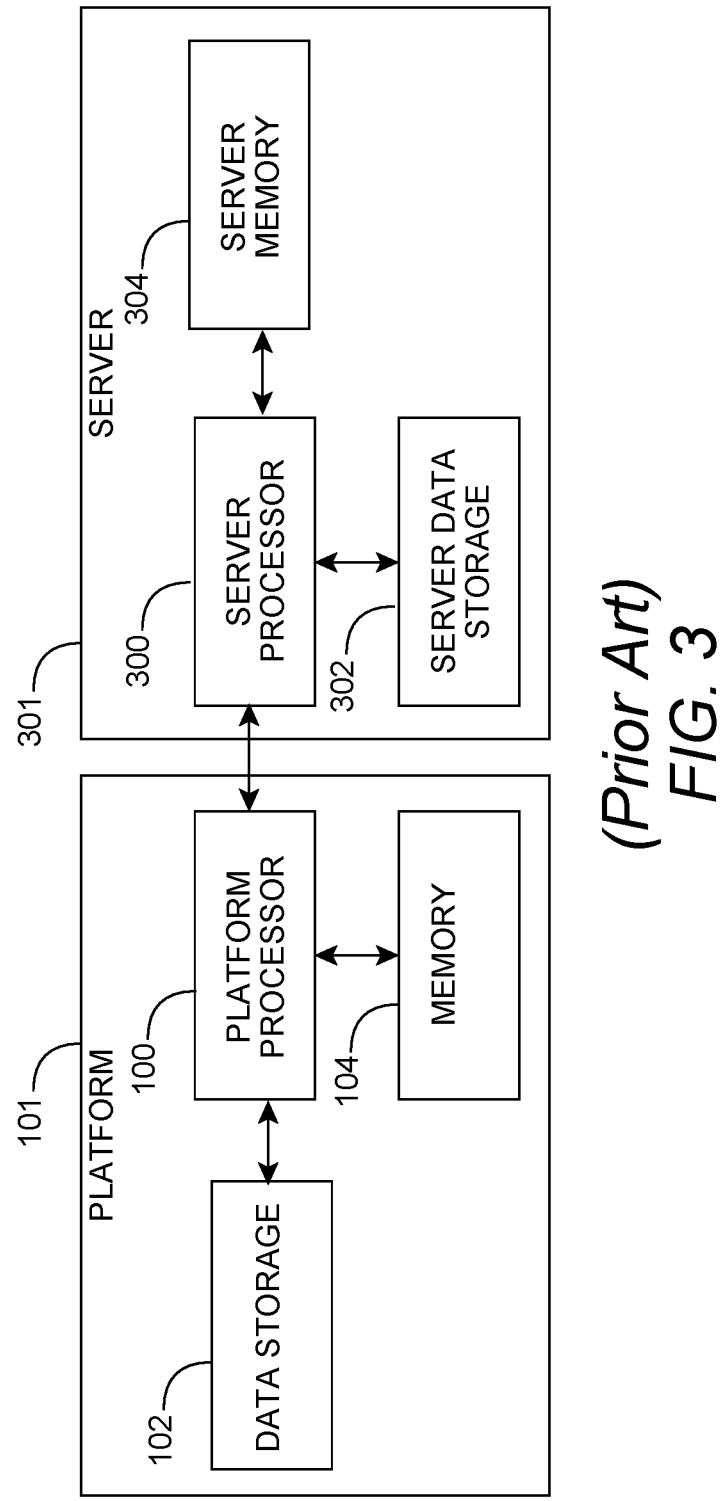
FIG. 3 is a block diagram of a system according to an embodiment of the present invention.

Referring generally to the optional embodiment of FIGS. 1-8, an executable controller executable by a platform processor 100 governs the use of the data and the relationship between the data storage 102 and a platform processor 100. In one optional embodiment, an executable controller or a sister of an executable controller is stored in memory 104. Optionally, the memory 104 is at the platform 101 as shown in FIGS. 1 and 3, although it is contemplated that the memory 104 could be part of the data storage 102 or associated with the platform 101, but not physically incorporated into the platform 101, as shown in FIG. 2. For example, in an optional embodiment, an executable controller is stored in a memory 104 physically associated with the platform processor 100, such as in random access memory ("RAM") associated with the platform processor 100. In yet another optional embodiment, the executable controller is stored in a more persistent data structure such as a hard drive, optical memory, magnetic memory, or the like at the platform 101. In optional embodiments in which the executable controller is stored in memory 104, an executable controller may be installed from the data storage 102. That is, in one optional embodiment, the data storage 102 stores an installer that installs an executable controller for controlling play of the data at the memory 104.

Figure 4:
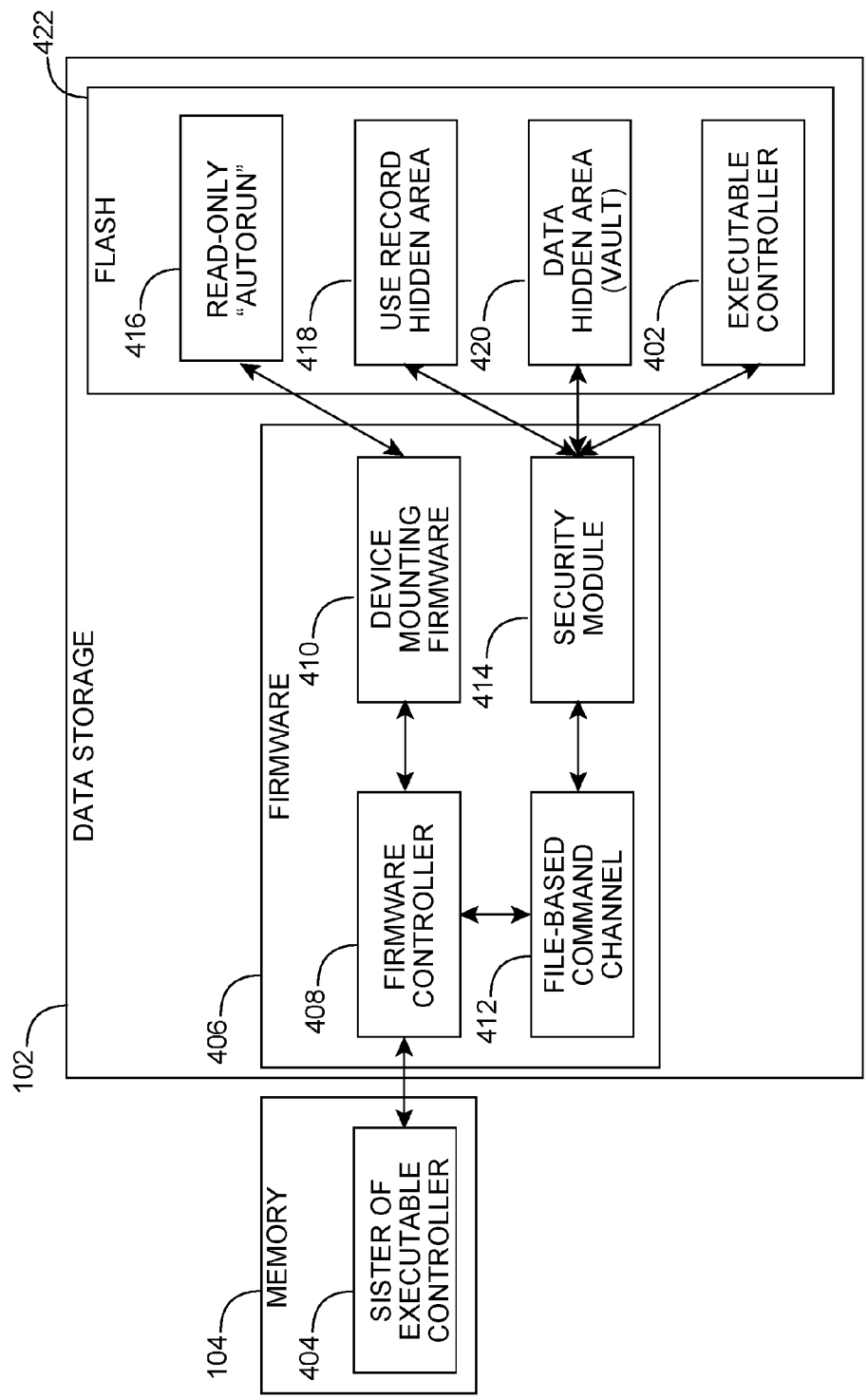
FIG. 4 is a block diagram of a device according to an embodiment of the present invention.
Figure 5:
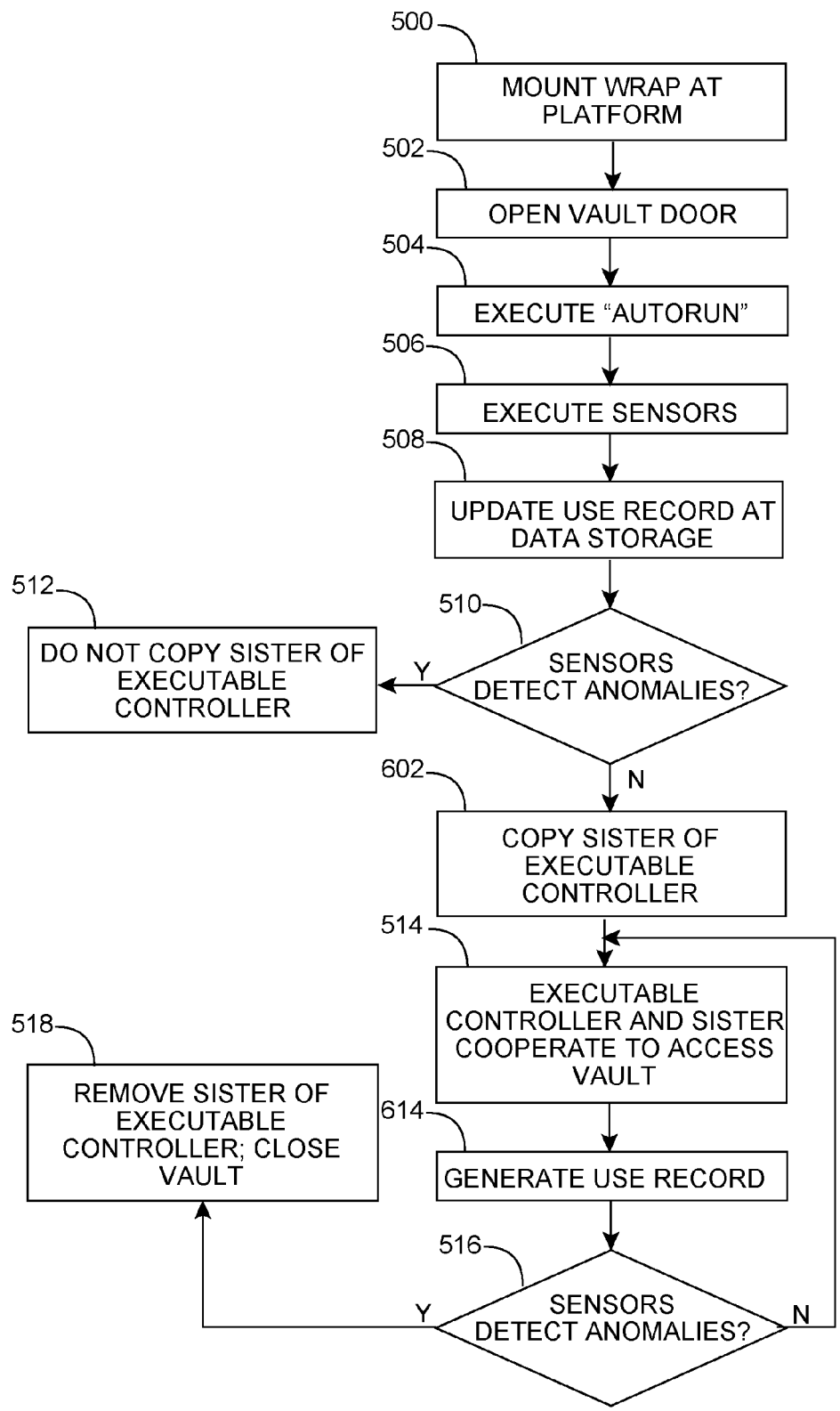
FIG. 5 is a flow chart of a method according to an embodiment of the present invention.

More specifically, in one optional embodiment illustrated in FIGS. 4 and 5, a sister of an executable controller 404 may be installed 602 to the memory 104 physically associated with a platform 101 from a data storage 102 when the wrap is mounted 500 at a platform 101. In one such optional embodiment, the executable controller 402 stored on, and executed from, the data storage 102 works in cooperation with a sister to the executable controller 404 installed in, and executed from, the memory 104. The installation of the sister to the executable controller may be controlled in any manner. For example, in an optional embodiment in which the data storage 102 is a fixed hard drive or removable data card, flash drive, or the like, the data storage 102 may store an executable "autorun" file 416 and data protected by a wrap. The platform 101 executes 504 the executable "autorun" which permits communication with the wrap. In an optional embodiment, the wrap may only be accessible through the executable "autorun." In one optional embodiment, the "autorun" extracts a menu from the wrap. As previously noted, in an optional embodiment, the menu may be extractable from the wrap only through the executable "autorun" and, thus, the options available through the menu may only be accessible after the "autorun" has executed. Specifically, in an optional embodiment, the wrap may prevent access to the data inside the vault by the operating system, applications, APIs, or the like, so that neither the menu nor the data may be accessed without the "autorun" first executing. The wrap may take many different forms, including an interface, encryption protocol, or the like. In an optional embodiment, the wrap is an executable program, e.g., an executable wrap, that only communicates with the executable "autorun" 416. As noted above, in an optional embodiment, a security module 414 may cooperate with the wrap to move data inside and outside of the wrap.

Within the wrap, i.e., among the executable programs and libraries collectively referred to as the "wrap," is an executable controller 402. In an optional embodiment, the wrap instructs the executable controller to create 602 a "sister" in the memory 104, e.g., RAM, of the platform 101. In another optional embodiment, the wrap instructs the executable controller to create a sister of itself in server memory 304 of a server 301. In yet another optional embodiment, the wrap instructs or authorizes a server 301 to create a sister of the executable controller in the memory 104 of the platform 101.

In one optional embodiment, the "sister" is a duplicate or substantial duplicate of the executable controller. That is, in one optional embodiment, the sister of the executable controller stored in, and executed from, the memory 104 of a platform 101 (or the server memory 304 of a server 301) is identical to the executable controller stored on, and executed from, the data storage 102. In another optional embodiment, the "sister" is a related executable program, but not a copy of the executable controller, which only talks to the executable controller. That is, in another optional embodiment, the sister of the executable controller stored in, and executed from, the memory 104 of a platform 101 (or server memory 304 of a server 301) is not identical to the executable controller which is installed on the data storage 102, but is a "related" program insofar as it is designed to communicate directly (and optionally, exclusively) with the executable controller stored on, and executed from, the data storage 102. In either optional embodiment, the sister of the executable controller 404 stored in, and executed from, the memory 104 of a platform 101 (or the server memory 304 of a server 301), cooperates 514 with the executable controller 402 stored on, and executed from, the data storage 102 and only transfer data to and from each other. Put another way, the executable controller running from the data storage 102 and the sister of the executable controller running from the memory 104 of a platform 101 (or server memory 304 of a server 301) pass data only to each other and these data are not accessible, and do not pass through, any other operating system, application, APIs, or the like. In this sense, the data of such an optional embodiment are secure from viewing or tampering through the operating system, applications, APIs, or the like. Thus, in an example directed to executable applications, the application stored on the data storage 102 may be executed by the platform processor 100 only by passing data and commands through the executable controller and sister of the executable controller so that the data and commands are secure from sniffing or hacking, and the game program is not accessible for hacking or copying, through external programs, i.e., any program other than the executable controller or sister of the executable controller. In an optional embodiment, the executable controller and sister of the executable controller communicate directly and are continuously available to communicate, although it is contemplated that the sister of the executable controller and executable controller may not necessarily continuously communicate.

Figure 20:
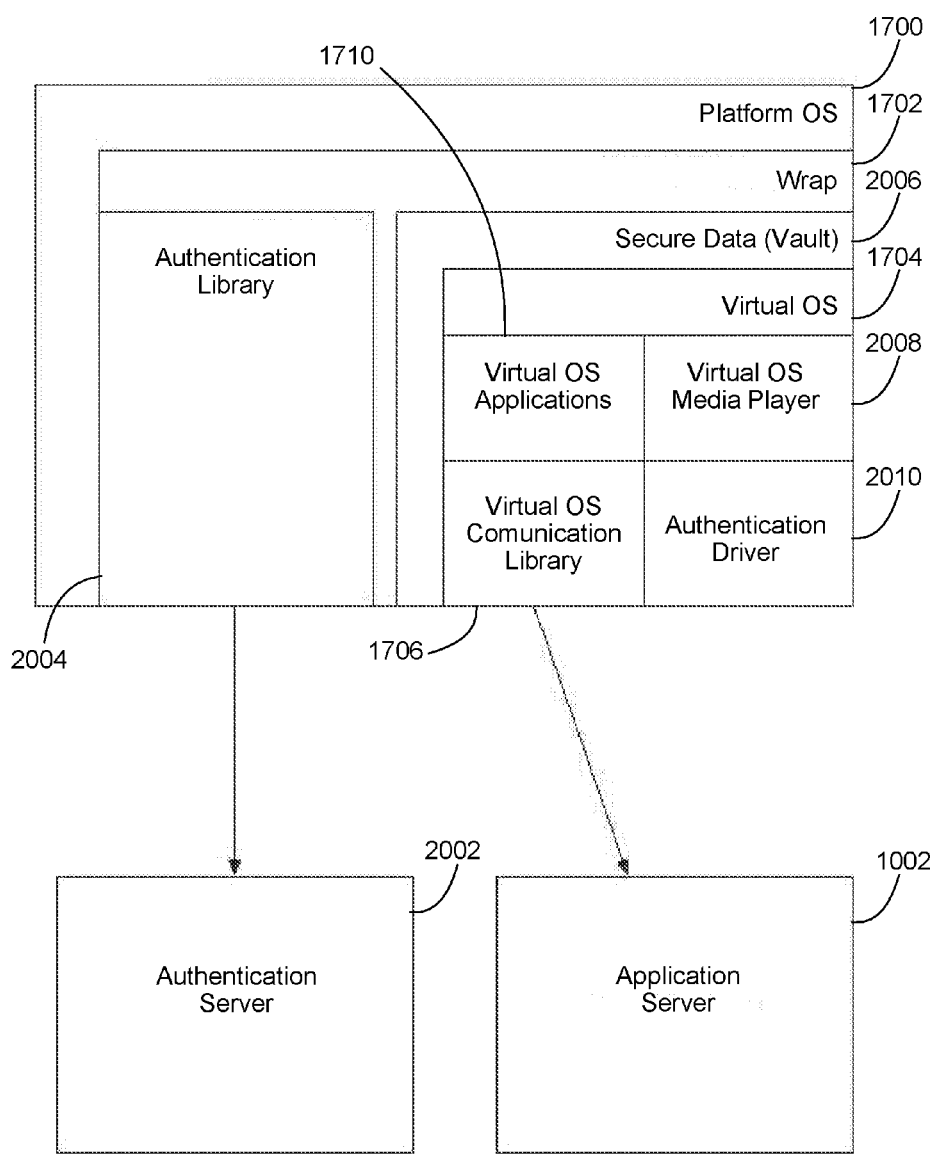
FIG. 20 is a block diagram of a system according to an embodiment of the present invention.

Referring to FIG. 20, in a further optional embodiment, the wrap communicates with an authentication server 2002 or other remote server to download an authentication driver 2010. In the optional embodiment of FIG. 20, an authentication library 2004 within the wrap 1702 includes the protocols and addresses for contacting the authentication server 2002. An authentication driver 2010 may be held inside the wrap 1702 in a secure data area 2006, also referred to as a vault to distinguish it from the authentication library 2004 and other libraries and communication protocols within the wrap but outside the secure data area 2006. As discussed in greater detail below, the virtual operating system may include a media player 2008 among the virtual operating system applications.

Figure 21:
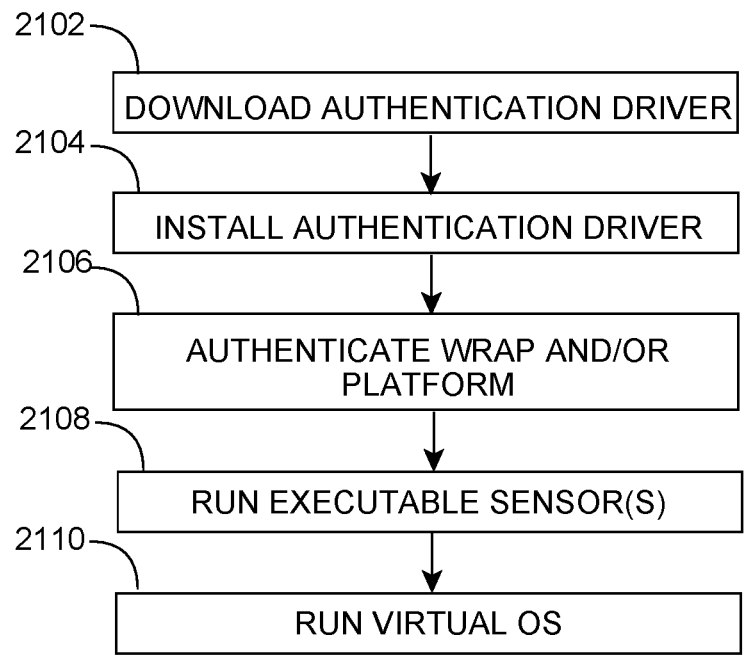
FIG. 21 is a flow chart of a process according to an embodiment of the present invention.

In an optional embodiment illustrated in FIG. 21, the authentication driver is downloaded 2102 from the authentication server 2002 or other remote server each time the wrap is opened. In one such optional embodiment, the authentication driver is installed 2104 to the memory 104 associated with the platform processor 100, and is executed by the platform processor 100 to authenticate 2106 the wrap and/or the platform. Once the authentication is performed, the wrap is permitted to install and run 2108 the executable sensor(s). In one optional embodiment, the wrap is also permitted to install a sister of the executable controller as described above. In another optional embodiment, the authentication driver signals the wrap to install the executable sensor but the authentication driver performs the actions of the sister of the executable controller. Thus, in one optional embodiment, the authentication driver is installed to the memory 104 and is configured to communicate (e.g., pass data) only to or from the executable controller inside the wrap. In this manner, if either the authentication driver or the executable controller inside the wrap are missing, the data or communication pathway secured in the vault cannot be accessed and remains "locked" by the wrap. In such an optional embodiment, a sister to the executable controller is not installed since the authentication driver performs the functions of such an executable sister.

In an optional embodiment, this security may be enhanced using executable sensors. In an optional embodiment, the wrap contains executable software or firmware sensors which are copied to, and executed 506 from, the memory 104 of the platform 101. In an optional embodiment, an authentication driver is downloaded into memory 104 and is used to authenticate the wrap before the executable sensors 101 are installed. Similarly, in an optional embodiment, executable sensors 101 are installed before the sister of the executable controller is created in the memory 104. The sensors may be configured to monitor 510 the platform 101 and/or data storage 102 for anomalies that may suggest that the operating environment is not secure. In an optional embodiment, the sensors may sense one or more of: (a) whether a debugger, data sniffer, or other spyware is operating (e.g., by detecting whether a port is open on the platform 101); (b) whether the data storage 102 is connected to the platform 101 (e.g., by detecting whether power is being delivered to the data storage 102 by the platform 101); and/or (c) whether any system resources, such as file directories, used by the executable controller, sister of the executable controller, "autorun," or wrap have been, or are being, accessed (which may suggest that hacking is being attempted). At the outset, any problems detected by the sensors may be communicated to the wrap, which does not copy 512 the executable controller to, or create the sister of the executable controller in, as the case may be, the memory 104 of the platform 101. Put another way, the sensors first determine whether the environment on the platform 101 is safe for the executable controller, or sister of the executable controller, as the case may be.

In an optional embodiment, another layer of security may be interposed between the "autorun" and the data processor at the platform 101. In one optional embodiment, such a "vault door" may prevent the platform 101 from executing the "autorun" until unprompted input is received, thereby opening 502 the vault door. By "unprompted," it is contemplated that the platform displays a desktop view or window view typical for any storage device and otherwise provides no prompting to the user for input. Thus, the user would need to know that input is needed since no prompt would appear, as well as the input called for. The vault door optionally monitors the input device, such as a keyboard, at the platform 101 for input and allows the "autorun" to execute after the input is received. In an optional embodiment, the input is a password, passcode, PIN, or other alphanumeric string. Alternatively, the input may be biometric data and the input device may be a fingerprint scanner, retina scanner, voice reader, or other biometric input device.

As noted above, in an optional embodiment, the executable controller stored on the data storage 102 may create or install a sister of the executable controller stored in memory 104 physically associated with the platform 101. The operation of the executable controller and sister of the executable controller is described in greater detail below. In an optional embodiment, the sister of the executable controller and/or authentication driver is only temporarily stored in memory 104. In one such optional embodiment, the sensors discussed above may be used to determine whether the operating environment is secure. If the sensors determine 516 that the operating environment is not secure, the sister of the executable controller and/or authentication driver may be deleted 518 from memory 104. The deletion of the sister of the executable controller and/or authentication driver results in a stoppage of all wrapped data because both the executable controller and the sister of the executable controller and/or authentication driver are needed to access the wrapped data; without the sister of the executable controller and/or authentication driver, the wrapped data is inaccessible to the platform 101. In this sense, the sister of the executable controller and/or authentication driver may be termed a "ghost" program in that the sister of the executable controller and/or authentication driver only operates in cooperation with the executable controller and disappears, i.e., is deleted from the memory 104, if that cooperation is compromised.

The sister of the executable controller and/or authentication driver may also be termed a "ghost" program in that it may not be directly visible to the user. That is, in an optional embodiment, the sensors may monitor the resources used by the executable controller and the sister of the executable controller and/or authentication driver. In the event that a user attempts to view the sister of the executable controller and/or authentication driver or, in an optional embodiment, the files and/or directories used by the sister of the executable controller and/or authentication driver, it may disappear, i.e., be deleted from memory 104. In an optional embodiment, the data storage 102 may include a power source, such as a battery backup, to enable an executable controller stored on, and executed from, the data storage 102, to write the final data or commands received from the sister of the executable controller and/or authentication driver in the event that the sister of the executable controller and/or authentication driver disappears due to loss of power or loss of connection. In such an optional embodiment, disconnecting or removing the data storage 102 or shutting off the power to the platform 101 and/or the data storage 102 would not be effective to cancel the most recent transaction, data transfer, command, or the like communicated between the executable controller and the sister of the executable controller and/or authentication driver. As discussed above, the final (or most recent action) prior to disconnection, loss of power, loss of signal, or the like, may be written to an electronic receipt and/or a use history that is secured by the wrap.

To summarize briefly, in one optional embodiment, data are stored in a vault on a data storage 102 and secured by a wrap. The vault may be inside the wrap or outside (e.g., separate from) the wrap. The data may include an executable controller that is stored on, and executed from, a data storage 102 in cooperation with a sister of the executable controller and/or authentication driver stored in, and executed from memory 104. Where the secured data stored in the vault at the data storage 102 includes an executable program, such as a game program, the game program can thus be executed from the data storage 102 without storing the game program in the memory 104 associated with the platform processor 100 through data and commands sent by the executable controller to the sister of the executable controller.

More broadly, any data stored in the vault may be secured by the wrap and accessible only by the executable controller in cooperation with a sister of the executable controller and/or authentication driver, thereby securing the data from, for example, viruses or trojans which would be blocked from reading the wrapped data or writing malicious code into the wrapped data. Similarly, the wrapped data would be secured from, for example, hacking by attempting to read the data storage 102 remotely because the remote device would lack the sister of the executable controller and/or authentication driver and, therefore, be denied access to the wrapped data. Moreover, the wrapped data may be secured from tampering because the wrap and/or executable controller may include parameters defining the data files that may be overwritten or altered and, therefore, could be configured to block the platform 101 from altering certain files, even if the platform 101 is otherwise permitted to read and view the files. For example, as discussed above, in an optional embodiment an electronic receipt, use history, and the like may be secured by the wrap. In an optional embodiment, the electronic receipt, use history, or the like may be viewable at the platform 101 (for example, through the menu page initiated by the autorun), but the wrap may block the platform 101 from writing, overwriting, or altering the electronic receipt. Similarly, the data in the vault may be secured from unauthorized reading by encrypting the data using an encryption key that is generated by a combination of user input and authentication server input.

In an alternate optional embodiment, the executable controller is stored at, and executed from, the data storage 102 without storing an executable controller at the memory 104 physically associated with the platform processor 100. In other words, rather than installing the executable controller on the platform, the executable controller may be executed from the data storage 102. In this optional embodiment, a sister of the executable controller may not be installed on the memory 104 of the platform 101.

Referring generally to FIGS. 1-8, the executable controller, and optional sister of the executable controller and/or authentication driver, may include various components for the operation of the platform processor 100 and the data storage 102. Generally, the executable controller may include such features as security and/or data integrity procedures, record keeping procedures, or the like. In one optional embodiment in which the data includes a game, the executable controller stored may include a random number generator or some other means for generating a random number. As may be appreciated, a random number generator may take many different forms and may generate random numbers in many different ways. In an optional embodiment, the random number generator is stored in the memory 104 separate from the game of chance stored on the data storage 102 so that the game of chance can only be conducted when the data storage 102 is connected to the platform 101.

In one optional embodiment, the executable controller may also secure certain data from tampering by encrypting the data, preventing the platform processor 100 from overwriting or altering the data, or the like. For example, when the wrap is mounted at the platform 101, the vault securing data may be "unlocked" so that it can be read from the data storage 102 by the platform processor 100 via the executable controller and, optionally, the sister of the executable controller and/or authentication driver, and other secure writable areas of the vault may be "opened" so the platform processor 100 can write to the data storage 102 via the executable controller and, optionally, the sister of the executable controller and/or authentication driver.

In an optional embodiment, readable areas of the vault may be locked and writable areas of the vault may be closed under one or more of a variety of circumstances. In one optional embodiment, the vault is locked and closed whenever data is neither being read from or written to the data storage 102. Thus, as suggested above, the vault is not left unlocked and open when it is not in use; rather, it is closed and locked when it is not in use. As discussed above, a wrap may include sensors, e.g., program routine(s), to determine the connection status between the platform processor 100 and the data storage 102, an monitor the memory 104 (whether RAM, hard drive, or the like) physically associated with the platform processor 100, the power received by the data storage 102 from the platform, or the like, to ensure that the wrap only unlocks readable sub-components and opens writable sub-components of the vault when the sensors do not detect any anomalies. Moreover, in an optional embodiment, the sensors may trigger the removal of the sister of the executable controller from memory 104 upon detection of an anomaly such that the platform 101 is disabled from accessing the data secured in the vault as discussed above. In yet a further optional embodiment, the data storage 102 may be removable from the platform 101 (such as a portable memory card, drive, or the like). In one such optional embodiment, the vault may be locked and the secure areas or sub-components of the data storage 102 may be closed when the data storage 102 is removed from the platform.

In one optional embodiment, when the wrap stored on the data storage 102 is mounted at the platform 101 (e.g., the autorun starts, installs sensors to ensure the platform 101 is safe, and runs the wrap menu) the executable controller, which is either executed from the data storage 102 or executed through a sister to the executable controller and/or authentication driver installed to memory 104 local to the platform processor 100, causes the platform processor 100 to assign the data storage 102 a unique identifier. Optionally, the unique identifier is randomly generated by the platform processor. In another optional embodiment, the data storage 102 is preassigned a unique identifier, such as when the data storage 102 is created or prior to distribution of the data storage 102 to the player, and the unique identifier is stored on the data storage 102. In an optional embodiment, the unique identifier may also be stored on the platform 101. In one such optional embodiment, the wrap on the data storage 102 may be executed only on the platform 101 storing the unique identifier for that data storage 102, thereby tying the platform 101 to the data storage 102 and preventing the wrap on the data storage 102 from being used with any other platform 101. Similarly, the wrap may identify the platform 101, in any of a variety of ways, such as by using a serial number, IMAP address, MAC address, IP address, or the like, and store the platform identifier in the wrap. In this manner, the wrap may ensure that the wrap is used only at a specific platform 101, such as the platform 101 on which it was originally opened.

In a further optional embodiment, a key, such as a password, a pass code, a PIN, the unique identifier generated, or the like, is installed by the executable controller on both the data storage 102 and the platform processor 100 executing the executable controller. In a further optional embodiment, the executable controller encrypts the key.

Optionally, a key is used in combination with the unique identifier assigned to the wrap to verify the source of the data while conducting any transactions involving data in the vault. For example, in an optional embodiment described in greater detail below, the executable controller executed from the data storage 102 by the platform processor 100 may direct the platform processor 100 to write data, such as a use record or other media play data, to the data storage 102. In one such optional embodiment, the data written into vault on the data storage 102 may be verified using the key and/or the identifier. For example, an electronic receipt written into the wrap on the data storage 102 may be uniquely identified based on the key, the identifier of the wrap (or data storage 102), the platform identifier, a server identifier, if any, or any combination thereof. In another example, the key and/or identifier assigned to the data storage 102 is used to access or "unlock" a record stored remote from the data storage 102, such as at a server 301.

As discussed above, in an optional embodiment, the data storage 102 may additionally be writable. In an optional embodiment, a wrapped sub-component 404 of the data storage 102 is writable. In one such optional embodiment, the executable controller executed by the platform processor 100 direct the platform processor to write a use record to the data storage 102 as data is read from the data storage 102. In one such optional embodiment, the executable controller is executed from the data storage 102, without installing the executable controller into the memory 104 physically associated with the platform processor 100 or by installing a sister of the executable controller and/or an authentication driver to the memory 104 physically associated with the platform processor, to cause the platform processor 100 to write a history, e.g., a use record, transaction record, electronic receipt, or the like, at the data storage 102. It is contemplated that, although the executable controller may not necessarily be installed at the memory 104, the executable controller may temporarily borrow the memory 104, such as the RAM or hard drive, associated with the platform processor 100 as the executable controller is executed. In an alternate optional embodiment, in which a sister of the executable controller and/or an authentication driver is installed in the memory 104, the sister of the executable controller and/or the authentication driver may transfer history data directly to the writable areas of the data storage 102 either with or without cooperation of the executable controller stored on, and executed from, the data storage 102.

For example, in one optional embodiment directed to media files, a play limit may be pre-written to a use record stored at the data storage 102. In one such example, the data storage 102 may be loaded with a balance of time or play before it is distributed to the player. In another optional embodiment, the platform processor 100, optionally under the direction of the executable controller or an optional server 301, may write a play limit to a use record stored at the data storage 102. In one such example, the data storage 102 may be loaded with a balance of time or play when the data storage 102 is first connected to a platform and the player directs the loading.

Optionally, the data storage 102, or the sub-component of the data storage 102, that stores the use record, and any electronic receipts that are part of the use record, is secure. For example, in one such optional embodiment, the use record is stored in the wrap. In another example, the use record is stored in a write-once-read-many ("WORM") storage such that once written, the use record cannot be rewritten or altered. In another optional embodiment, the data storage 102 is read-write memory ("RWM"), but the executable controller, working alone or in combination with the key and/or identifier, may limit or prevent access to the use record data by the platform processor 100, server 301, or the like as well as the ability to rewrite or alter the use record. For example, in an optional embodiment including a server 301, the platform processor 100 may be restricted from writing, rewriting, or altering the use record, electronic receipts, or the like stored at the data storage 102 until instructed to do so by the server processor 300 at the server 301. In any of these optional embodiments, it may be the executable controller in cooperation with the sister of the executable controller and/or an authentication driver that read the use record from the data storage 102 for use by the platform processor 100, server 301, or the like. It is noted here that in an optional embodiment in which the platform processor 100 communicates with a server 301, described in greater detail below, the use record and any electronic receipts may be stored at a server data storage 302 in addition to, or in place of, the data storage 102.

Similarly, a use record and/or electronic receipt may be generated by the platform processor 100 as the platform processor 100 reads the data from the data storage 102. In an optional embodiment, the use record and/or electronic receipt may be written to the data storage 102 by the platform processor 100 under the direction of the executable controller. As described above, the integrity of the use record and any electronic receipts may be secured. As above, the use record and any electronic receipts may be preserved by storing the use record and/or electronic receipts within the vault. In another optional embodiment, the use record and any electronic receipts may be preserved by using WORM storage or the executable controller may limit or prevent access to the use record using security measures such as encryption, use of the key and/or the identifier, or other security measures as well as the ability to rewrite or alter the use record.

For example, in an optional embodiment including a server 301, the platform processor 100 may be restricted from writing, rewriting, or altering the use record stored at the data storage 102 until instructed to do so by the server processor 300 at the server 301. In any of these optional embodiments, it may be the executable controller that reads the use record from the data storage 102 for use by the platform processor 100, server 301, or the like. As with the use record, in an optional embodiment in which the platform processor 100 communicates with a server 301, the use record may be stored at a server data storage 302 in addition to, or in place of, the data storage 102.

In an optional embodiment in which a use record is stored, various events of may be included in the use record. The use record may include a credit history and a use history. It is contemplated that in such an optional embodiment, the credit history and use history may be stored together or separately, e.g., in separate sub-components of a data storage 102. In an optional embodiment, the use history may store events relating to the data stored on the data storage 102. For example, in one optional embodiment, the number of times the data is read from the data storage 102 (e.g. the number of times the data is played), or the time duration the data is read from the data storage 102 (e.g. the duration that the data is played), or the time window during which the data is read from the data storage 102 (e.g. the day or time of day that a media file is played), or the like, may be recorded in the use record. In such an optional embodiment, the use record may track whether the data has been read from the data storage 102 and, based on the use record, the executable controller may determine whether the data is available to be read from the data storage 102 by the platform processor 100. In an optional embodiment illustrated in FIG. 5, the use record may optionally be updated 508 as the data is read from the data storage 102 by the platform processor 100. Data stored in a credit history section of a use record may determine the eligibility to read data from the data storage 102. For example, in an optional embodiment in which the data include media content, the credit history may store the amount of time (e.g., available for three days) or the number of "plays" (e.g., available for one viewing) associated with the data. Similarly, in an optional embodiment in which the data include a playable game program, the credit history may store the amount of money, whether "real" or "fictional" money, available for use in playing the game (e.g., $100.00 balance) or the number of plays (e.g., thirty games) associated with the data. It is contemplated that the use record, including any credit history section and use history section, may be updated, optionally in real time, as data are accessed from the data storage 102. For example, a credit history may be debited by amounts used in a game, plays, viewings, time, or the like, and the use history may record the event such as by writing the viewing time, game play event(s), game play outcome, or the like.

It is contemplated that the player or viewer for playing or displaying the data at the platform may be part of the executable controller stored at, and optionally executed from, the data storage 102 or may be a separate program stored at the memory 104 associated with the platform processor 100. That is, in one optional embodiment, the platform processor 100 may read the data from the data storage 102 for play or display by a player or viewer on the platform and distinguishable from the executable controller stored on the data storage 102.

For example, in one optional embodiment, the data storage 102 stores a virtual operating system executable by the platform processor 100. When executed by the platform processor 100, the virtual operating system creates a virtual operating environment that is separate and independent from the platform operating system. That is, the platform is configured to run a platform operating system, e.g., Windows™ Android™, iOS™, Linux™, or the like. A wrap includes a virtual operating system that, when executed, creates a virtual operating environment that uses virtual operating system resources, for example, libraries, drivers, and applications, that are accessible only to the virtual operating system and, more specifically, are not accessible to the platform operating system.

Figure 17:
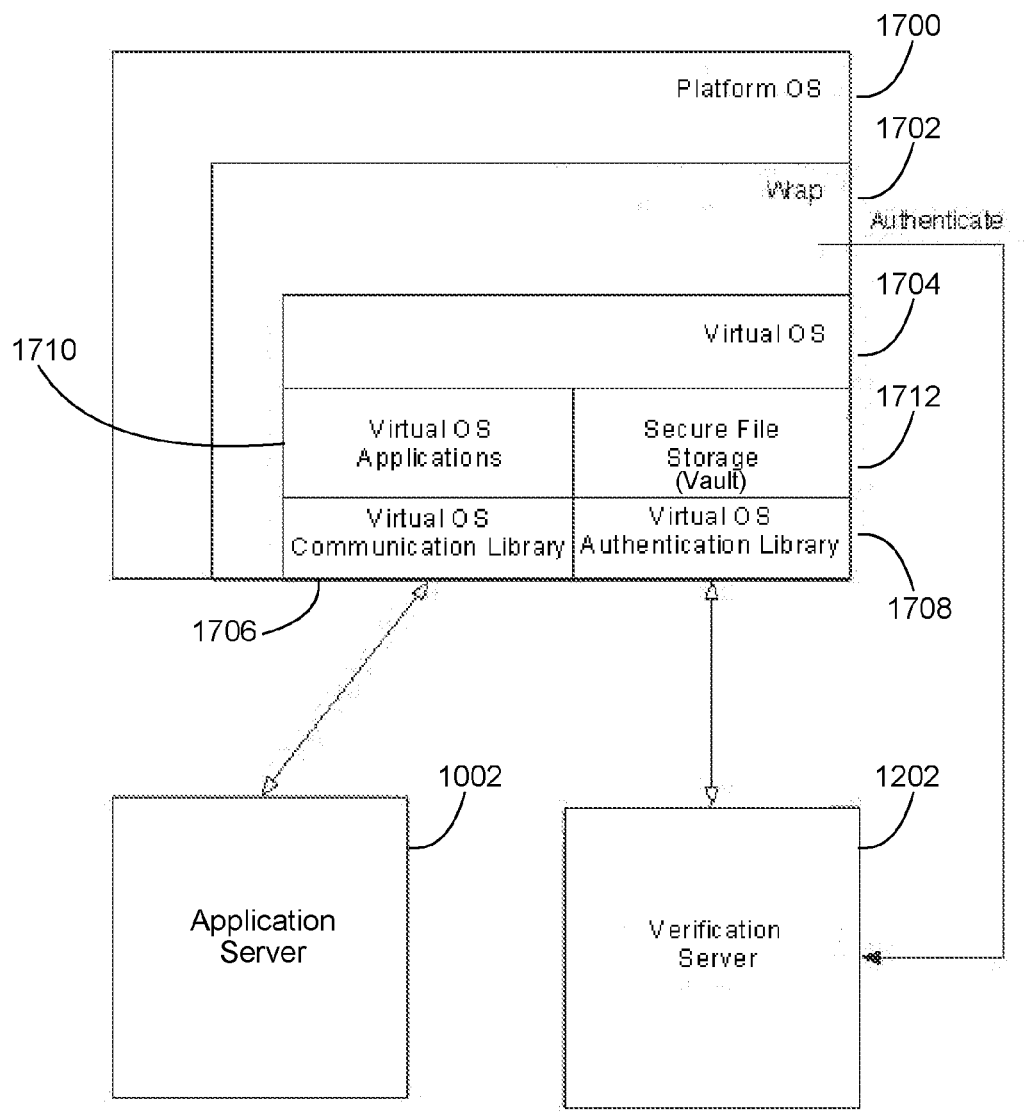
FIG. 17 is a block diagram of a platform data storage according to an embodiment of the present invention.

Thus, in one example illustrated in FIG. 17, a platform 101 is configured to run a platform operating system 1700. A wrap 1702 on the data storage 102 includes a virtual operating system 1704. In this example, the wrap 1702 also includes two virtual operating system libraries, a communication library 1706 and an authentication library 1708. In one such example, a communication library 1706 stores parameters, such as address(es), protocol(s), or the like, needed to communicate with an application server 1002 (described in greater detail below). Continuing with the example, an authentication library 1708 contains parameters, such as unique identifiers, device identifiers, and the like, needed to verify the platform 1102 and/or user with a verification server 1202 (described in greater detail below).

Continuing with the example of FIG. 17, the wrap 1702 may contain virtual operating system applications 1710 which are usable in the virtual operating environment. In one such optional embodiment, virtual operating system applications 1710 may include, for example, applications to view, play, stream, edit, or otherwise use or manipulate data files stored in a secure area 1712 and/or accessed from a data server 902 (described in greater detail below). It is contemplated that any applications may be configured as virtual operating system applications to operate within the virtual operating environment including media players, word processors, media viewers, browsers, email clients, spreadsheets, file managers, or the like. For example, the virtual operating system resources may include customized applications that are configured to run only within the virtual operating environment created by the virtual operating system. For example, in one optional embodiment, the virtual operating system applications could include a media player configured to decrypt an encrypted media stream received at the platform and play the decrypted media stream.

Figure 18:
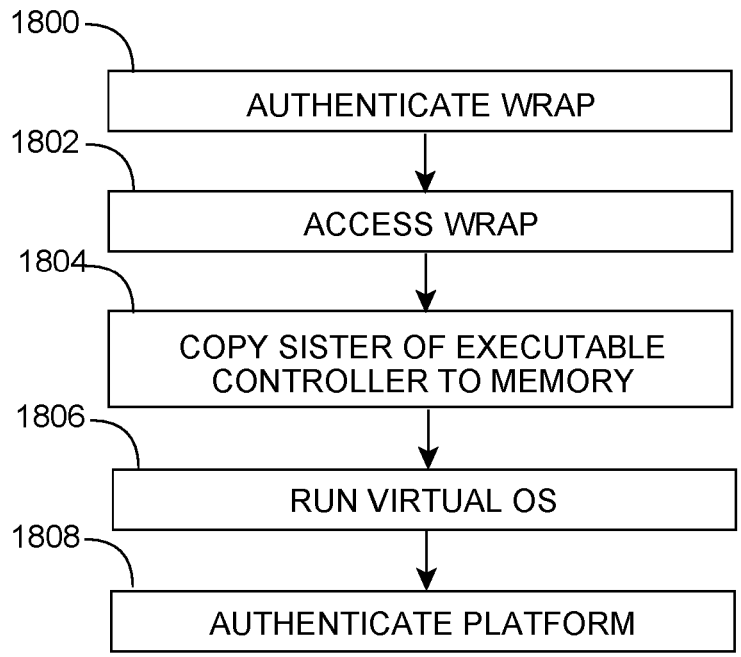
FIG. 18 is a flow chart of a process carried out by a platform processor according to an embodiment of the present invention.

Turning to FIG. 18, in one optional embodiment, the virtual operating system is executed from within the wrap. Thus, in one such optional embodiment, the wrap is verified 1800. In one such optional embodiment, the wrap may be verified through a connection that occurs prior to opening the wrap. Optionally, the verification connection occurs through a verification server as illustrated in FIG. 17. Thus, in one such optional embodiment, multiple connections are serially established by the platform: (a) a connection to a verification server to verify that the wrap can be opened leads to (b) a connection to a verification server after the wrap is opened to verify that the virtual operating system may connect to the application server leads to (c) a connection to an application server. In another optional embodiment, illustrated in FIG. 21, the platform contacts an authentication server which downloads an authentication driver to the platform. The authentication driver authenticates the wrap and/or the platform, then allows the wrap to be opened and the virtual operating system to be run.

Returning to FIG. 18, after verifying the wrap, the wrap is accessed 1802 by the platform processor and a sister of the executable controller is installed 1804 into the memory at the platform. The virtual operating system may be executed 1806 which, as discussed in greater detail below, enables a connection to an application server using the virtual operating system libraries and/or applications within the virtual operating system. The platform is verified 1808, optionally using a verification server, using the virtual operating system resources.

Figure 19:
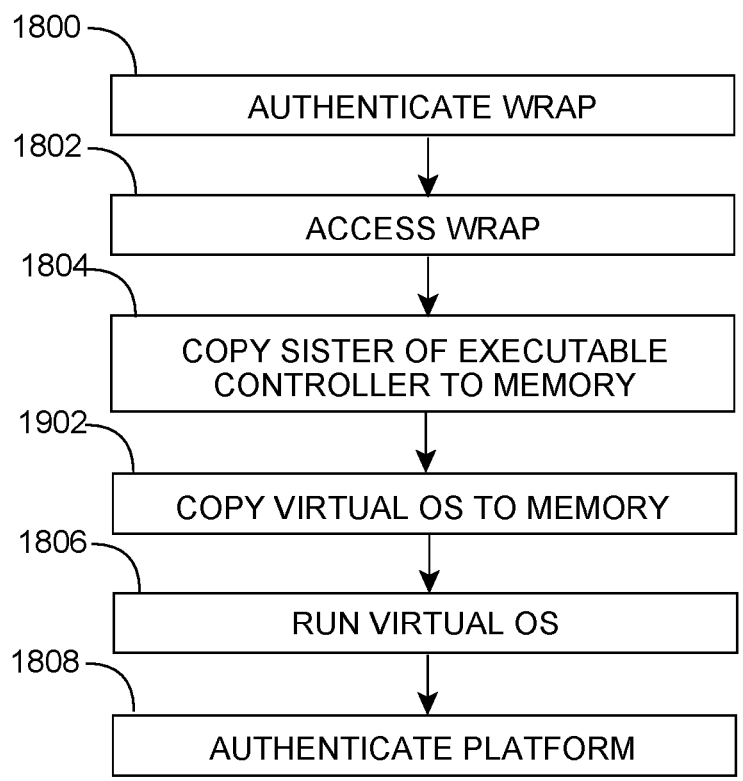
FIG. 19 is a flow chart of a process carried out by a platform processor according to an embodiment of the present invention.

In another optional embodiment illustrated in FIG. 19, the virtual operating system is copied into the memory of the platform and executed from the memory. Thus, in one such optional embodiment, the wrap is verified 1800, optionally through a connection to a verification server. The wrap is accessed 1802 by the platform processor and a sister of the executable controller is installed 1804 into the memory at the platform. After verification, the virtual operating system is copied 1902 to the memory of the platform where it may be executed 1806. The platform is verified 1808, optionally using a verification server, using the virtual operating system resources. In an optional embodiment, the copy of the virtual operating system that is in memory may be deleted from memory when the wrap is closed, either deliberately or due to the executable sensors detecting unauthorized activity.

In the optional embodiment of FIG. 21, the authentication driver performs the functions described for the sister of the executable controller described above. That is, the platform connects to an authentication server 2002 to download 2102 an authentication driver. The authentication driver is installed 2104 to the memory 104 associated with the platform processor 100, and is executed by the platform processor 100 to authenticate 2106 the wrap and/or the platform. Once the authentication is performed, the wrap is permitted to install and run 2108 the executable sensor(s), then load and run 2110 the virtual operating system. In one such optional embodiment, the authentication driver remains in the memory 104 to communicate with the executable controller inside the wrap as the sole conduit to pass data into and out of the wrap. That is, in an optional embodiment, the authentication driver cooperates with the executable controller to automatically and continuously permit or deny access by the platform processor to the data secured by the wrap and the virtual operating system protected by the wrap. In this manner, the data and the virtual operating system are only accessible to the platform processor when both the authentication driver and the executable controller are accessible. However, the platform processor can execute only the authentication driver and is prevented by the wrap from executing the executable controller directly. In such an optional embodiment, the platform processor executes the virtual operating system to create a virtual operating environment at the platform that is separate and independent from the platform operating system. The executable sensor monitors the platform and/or the data storage containing the wrap. Upon detecting an anomaly, the executable sensor denies access to the data secured by said wrap and the virtual operating system by deleting the authentication driver from said memory. This renders the wrapped data and the virtual operating system inaccessible to the platform processor. In a further optional embodiment, the authentication driver may be configured to erase from the memory all data written to the memory by any virtual operating system applications, the wrap, and/or the virtual operating system.

It is contemplated that the virtual operating system may have exclusive access to virtual operating system resources, such as virtual operating system libraries and virtual operating system applications as discussed above. In one such optional embodiment, communication with a verification server to verify the wrap. After verifying the wrap, the wrap is opened, and the virtual operating system is executed. This allows the platform to utilize the virtual operating system resources to verify the platform, initiate a connection to an application server 1002, receive data through the application server 1002 from a data server 902, or the like.

Thus, in one such optional embodiment, a virtual operating system authentication library may store authentication data, such as a unique identifier for the platform device. In an optional embodiment, the unique identifier may be encrypted. The platform may be verified by a verification server 1202 using the unique identifier from the virtual operating system authentication library. Subject to verification, the platform may then connect to an application server 1002 with an address stored in the virtual operating system communication library.

As noted above, the device of the present invention may be part of a system according to an optional embodiment of the present invention. In such a system, a platform 101 may have a fixed or removable data storage 102. In an optional embodiment, the platform processor 100 is physically separate from the data storage 102. The system further includes a memory 104 physically associated with the platform processor 100 and a data storage 102 storing the data, such as media content. As noted above, the memory 104 may be physically associated with the platform processor 100, such as RAM or a hard drive used by the platform processor 100, or may be physically associated with the data storage 102, such as a partition or sub-component of the data storage 102, or may be remote from the platform 101, such as on a networked server 301. In one optional embodiment, the data storage 102, or a sub-component thereof, stores an installer that installs an executable controller, a copy of an executable controller, or a sister of an executable controller on a memory 104 associated with the platform processor 100, e.g. RAM, hard drive, or the like. In this manner, the data storage 102 may contain all the components needed for a platform 101 to use the data storage 102 and read the data stored thereon. In an alternate optional embodiment, the executable controller may be executed directly from the data storage 102 without the need for installation from the data storage 102 to the memory 104.

In a further optional embodiment, a server 301 may be provided. It is contemplated that the server 301 could take many different forms and perform any of a plurality of tasks such as storing files for transfer to and from the platform processor 100, storing the executable controller for operation of the platform processor 100, extracting data such as use record, or the like from the platform processor 100 or data storage 102, or other tasks. In one such optional embodiment, a server 301 may include a server processor 300 and a server data storage 302. Optionally, the server data storage 302 includes one or more records associated to a data storage 102. In an optional embodiment in which the executable controller randomly generate an identifier for the data storage 102, records associated with a data storage 102 may be identified by the identifier for that data storage 102. In one optional embodiment, the address of the server 301 may be hidden from the user by storing the server address inside the wrap. In such an optional embodiment, the executable controller and sister of the executable controller may read the server address from the wrap and establish the connection (optionally through a connection application, browser, file transfer protocol ("FTP") application, communication client, media player, or the like) between the platform 101 and the server 301 without revealing the server address.

Referring to FIGS. 1-8, in use, the data storage 102 is placed in communication with the platform processor 100. As noted above, the data storage 102 is optionally a removable or fixed device, such as a flash memory connecting through a USB port. In such an example, the data storage 102 is placed in communication with the platform processor 100 by connecting to the port. In other examples, the data storage 102 may be a memory card, wireless device, wireless telephone or handheld device, or the like. In such optional examples, the data storage 102 may be placed in communication with the platform processor 100 using a wired or wireless communication link.

The executable controller governing use of the data storage 102 may be pre-loaded in memory 104 associated with the platform processor 100 at the platform 101. In an optional embodiment, a sister of an executable controller may be installed 602 in the memory 104 using an installer. The sister of an executable controller may be installed in memory 104 each time the data storage 102 is connected to the platform processor 100 at the platform 101 or, in an alternate optional embodiment, may persist in memory 104. In a further optional embodiment, the sister of an executable controller may be installed in server memory 304 (such as RAM) physically associated with a server processor 300 in place of, or in addition to, a sister of an executable controller installed in memory 104 at the platform 101. For example, in an optional embodiment, the sister of an executable controller may be installed in server memory 304 at a server 301 when a data storage 102 is connected to a platform 101 in communication with the server 301, thereby rendering the platform 101 merely a display device, input device, or otherwise a "dumb" terminal, with data processing occurring at the server processor 300 using data passed between the data storage 102 and the server memory 304 by the executable controller in the data storage 102 cooperating with the sister of the executable controller in the server memory 304. The installer could be received from, and operate through, any medium. For example, in one optional embodiment, the installer is stored on a computer readable medium, such as a compact disc ("CD"), digital versatile disc ("DVD"), floppy disc, or the like, that is separate from the data storage 102. In another example, the installer may be downloaded from a networked device, such as a file server or the like. In yet another optional example, the installer may be stored on the data storage 102. As noted above, the installer may be stored on a separate sub-component from any sub-component storing games of chance and any sub-component storing any writable credit and use record data.

In these optional embodiments, the installer installs 602 the executable controller or a sister of the executable controller. In an optional embodiment in which the data storage 102 is portable, that is, can be ported to different platform processors 100, the installer may install the executable controller or sister of the executable controller each time the data storage 102 is placed in communication with a platform processor 100 for which the executable controller have been previously installed. It is also contemplated that "portable" may optionally include attributes such easily disconnected and physically removable from the platform as well as easily carried. In an optional embodiment, the data storage 102 may be assigned a unique identifier. A file containing the unique identifier may be stored on a platform 101 and the "autorun" and/or wrap may be configured so that only the data storage 102 with a unique identifier corresponding to the unique identifier stored on the platform 101 operates on that platform 101. For example, in an optional embodiment, a platform 101 may uniquely correspond to a data storage 102 so that data storage 102 devices cannot be swapped and used in a different platform 101.

In another optional embodiment, the executable controller may be stored on, and executed from, the data storage 102. Such an optional embodiment may be directed to an application where it is desired not to store any data or executable controller on a memory 104 physically associated with the platform processor 100. In yet another optional embodiment, illustrated in FIG. 7, the executable controller may be stored on a server 301 and, thus, may not need to be installed or re-installed as the data storage 102 is ported to different platform processors 100.

The data storage 102 may be pre-loaded with a use record and/or data or the like. In another optional embodiment, on the first use 600 of the data storage 102, the user may need to establish 604 a use record and/or obtain data before using the data, such as media content. Where the data includes interactive features, such as a game, it is noted that the present invention may be directed for wagering games in which the use record stores credits that are backed by money, or for entertainment games in which the use record stores credits that are fictional, i.e. not backed by money. Where the credits are fictional, use record stored at the data storage 102 may be pre-loaded with credits or may be enabled to add credits to the use record upon request.

In an optional embodiment, the use record may include a play limit that determines the availability of the data, such as media content. For example, the data may be available for a defined amount of time (including an infinite amount of time), a defined quantity of plays or viewings (including an infinite quantity of plays or viewings), a defined window of time (including an infinite window of time), or the like. For example, a use record could make data available for a twenty-four hour period, two viewings, twelve hours of play, unlimited viewings, unlimited viewings until Jan. 10, 2012, unlimited play until the stored credits are exhausted, or any other play limit.

In an optional embodiment, the play limit may be extended. In an optional embodiment, the play limit may be extended through a financial transaction to purchase additional time, viewings, play, or the like. For example, in one such optional embodiment, the executable controller directs the platform processor 100 to communicate with a server. A user modifies 604 a use record through a transaction with the server, such as by adding time, credits, views, plays, or the like in a transaction that is financial or otherwise. In one optional embodiment, illustrated in FIG. 6, the use record is stored 610 at the data storage 102. In another optional embodiment, illustrated in FIG. 7, the use record may be stored 702 at the server and may optionally be communicated 704 to the data storage 102, memory 104 associated with the platform processor 100, or a combination thereof. For example, a sister of an executable controller may be stored in server memory 304 at a server. The sister of an executable controller may communicate to an executable controller at the data storage 102, bypassing any program instructions executed by the platform processor 100, to directly write to the writable sub-components of the data storage 102.

Referring generally to FIGS. 1-8, where the data storage 102 and/or the server 301 store a use record, placing the data storage 102 in communication with a platform processor 100 may trigger one or more security checks, optionally through the wrap discussed above, to ensure that the use record has not been tampered with. For example, a key or an identifier (both of which may have been generated 606 upon the first use of the data storage as discussed above) may be used to verify that the data storage 102 is authentic and that the data have not been altered since the prior use. In an optional embodiment using a server 301, records stored at the data storage 102 may be checked against records stored at the server 301.

Figure 7:
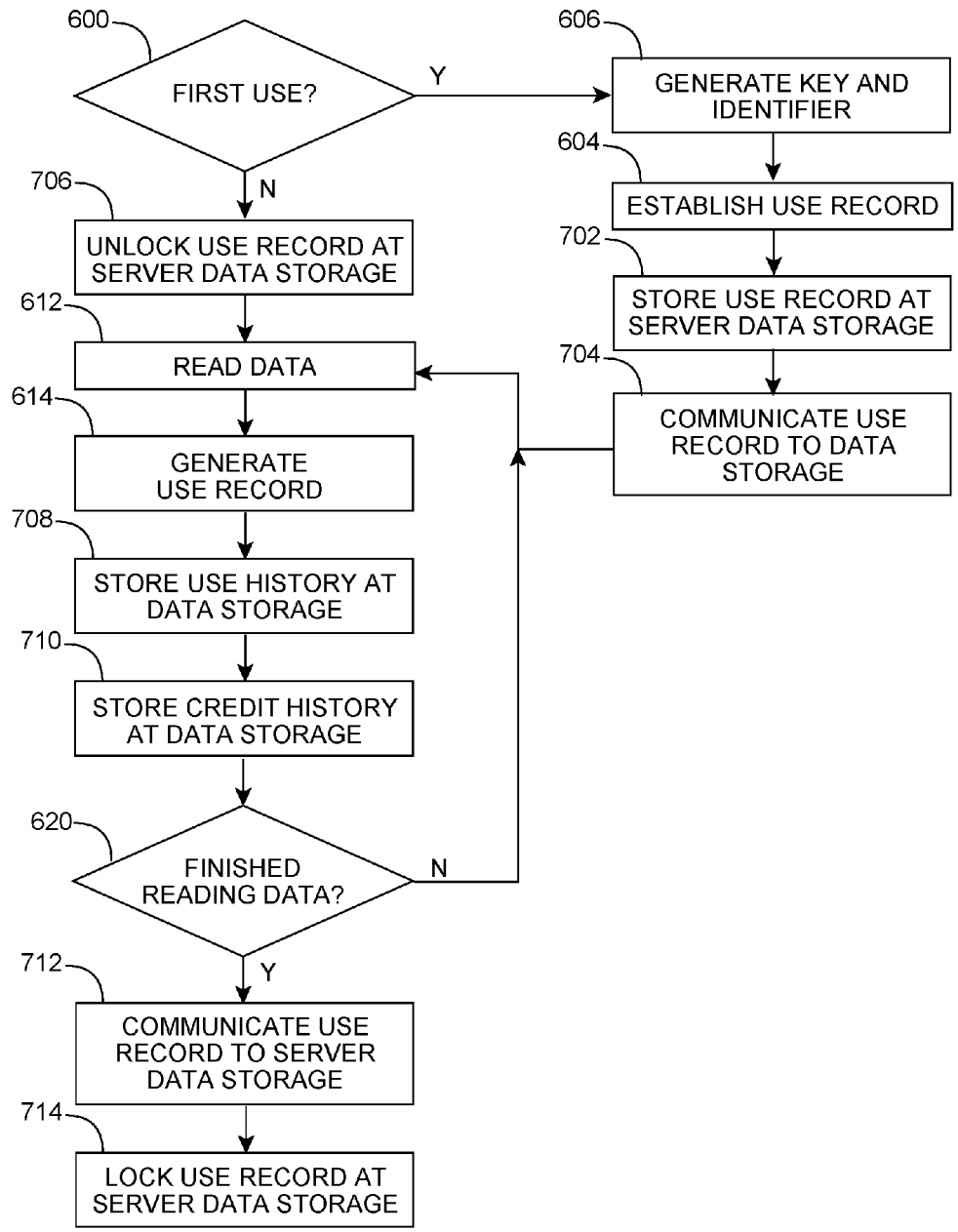
FIG. 7 is a flow chart of a process carried out by a system and device according to an embodiment of the present invention.

As noted above, in an optional embodiment, illustrated in FIG. 7, a use record may be stored at a server 301. Optionally, the use record stored at the server 301 duplicates the use record stored at the data storage 102. For example, in one such optional embodiment, placing the data storage 102 in communication with the platform processor 100 enables the executable controller or sister of the executable controller to "unlock" 706 the use record at the server data storage 302 associated with the data storage 102. Optionally, the use record at the data storage 102 and the server data storage are reconciled 708 so that the use records at both locations match. Continuing with such an optional embodiment, the use record may optionally be temporarily stored 710 at the data storage 102. During play of the data the use record at the data storage 102 may be updated 712 one or more times. At a predetermined time, such as when the data is finished, the record is "locked" 714 until the next game play. In similar fashion, a use record could be stored at memory 104 associated with the platform processor 100, e.g. the use record could be stored, unlocked (either continuously or at discrete points) when the data storage 102 is engaged to the platform processor 100, and locked when the data storage 102 is removed from the platform processor 100.

Figure 6:
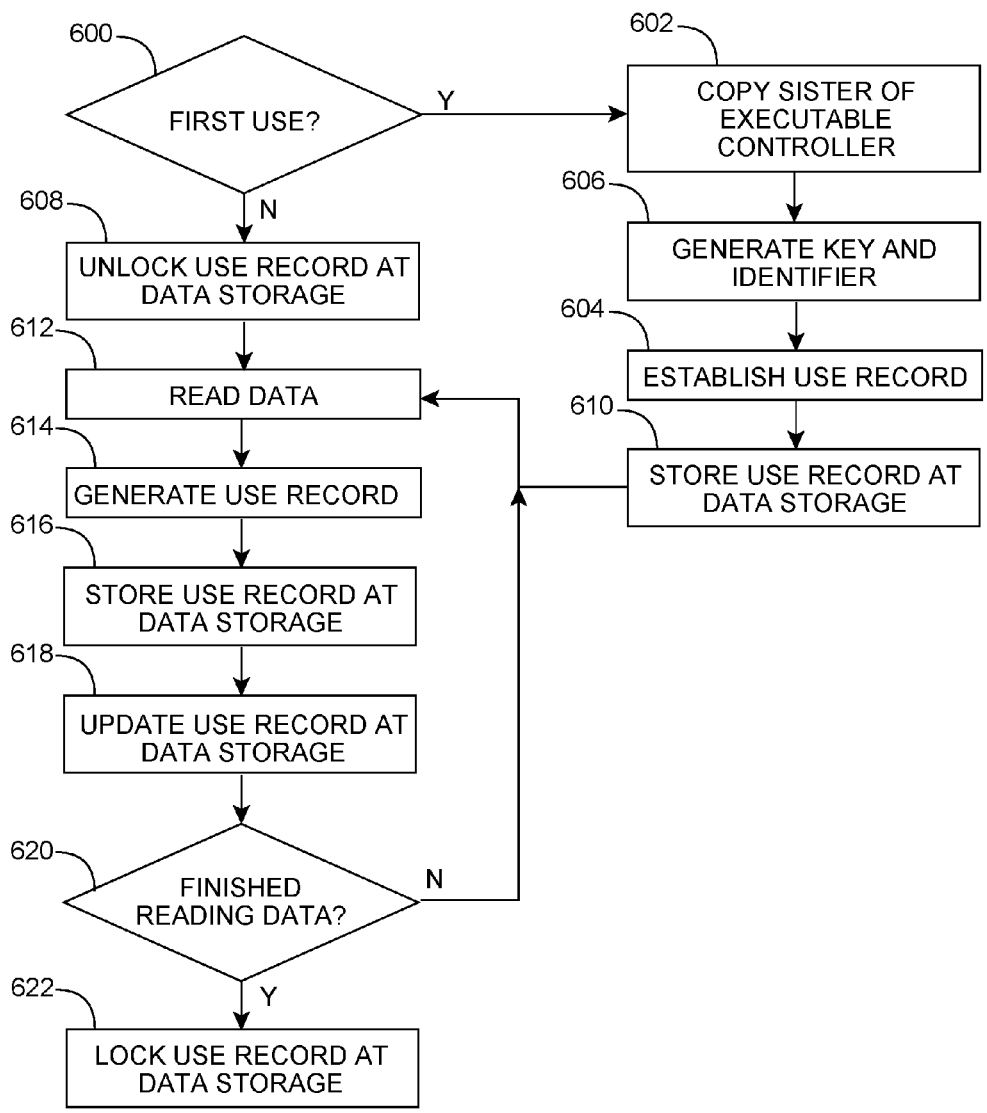
FIG. 6 is a flow chart of a process carried out by a system and device according to an embodiment of the present invention.

In an optional embodiment, illustrated in FIG. 6, the use record is written 610 to the data storage 102, optionally in a writable sub-component 404 of the data storage 102. In a further optional embodiment, the use record and any electronic receipts are encrypted. In one optional embodiment, the use record and/or electronic receipts may be stored at the data storage 102 as well as in at least one additional location, such as a server data storage 302 or a memory 104 associated with the platform processor 100. In another optional embodiment, the use record and/or electronic receipts is stored only at the data storage 102. Optionally, after writing the use record to the data storage 102, the executable controller or the read-write nature of the data storage 102 prevents the alteration or re-writing of the use record. In another optional embodiment, the use record and/or electronic receipts are stored in the wrap and, thus, are secured by the security measures associated with the wrap. In an optional variation on such an embodiment, the executable controller may include some security measure such as a key, identifier, or the like to permit only authenticated transactions and prevent unauthorized viewing, altering, or deleting of the use record and/or electronic receipts.

Referring generally to FIGS. 1-8, the data is read 612 from the data storage 102, optionally by the platform processor 100 at the platform 101. Optionally, the use record (e.g. a financial transaction conducted, a time recorded, a play or viewing deducted, credit or credits deducted, or the like) may be updated 618 in real time to reflect that the data is being read. Similarly, an electronic receipt may be generated to record the use/access to the data. It is noted that in an optional embodiment, the secured data may represent an account (such as an account identifier, credit card number, or the like) and/or authorization to use an account (such as a key, password, or the like).

In this manner, the secured data may be used to conduct a financial transaction. For example, in an optional embodiment, a platform 101 may be a mobile telephone, the data storage 102 may be a memory card or memory chip in the mobile telephone, the memory 104 may be the RAM in the mobile telephone, and the data secured in the vault may include financial account information and a verification key. The data secured in the vault may be accessed by the platform processor 100 and transmitted to a payment processor such as a point-of-sale terminal, cash register, payment server, or the like. In an optional embodiment, the wrapped financial data may be transmitted in a secure fashion by (a) passing the data via the executable controller on the memory card to the sister of the executable controller (or the authentication driver) in the RAM of the mobile device; (b) passing the data from the sister of the executable controller (or the authentication driver) in the RAM of the mobile device to a sister of the executable controller (or the authentication driver) in the RAM of the payment processor (e.g., the point-of-sale terminal, cash register, payment server, or the like); and (c) passing the data from the sister of the executable controller (or the authentication driver) in the RAM of the payment processor into the data storage of the receiving device where the financial transaction may be processed. In turn, after the financial transaction is processed, e.g., payment is accepted, the use record may be updated and/or an electronic receipt may be stored at the mobile device by (a) passing updates to the use record and/or electronic receipt via the executable controller in the data storage of the payment processor (e.g., point-of-sale terminal, cash register, payment server, or the like) to the sister of the executable controller (or the authentication driver) in the RAM of the payment processor; (b) passing the data from the sister of the executable controller (or the authentication driver) in the RAM of the payment processor to a sister of the executable controller (or the authentication driver) in the RAM of the mobile device; and (c) passing the data from the sister of the executable controller (or the authentication driver) in the RAM of the mobile device into the data storage of the mobile device where the use record may be updated and electronic receipt stored, optionally secured by the wrap. After updating, the use record may be "locked" and after storing the electronic receipt inside the wrap, the wrap may be "closed."

Referring generally to FIGS. 1-8, in an optional embodiment, as the data is played or viewed, a use record may be generated 614. As an example, the use record may include data such as the time and date the data was read from the data storage 102, the duration that the data was read from the data storage 102, the quantity of times the data was read from the data storage, or the like. Optionally, as illustrated in FIG. 6, this use record is written 616 to the data storage 102. In a further optional embodiment, illustrated in FIG. 7, in which the system includes a server 301, the use record may be communicated 712 to the server 301. The communication of the use record to the server 301 may take place in real time, periodically, upon demand, or on any other basis. For example, in one optional embodiment, the use record is communicated 712 to the server 301 when the data is finished.

Referring generally to FIGS. 1-8, in an optional embodiment, the player may signal that the data is finished; in one example, the user may actuate an "exit" or "disconnect" button. In an optional embodiment in which a use record is stored on the data storage 102, the signal of the end of game play 620 may cause the executable controller and/or sister of the executable controller to finally update the use record and "lock" 622 the use record and/or the data from being altered or rewritten until the data storage 102 is again engaged to a platform processor 100 and the executable controller and/or sister of the executable controller unlock 608 the data storage 102. As noted above, the executable controller stored at the data storage 102 may also communicate with executable sensors in the form of software or firmware to determine whether the data storage 102 is connected to the platform and, upon disconnection from the platform, lock the data and/or the use record. Optionally, sensors may lock the media content and/or use record even if the programs instructions fail to receive an "exit" or "disconnect" command. As noted above, in an optional embodiment, the data storage 102 may include a power source, such as a battery backup, which permits the executable controller and/or sister of the executable controller to write a final update in the event that the data storage 102 is disconnected from the platform 101 or loses power from the platform 101. In one such optional embodiment, the final update also includes the state of the data used by the platform so that the data may be resumed uninterrupted when the data storage 102 is reconnected or power is restored. For example, where the data is streamed (e.g., a movie, song, or the like), the final update may include the exact place where the streaming was interrupted. Where the data includes a game program, the final update may include the game state, including the random number generator seed, at the time the game was interrupted.

In an optional embodiment, such as that illustrated in FIG. 7, in which a server data storage 302 stores use record and/or use record, the end of the data (whether signaled by the user or otherwise detected) may trigger the communication 712 of the use record to the server data storage 302. Optionally, the use record may be locked 714 at the server data storage 302 from being altered or rewritten until the data storage 102 is engaged to a platform processor 100 and an executable controller notifies the server data storage 302 that the associated data storage 102 is engaged and that the use record may be unlocked 706.

Example embodiments are now described in greater detail. These embodiments should be construed as exemplary only and their description herein should not be interpreted as limiting the alternative embodiments described above or recited in the claims presented.

In one example embodiment, the data storage 102 is a removable flash memory connectable to a platform 101 through a USB port or data card slot. The wrap on the data storage 102 is partitioned into at least three sub-components with one sub-component storing data, one sub-component storing an executable controller or an installer for installing an executable controller (depending on the optional embodiment), and one sub-component containing writable storage.

When the data storage 102 is engaged to a platform 101, the platform processor 100 executes the executable controller, or executes the installer to install the executable controller or a sister of the executable controller in a memory 104 associated with the platform processor 100. In an optional embodiment in which the executable controller is executed from the data storage 102, the executable controller may be executed without installing anything at the memory 104 associated with the platform processor 100. In another optional embodiment in which the executable controller is executed from the data storage 102, the executable controller may be executed while temporarily borrowing memory 104 associated with the platform processor 100 for a sister of the executable controller. Under the direction of the executable controller and optional sister of the executable controller, the platform processor 100 optionally assigns a random identifier to the data storage 102 and generates a key, optionally encrypted, and stores the key on the data storage 102 and in memory 104 at the platform 101.

The platform processor 100 accesses a use record at the data storage 102 via the sister of the executable controller and executable controller. In one such optional embodiment, the use record is created by the platform processor 100. In another optional embodiment, the use record is created and stored on the data storage 102 when the wrap is created. In an optional embodiment, a use record is created by establishing a communication link between the platform and a server and conducting a financial transaction. The use record is stored on the data storage 102 and the executable controller may optionally prevent access to alter or rewrite the use record.

The data is read from the vault by the platform processor 100 through the executable controller and optional sister of the executable controller. Optionally, the platform processor 100 plays or displays the data to the user with a media player or viewer separate from the executable controller stored at the data storage 102. For example, in an optional embodiment, data may be read from the data storage 102 and played or viewed using a media player or viewer installed at (and executed from) the platform 101. As the data is read from the data storage 102, the platform processor 100 generates and updates a use record that is stored at the data storage 102. In an optional embodiment, data is read directly from the data storage 102 without storing the data at the memory 104 associated with the platform processor 100.

To adjust the play limit stored in a use record, e.g. to purchase additional views or plays of the data the data storage 102 is engaged to a computer platform. This may or may not be the same platform 101 used to conduct the game of chance. For example, in an optional embodiment, a user may change the play limits for data at a kiosk. Optionally, the kiosk may also be used to add new data to the data storage 102. In one such optional embodiment, the executable controller may direct communication with the kiosk. The kiosk may be a standalone device that has authority to add data alter play limits, or the like, or the kiosk may function as a gateway to a server or other device. Optionally, the executable controller, sister of the executable controller, and/or sensors may conduct integrity checks on the use record to attempt to detect alterations or tampering with the data. The kiosk (or server) verifies the use record and, if the use record is verified, the player is enabled to add to the play limit stored at the use record, optionally in exchange for payment, or the like. After the transaction, the use record is updated at the data storage 102 by the kiosk (directly or under the direction of a server).

In an alternate optional embodiment, the data storage 102 may use the platform 101 to conduct such transactions. For example, in an optional embodiment in which the platform 101 is in the form of a cellular telephone, personal computer, or the like, the platform 101 may be able to directly communicate with a server. In one such optional embodiment, the platform 101 may communicate with a server to verify the use record, adjust play limits, download data or the like.

In another example embodiment, the data storage 102 is a flash memory connectable to a platform 101 through a USB port, data card slot, or the like, or a hard drive or other drive connected through an interface with the motherboard of the platform 101. The wrap on the data storage 102 stores data and includes a sub-component 404 with writable storage. In this optional embodiment, executable controller is stored at a server 301 in communication with the platform processor 100.

When the wrap on the data storage 102 is mounted at a platform 101, an "autorun" stored on a data storage 102 may include executable instructions to run sensors from the memory 104 of the platform 101. The sensors may be copied from a server 301 or the data storage 102. If the sensors deem the platform 101 to be safe, i.e., no anomalies are sensed, the "autorun" may executable instructions that authorize a server 301 to copy a sister of an executable controller to memory 104, such as RAM, associated with the platform processor 100. Alternatively, an "autorun" may cause a sister of an executable controller to be installed from the data storage 102 into the memory 104, such as RAM, associated with the platform processor. The platform processor 100 executes the sister of the executable controller from the memory 104 and the executable controller from the data storage 102. Once the sister of the executable controller establishes a connection with the executable controller on the data storage 102, the data storage 102 is readable by the platform 101 and/or server 301 via the cooperation between the executable controller stored on, and executed from, the data storage 102 and a sister of the executable controller stored on, and executed from, memory 104 at the platform 101.

In another such optional embodiment, the executable controller may cooperate with a sister of the executable controller in server memory 304 at a server 301 communicating with the platform 101. Optionally, a sister of the executable controller may be copied to server memory 304 from server data storage 302 or, alternatively, from the data storage 102 connected to the platform 101 communicating with the server 301. It is contemplated that the sister of the executable controller may be copied to, and executed from, server memory 304 in response to running an "autorun" associated with the wrap stored on a data storage 102 at a platform 101. Likewise, a sister of the executable controller may be removed by a server processor 300 upon detection of an anomaly by executable sensors (described in greater detail above) or may persist in the server memory 304 independent of the executable sensors. That is, in one optional embodiment, when the executable sensors detect an anomaly, a sister of the executable controller may be removed from server memory 304 and the data storage 102 secured. In an alternate optional embodiment, an anomaly may merely result in the data storage 102 being secured.

In an optional embodiment, the executable controller may be executed without storing anything at the memory 104, or by temporarily borrowing memory 104 at a platform 101 for a sister of the executable controller. Under the direction of the executable controller and optional sister of the executable controller, the platform processor 100 and/or server processor 300 assigns a random identifier to the data storage 102 and generates a key, optionally encrypted, and stores the key on the data storage 102 and in memory 104 associated with a platform processor 100 and/or server memory 304 (and/or server data storage 302) associated with a server processor 300.

In one optional embodiment, the platform processor 100 establishes a use record, such as by communicating with a server 301 and conducting a financial transaction. In another optional embodiment, the server processor 300 establishes a use record, such as by conducting a financial transaction. The use record is stored in a record on the server 301 (such as at server data storage 302), associated with the data storage 102, and stored at the data storage 102. Optionally, the use record at the data storage 102 is treated as a backup and stores a limited number of transactions, such as the most recent transactions, while the use record stored on the server 301 stores all transactions. In such an optional embodiment, it is contemplated that the use record may be updated in batches or in real-time, i.e., changes or updates to the use record made at either the server 301 or the platform 101 may be propagated in real time to the other via the sister of the executable controller in the server memory 304 at the server 301 communicating with the sister of the executable controller in the memory of the platform 101.

The data secured in the vault are read by the platform processor 100. As the data, executable game program, or the like, are read, the platform processor 100 generates and updates a use record that is stored at the data storage 102 and the server data storage 302. Optionally, the record is updated in real time. As suggested above, in an optional embodiment, the use record stored at the data storage 102 may be truncated with, for example, old transactions deleted as new transactions are recorded. In this respect, the data storage 102 or at least the sub-component of the data storage 102 storing the use record may be readable and writable.

To adjust the use record, e.g. to purchase additional plays or views of the data the data storage 102 may be engaged to a computer platform. This may or may not be the same platform 101 used to read data secured in the vault from the data storage 102, e.g., play media content, execute game programs, and so forth. In one such optional embodiment, the executable controller communicates the identifier associated with the wrap on the data storage 102 (and optionally a key associated with the data storage 102) to a server 301. The server 301 verifies the use record in the wrap at the data storage 102 against the use record at the server 301 and, if the use record is verified, the player is enabled to change the play limits stored in the use record, add data or the like. After the credit transaction, the updated use record is stored at the server 301 in a record associated with the data storage 102.

Figure 8:
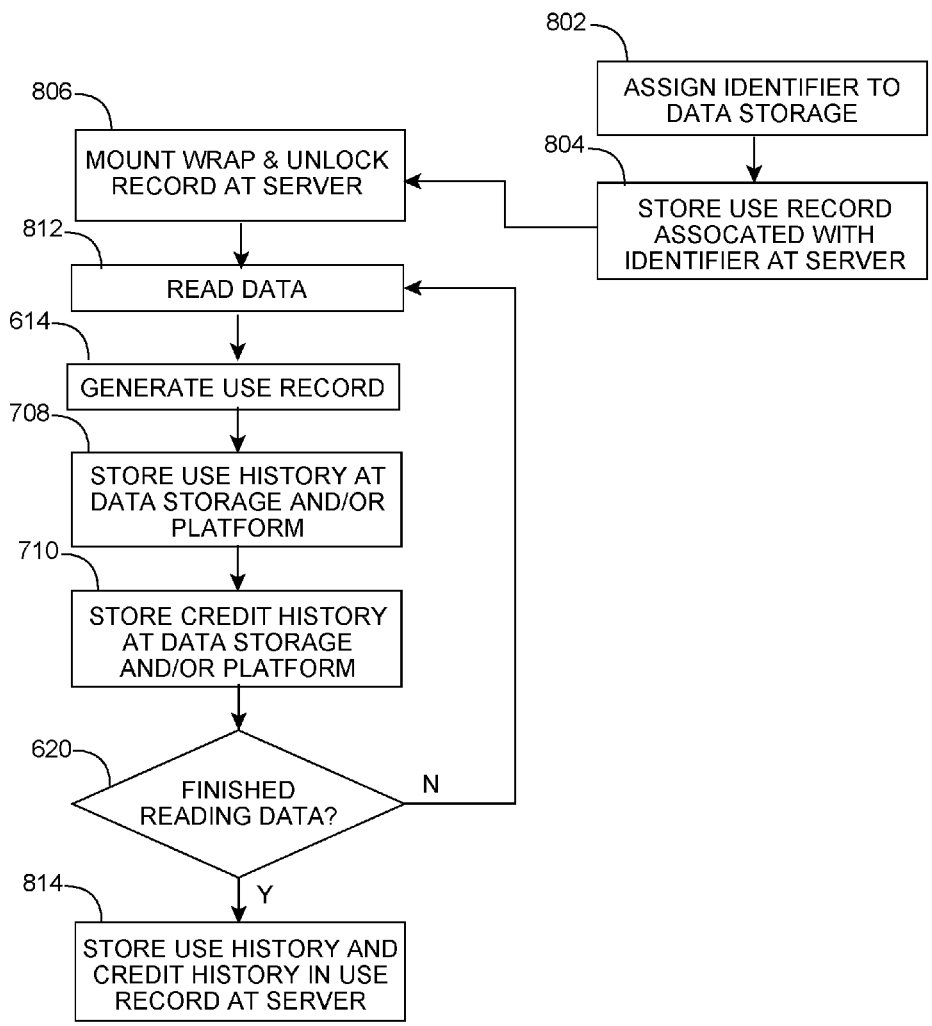
FIG. 8 is a flow chart of a process carried out by a system and device according to an embodiment of the present invention.

In yet another example embodiment, illustrated in FIG. 8, the data storage 102 may store data inside a vault but does not store an executable controller or an installer. The data storage 102 is assigned 802 a unique identifier that is associated with a record stored 804 at the server data storage 302 associated with the server 301. The record associated with the unique identifier may optionally include a use record (optionally including play limits and the like). The use record may include separate play limits for each unit of data and/or play limits applicable to all data, such as media content.

The data storage 102 is connected 806 to the platform 101, either in a fixed or removable manner, such as through a USB port, card slot, or the like. The platform 101 already stores the executable controller in memory 104 associated with the platform 101. Alternatively, the platform 101 communicates with a server 301 that stores an executable controller or sister of the executable controller in server memory 304 associated with the server 301. In yet a further optional embodiment, a sister of the executable controller is copied from the server 301 to memory 104 at the platform 101. Optionally, the platform 101 is configured for use with the data storage 102 such as through security procedures that allow the platform 101 to verify the data storage 102 and the data storage 102 to verify the platform 101. The platform 101 communicates with a server 301 through a network, such as a local area network ("LAN"), wireless connection, or the like, that allows the server 301 to communicate directly or through the platform 101 with the data storage 102.

In this example embodiment, by mounting 806 the data storage 102 at the platform 101, the data storage 102 enables the transfer of data (such as a use record) from the server 301 to the platform 101, or otherwise unlocks the record stored at the server 301. The data secured in the vault is read 812.

In an optional embodiment in which the use record includes a use history and a credit history, the use history is generated 614 and stored 708, at least temporarily, at the data storage 102 and/or at the platform 101. Similarly, the credit history may be tracked and stored 710, at least temporarily, at the data storage 102 and/or the platform 101. Optionally, electronic receipts may be generated as credits are purchased, used, wagered, or otherwise transacted. The use record, e.g., use history and credit history as well as any electronic receipts, are transferred 814 to the server 301 at a predetermined point, such as when the data is finished 620 or the data storage 102 is disconnected from the platform 101. Optionally, a portion or all of the data transferred to the server 301 are backed up at the platform 101 and/or the data storage 102.

In yet another optional example, the data storage 102 is connected to the platform 101 which communicates with a server 301 and the "autorun" prepares the platform 101. An installer in the wrap copies a sister of the executable controller to server memory 304 associated with the server 301. The executable controller stored on, and executed by the server processor 300 from, the data storage 102 cooperates with the sister of the executable controller stored on, and executed by the server processor 300 from, server memory 304 associated with the server 301. In such an optional embodiment, the platform 101 serves primarily as a display device and input device, e.g., a dumb platform 101. In an optional embodiment in which the data is an executable game utilizing a random number generator, the random number generator may be executed at the server 301 either as a separate routine, or as part of the sister of the executable controller, or as part of the game program extracted from the data storage 102 by the server processor 300.

The data is passed from the data storage 102 to the server processor 300 via the executable controller in cooperation with the sister of the executable controller. Optionally, a use record consisting of a use history and a credit history is stored at the data storage 102 in real time as the data is delivered to the platform 101. Again, to be clear, in this example, the server processor 300 at the server 301 utilize a sister of the executable controller at server memory 304 in cooperation with an executable controller at a data storage 102 to deliver data from the data storage 102 to the platform 101. In one such optional embodiment, the server processor 300 generates a use history and directly passes the use history, via the sister of the executable controller to the executable controller, to the data storage 102, thereby bypassing the platform processor 100 and memory 104 at the platform 101. Again, this may occur in real time. Optionally, the use history may also be stored at server data storage 302. In one such optional embodiment, the use history at the data storage 102 may be erased serially so that the use history at the data storage 102 only stores the most recent transactions and/or events, while the use history at the server data storage 302 stores the complete history.

Figure 9:
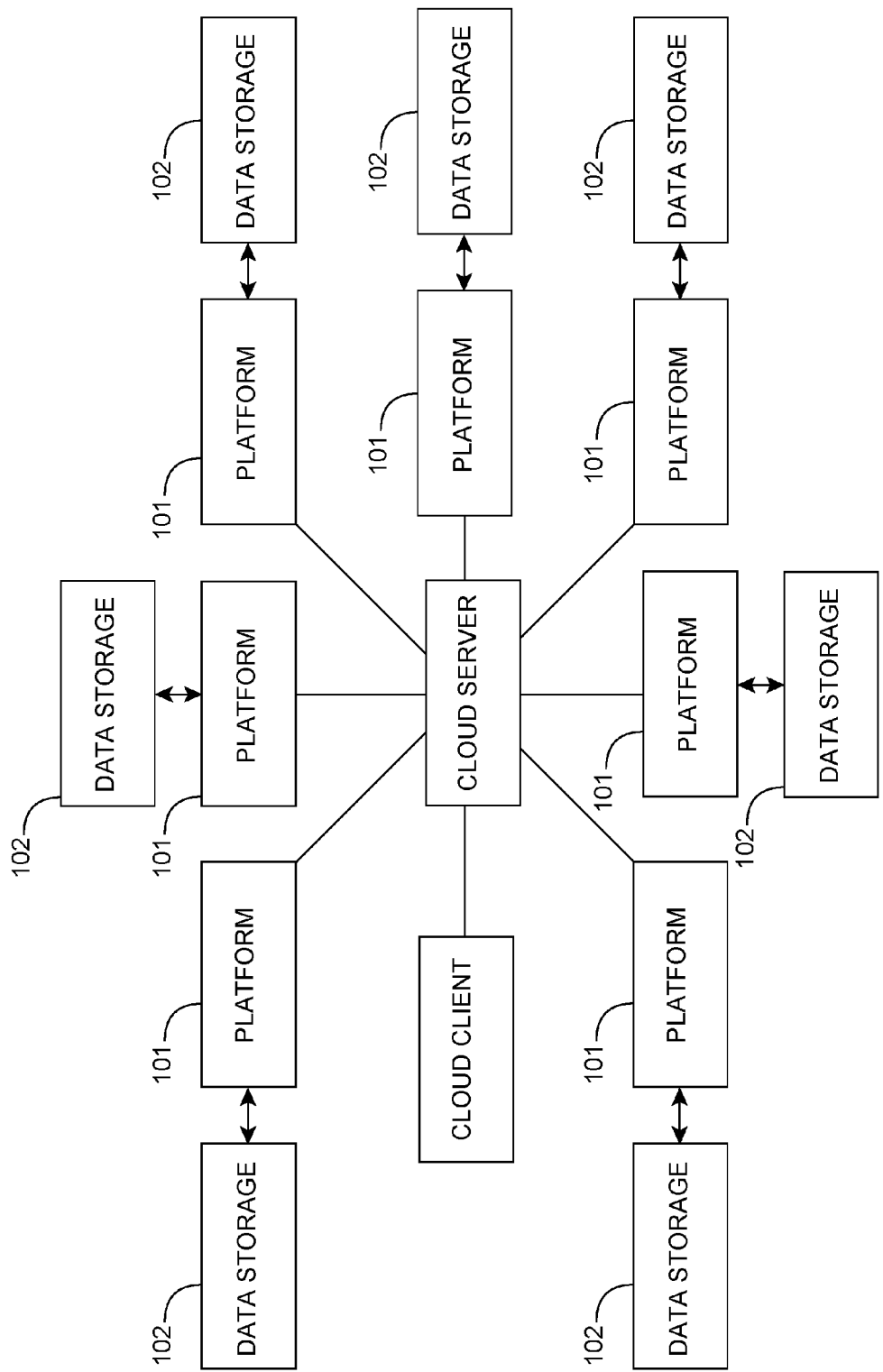
FIG. 9 is a block diagram of a system according to an embodiment of the present invention.

As noted above, data may be wrapped on the platform and/or server to secure the data from unauthorized access. For purposes of avoiding confusion regarding which devices are interchangeable, components illustrated in FIG. 9 are numbered anew, even where those components share the same name as in earlier figures. This should be interpreted as allowing, but not necessarily requiring, that the devices illustrated in FIG. 9 may share the characteristics of devices previously described with respect to earlier figures.

Figure 10A:
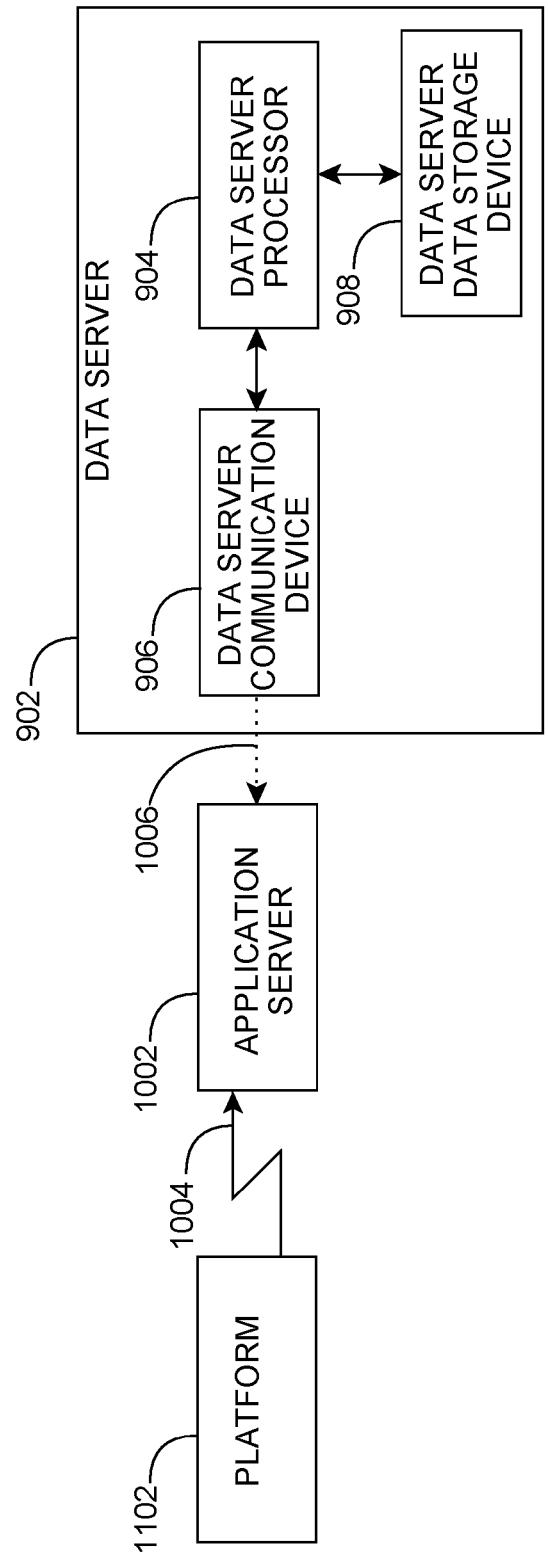
FIG. 10A is a block diagram of a system according to an embodiment of the present invention.
Figure 10B:
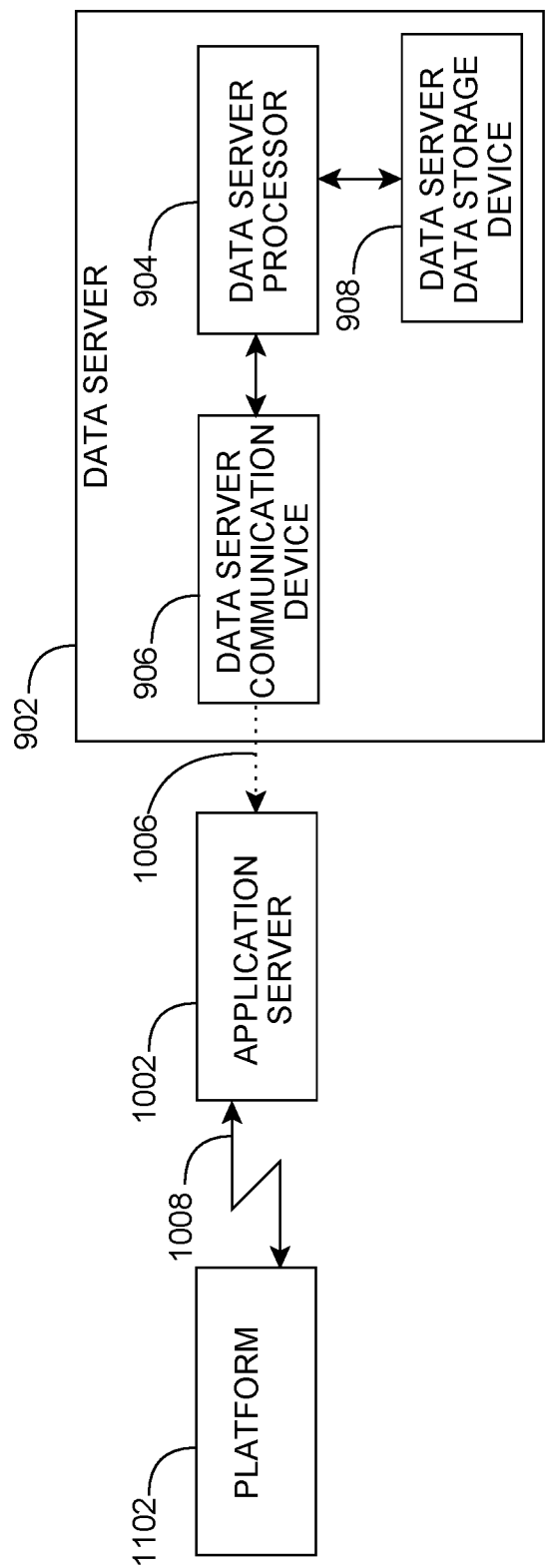
FIG. 10B is a block diagram of a system according to an embodiment of the present invention.
Figure 10C:
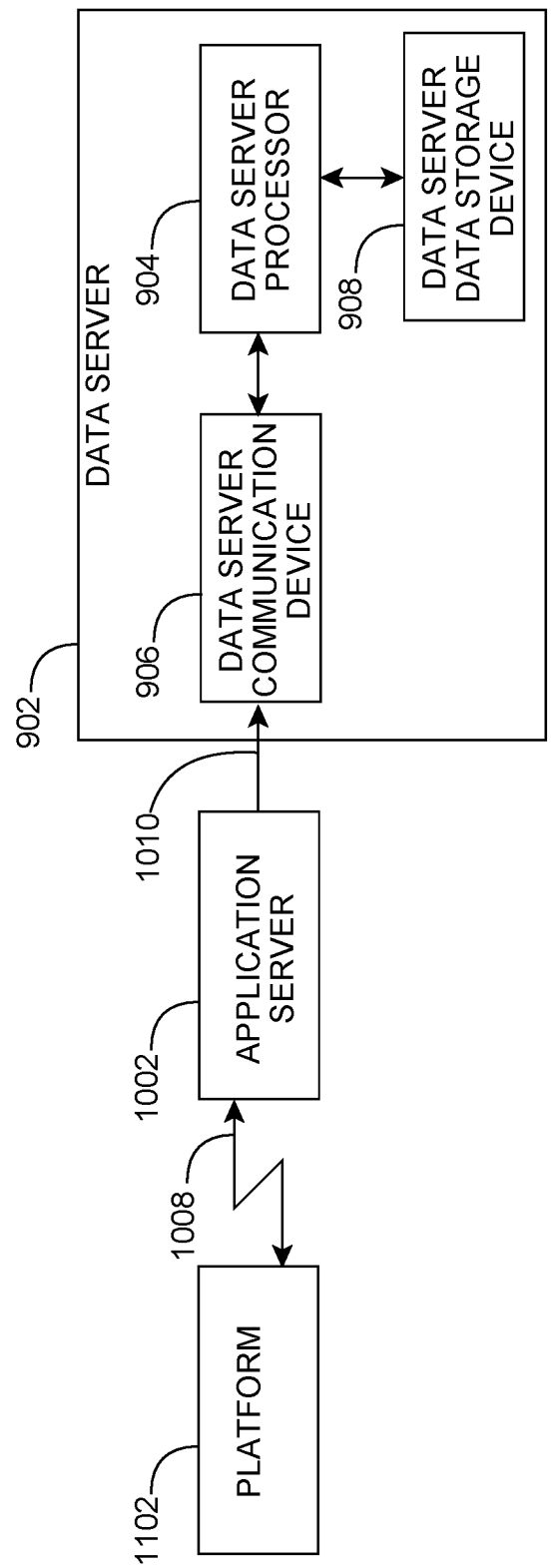
FIG. 10C is a block diagram of a system according to an embodiment of the present invention.
Figure 10D:
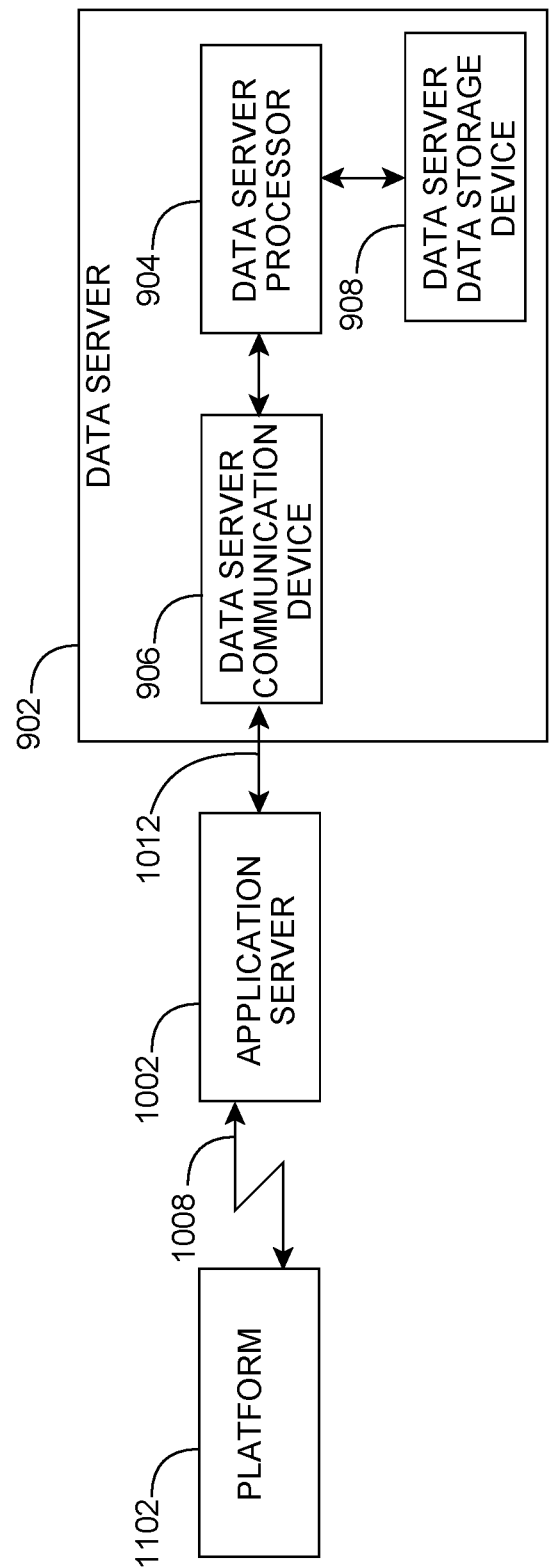
FIG. 10D is a block diagram of a system according to an embodiment of the present invention.
Figure 11:
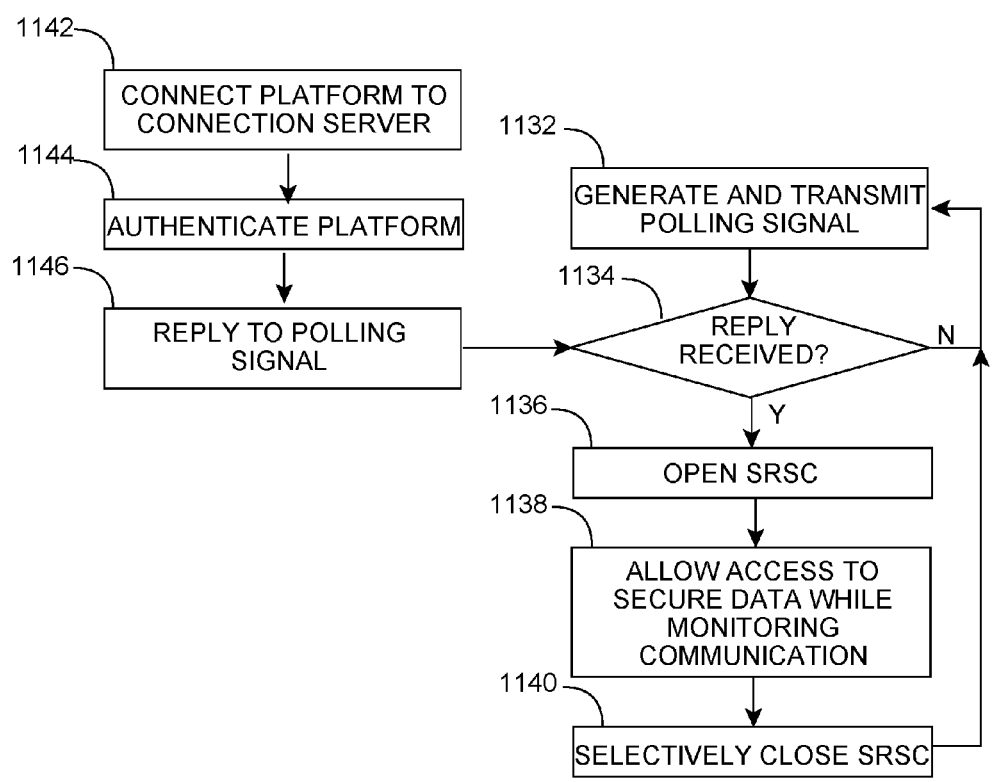
FIG. 11 is a flow chart of a process carried out by a system and device according to an embodiment of the present invention.

Referring now to FIGS. 9-11, the present invention may additionally or alternatively include certain improvements in a server. The servers (referred to herein as a data server 902 and an application server 1002) may be managed servers as that term is used conventionally, i.e., could be housed and maintained by a third party. In an optional embodiment, a benefit of the various embodiments of the present invention is that secured data may be stored on a data server 902 managed by a third party because neither the third party nor a hacker using the third party's infrastructure would have any advantage in gaining access to the secured data over an outside hacker. As described in greater detail below, the data server 902 has normally closed ports which are only opened when an application server 1002 presents an authenticated request for access to the secured data. A data server 902 would, in this optional embodiment, be configured to reject any request originating from a device or location other than an application server 1002 within the system and refuse to open a port for access to the secured data. Additionally or alternatively, when the data server 902 opens a port in this optional embodiment, the port address is randomly generated and hidden from the application server 1002. Thus, a hacker may be thwarted by his or her inability to find an open port and, even if an open port may be found, would be unable to access secured data because the request to access the data would originate from a device other than an application server 1002.

More specifically, in one such optional embodiment, a data server 902 and application server 1002 cooperate to secure the data server 902 itself from unauthorized access. As an overview, an embodiment of the present system includes one or more data servers 902 in communication with one or more application servers 1002. The application servers 1002 may serve any purpose, but may be viewed as gateways for accessing the data server(s) 902. Thus, it should be noted that the platform(s) 1102 illustrated in FIG. 10A could store a wrap as described above, and application server(s) 1002 illustrated in FIG. 10A could communicate with the platform(s) 1102 illustrated in FIG. 10A using sister-to-sister communication as described above. Alternatively, a different method may be used to connect the platform(s) 1102 and application server(s) 1002, including conventional network and communication protocols. For example, in an optional embodiment, the platform 1102 could be a conventional device enabled for communication via the Internet using a wired or wireless communication device, and the application server 1002 may be a conventional world wide web server.

The data server 902 includes a data server processor 904 in communication with a data server communication device 906 and a data server data storage device 908. The data server communication device 906 is configured for communication with an application server 1002. In an optional embodiment, the data server communication device 906 is not connected to the Internet or any similar open network. That is, in an optional embodiment, the application server 1002 is the only pathway to the data server 902 from an open network, e.g., the Internet. In such an optional embodiment, the only physical connection with the data server 902 may be to one or more application servers 1002.

Referring to FIGS. 9-11, to aid in this, there exists no "always-open" port for connection between the application server 1002 and the data server 902. Rather, the data server processor 904 assigns a polling port for use by the data server communication device 906. The data server processor 904 generates and transmits 1132 to the application server 1002 a polling signal and monitors 1134 for a reply signal or other predetermined event. The polling signal may be a regular periodic signal, although it does not necessarily need to be regular or periodic. In an optional embodiment, no commands or communications through the polling port are permitted other than the polling signal and reply. In this regard, an optional embodiment may include closing the polling port between discrete polling signals (including a period permitted for reply) and the ensuing discrete polling signal.

When a reply is received at the data server 902 to the polling signal (or other predetermined event occurs), the data server 902 may open 1136 a secure random socket connection ("SRSC"). An SRSC, for purposes of this description, is a communication port used by the server communication device 906 with an address that is randomly selected by the data server processor 904 and hidden from the application server 1002 until after the SRSC is opened. In an optional embodiment, an application server 1002 also uses a secret port address. In an optional embodiment, the port address used by the application server 1002 is known only to the application server 1002 and the data server 902. Thus, in one optional embodiment, the application server 1002 sends a properly formatted (and optionally authenticated) reply to the polling signal and opens its secret port. At substantially the same time, the data server 902 randomly selects a port address for the SRSC and connects to the application server 1002 using the application server's secret port. To summarize, the port used by the data server communication device 906 at the data server 902 is the SRSC with a randomly selected, hidden address, while the port used by the application server 1002 is a secret port with an address known only to the application server 1002 and the data server 902. In this manner, the application server 1002 passes a first level of authentication by merely replying to the polling signal and being available at the secret port address. If, for example, the application server 1002 fails to reply to the polling signal in the correct fashion and/or within a defined time window of a polling signal, the data server 902 could assume the "reply" was not sent from an application server 1002, but from a possibly malicious device. Similarly, if, for example, the application server 1002 fails to be available at the secret port address within a specified time after replying, the data server 902 could assume the "reply" was not sent from an application server 1002. It is contemplated that additional checks, verifications, and authentications may occur between the data server 902 and application server 1002, either before, during, or after the reply to the polling signal and/or the opening of the SRSC occurs to authenticate that the application server 1002 is a trusted device.

The SRSC may be used by the application server 1002 to access 1138 secured data on the data server 902. In an optional embodiment, any SRSC is used only for a limited time and/or limited number of transactions and/or limited amount of access after which the SRSC is closed 1140. For example, in an optional embodiment, the secured data includes data files (although the exact format does not matter, the data files could be, for example, documents, movies, music, images, accounts, such as financial accounts, or the like). In this regard, an SRSC may be static or dynamic. For example, in one optional embodiment, a dynamic SRSC is closed after each access occurs, such as to download, upload, update, copy, or the like, and a new SRSC must be opened to access the next file. However, in an optional embodiment, once the platform 1102 and application server 1002 have been verified, the process of closing an SRSC after accessing a file and opening a new SRSC for the next access command may be performed without again verifying the platform 1102 and/or application server 1002. That is, this process may be essentially invisible to the user, who may be unaware that each file is downloaded from the data server 902 using a different dynamically assigned SRSC. From the point of view of hackers, however, using a different SRSC address, which is hidden and randomly selected, for each access of secured data may frustrate efforts to hack into the secured data. In yet another optional embodiment, the SRSC may be maintained open to allow real-time communication from the data server 902. In one such optional embodiment, the SRSC may be maintained open so long as the connection is active, with the SRSC closing when the connection goes idle or is idle for a predetermined amount of time.

In an optional embodiment, the SRSC may be monitored 1308 by the data server 902 to reduce the risk of unauthorized access. For example, in one optional embodiment, the SRSC may be monitored by the data server 902 for an idle connection. As may be appreciated, an open idle connection could risk discovery by a hacker. In an optional embodiment, an idle connection may trigger the data server 902 to close an SRSC. In an additional or alternative embodiment, commands directed to the data server 902 (from or through the application server 1002) may be monitored and compared to prohibited commands. For example, downloading a document from a user's directory may be permitted but attempting to browse other users' directories may be prohibited. Receipt of a prohibited command may likewise trigger the data server 902 to close an SRSC. It is contemplated that other characteristics of the connection and communication between the data server 902 and application server 1002 may also be monitored and trigger the data server 902 to close the SRSC, e.g., by looking for signs characteristic of hackers, viruses, key loggers, bots, debuggers, or the like.

Returning to FIG. 10A, a platform 1102 may be included in the system. A platform 1102 may take any form, including a personal computer, mobile device, tablet device, PDA, embedded device, cellular telephone, or the like. As may be appreciated, an application server 1002 may be utilized by multiple platforms 1102, e.g., the application server 1002 may be a node within a network of platforms 1102.

In an optional embodiment, a platform 1102 may utilize an interface to establish a connection to the data server 902 via an application server 1002. This interface may take any form, including a web browser, a custom application, a function integrated into an application or an operating system, or any other form. Similarly, the interface may be embodied in software, firmware, or hardware. In an optional embodiment, the interface may be secured inside an executable wrap, as discussed above, and work with, or be integrated into, an executable controller which creates a sister of itself in the memory of the platform 1102 to establish a secure path for accessing the contents of the wrap including, for example, the interface.

For example, drawing from the discussion above, the wrap and sister of the executable controller stored at the platform 1102 may be executed by a platform processor 1104 to secure and monitor the platform 1102 and connect 1142 to an application server 1002. After the connection between the platform 1102 and application server 1002 is established, the platform may be authenticated 1144. An illustration of a system in this state is shown in FIG. 10A. In this state, a platform 1102 is connected 1004 to an application server 1002, optionally using a hidden port at the application server 1002, although an SRSC could also be used at the application server 1002 at this point. In this example, however, it is contemplated that an ordinary public, open port, or a hidden port, or an SRSC could be used at this point since the platform 1102 is merely connecting to an application server 1002 and transmitting enough information to authenticate the platform and no secured data is yet being accessed. As illustrated in FIG. 10A, a polling signal 1006 may be transmitted from a data server 902 to each application server 1002 within the system.

In an optional embodiment, a first segment of authentication takes place in accessing the application server. In an optional embodiment, this first segment includes authenticating a password, code, personal identification number ("PIN"), or other unique identifier. It is contemplated that actual input may be required, or the unique identifier may be stored inside the wrap.

In an optional embodiment, the first segment of authenticating the platform 1102 may lead to, or be accompanied by, a second segment, which may include communicating with the user via the platform 1102 or other device to obtain confirmation that the user has requested access to the application server 1002. For example, in one optional embodiment, the application server 1002 may send, or cause to be sent, an email, short message service ("SMS") text message, or other communication to an account identified by the user. Replying to the message from the identified account may serve as an additional layer of authentication.

In an optional embodiment, the additional layer of authentication may serve to provide access to the application server 1002 but also to unlock the interface. For example, in an optional embodiment, passing authentication may allow the application server to provide a key (such as a code or part of a code) necessary for the sister of the executable controller to make an interface accessible to the platform 1102. More concretely, using the examples given above, starting an application or operating system feature using the present invention may launch the connection application which transmits the first part of a code to an application server 1002. It is contemplated that the connection established by the application server 1002 may be a dynamic SRSC insofar as the connection application may alert the application server 1002 to the impending communication and the application server 1002 may open a randomly generated, hidden address for connecting to the platform 1102. Alternatively, the connection established by the application server 1002 may be a hidden port, but not an SRSC as that term is used in this description, insofar as the port address is not randomly generated, but selected from a list of at least one hidden address. While the selection of a hidden address from a list could be done in a random fashion, the list would be, in such an optional embodiment, predefined.

In this optional embodiment, authentication of the first part of the code occurs at the application server 1002 which maintains enough information to authenticate platforms 902 but otherwise includes no data that would be useful, alone, to access the secured data if hacked or stolen. In this example, a unique identifier associated with each executable wrap and data necessary to authenticate the first part of the code and initiate the second part of the authentication, if any, may be stored at the application server 1002.

Upon authentication of the code by the application server 1002, the application server 1002 may send an email to an identified account. Replying to the email from the identified account may cause the application server 1002 to transmit a code (or the second part of the initial code) which allows the interface (referred to above as a menu page) to be accessed from the executable wrap on the platform 1102.

FIG. 10B illustrates an example of the state of a system after authentication has occurred and a connection 1008 has been established between the platform 902 and an application server 1002. At this point, it is contemplated that communication between the platform 1102 and the application server 1002 may be via an SRSC opened by the application server 1002 during or after authentication. That is, after initially connecting to and beginning the authentication process (using either an open port, a hidden port, or an SRSC), the application server 1002 may open an SRSC (e.g., a port with a randomly generated port address which is hidden from the platform 1102) to complete the authentication process and transmit any secured data from the data server 902. For example, any keys to open an interface, regardless of how they are sent, may be sent from an SRSC on the application server 1002. Again, it is noted that FIG. 10B includes a polling signal 1006 transmitted from a data server 902 to an application server 1002.

Turning to FIGS. 10C and 11, once the platform 1102 is authenticated, the application server 1002 may 1146 transmit a reply signal 1010 to the polling signal. The application server 1002 may be authenticated, as discussed above, and the data server 902 may open 1310 an SRSC to connect 1012 to the application server 1002 as shown in FIG. 10D. At this point, the application server 1002 may merely function as a pass-through to transmit commands from the platform 1102 to the data server 902 and transmit secure data to and from the data server 902. As may be appreciated, depending on the use, permitted commands may merely include streaming or downloading commands, such as for a movie or music service, or may include uploading and downloading commands, such as for remote storage, cloud storage, or the like. As noted above, communication between the data server 902 and an application server 1002 (which, in this example, merely passes commands from the platform 902) may be monitored and the SRSC may be closed if anomalies are detected in the commands, the connection becomes idle, or the like. Similarly, the data server 902 may dynamically close and open SRSCs as access occurs, thereby providing a moving target for any possible malicious attacks.

In a particular use of the system, the data may take the form of communication data. That is, in one optional embodiment, rather than accessing data at the data server 902, the platform 1102 may use the application server 1002 and data server 902 to pass communication data, such as email, instant messages, SMS messages, voice over internet protocol ("VOIP"), voice over publicly switched telephone network ("PSTN"), voice over cellular network, or other communication data. In one such optional embodiment, the application server 1002 functions to authenticate the platform 1102, open a connection with the data server 902, and acts as a pass-through or go-between for communication passing between the data server 902 and platform 1102. In an optional embodiment, the application server 1002 does not store any of the communications. In a further optional embodiment described in greater detail below, firewalls on the connection between the platform 1102 and data server 902, the connection between the application server 1002 and data server, or both connections, may scrub both the application server port address and SRSC address, as well as any residual or transitory stored data, from the application server 1002.

Figure 13:
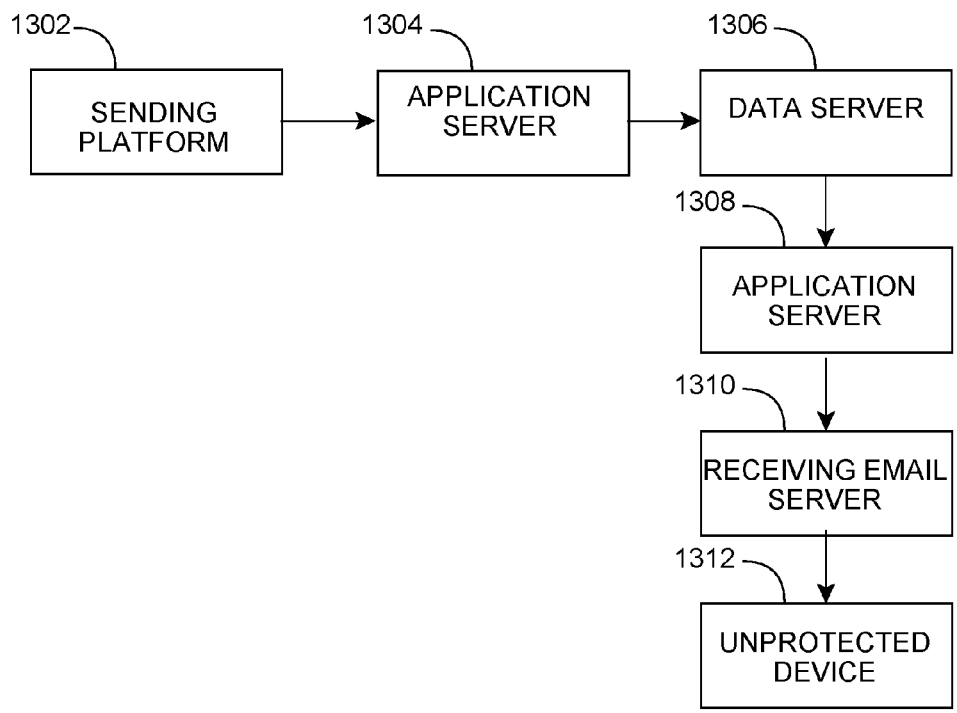
FIG. 13 is a block diagram of a system according to an embodiment of the present invention.
Figure 14:
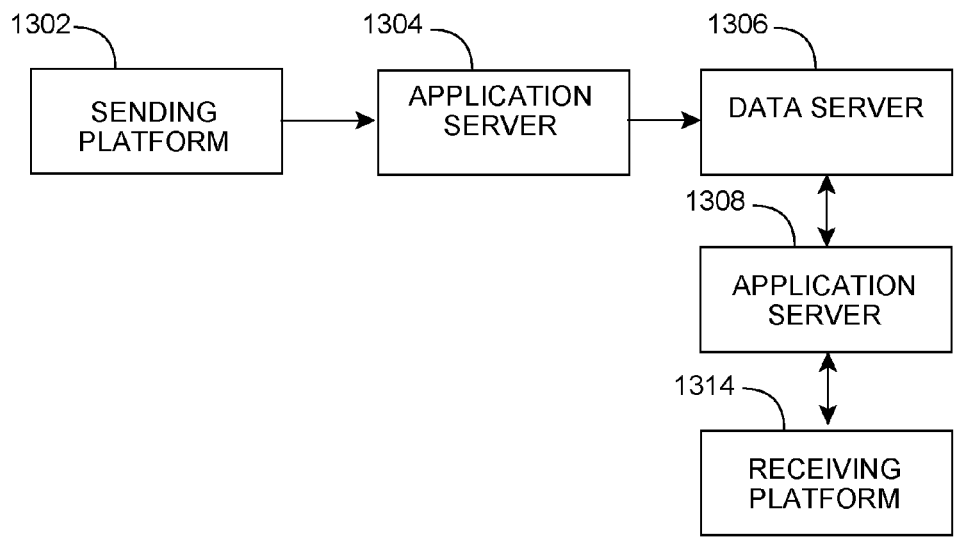
FIG. 14 is a block diagram of a system according to an embodiment of the present invention.

Thus, in one such example illustrated in FIGS. 13 and 14, communications may be sent from a sending platform 1302, through an application server 1304, to a data server 1306. The data server 1306 then reverses the process, by sending the communication to the recipient through the same or different application server 1308. In this manner, the recipient can be assured that the source of the communication is a platform 1302 with access to the data server 1306. In one optional embodiment, the application server 1308 may merely transmit the communication to the recipient's unprotected device or communication server. For example, in the optional embodiment illustrated in FIG. 13, an application server 1308 may send a communication to the recipient's email server 1310 that the recipient may access from an unprotected device 1312. In an alternate optional embodiment illustrated in FIG. 14, the application server 1308 may send a communication directly to a protected platform 1314. As may be appreciated, the communications described herein are not limited to discrete packets of data (such as internet or browsing data, email, SMS messages, instant messages, VOIP, or the like), but could include streams of analog or digital data (such as voice over PSTN or voice over cellular network). Thus, the present method could be used for communications that are held until accessed (such as email) or are more-or-less continuous (such as video calling, voice calling, or the like).

Figure 23:
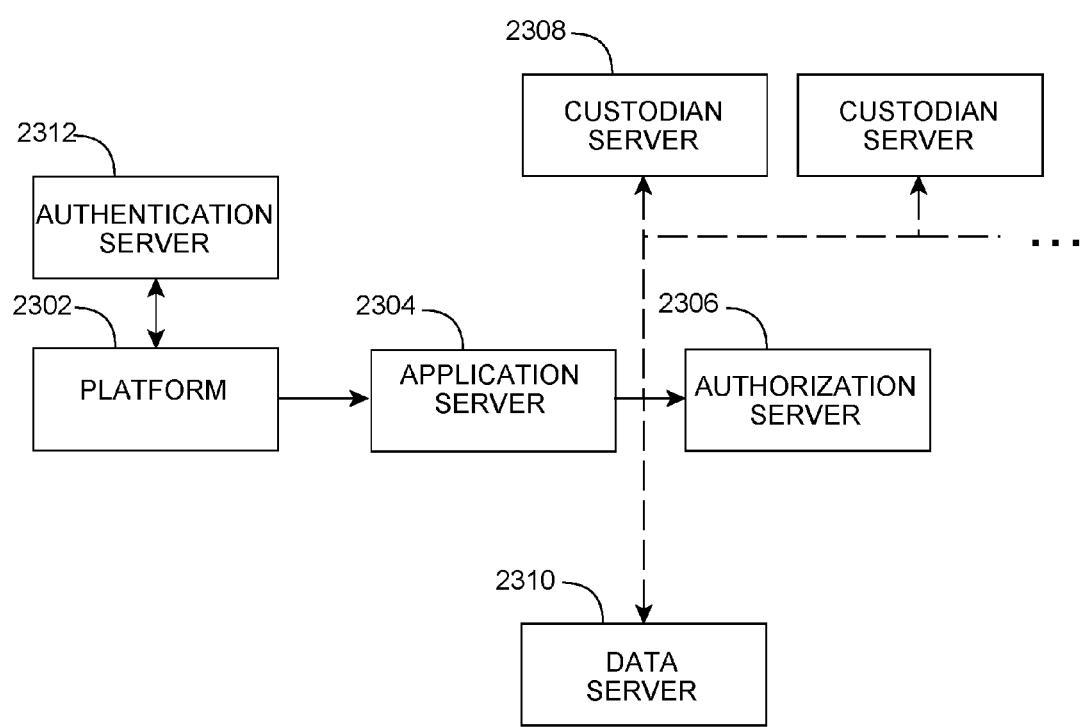
FIG. 23 is a block diagram of a system according to an embodiment of the present invention.
Figure 24:
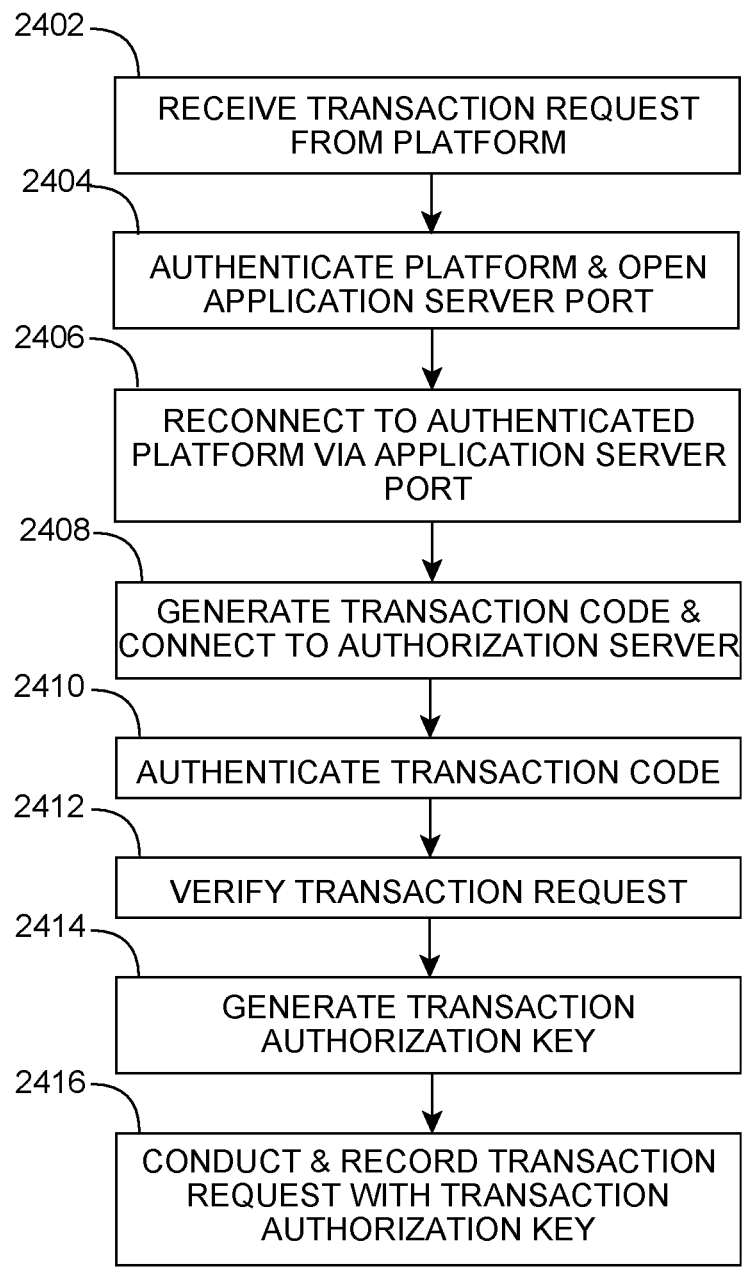
FIG. 24 is a flow chart of a process according to an embodiment of the present invention.

In another application of the present system, illustrated in FIGS. 23 and 24, embodiments of the present invention may be used to conduct financial transactions or other monetary transactions (such as wagering, purchasing, transferring funds, etc.). In one such optional embodiment, a platform 2302 connects to an application server 2304. While the platform 2302 may connect to the application server 2304 through a connection wrap as discussed above, it is contemplated that any connection protocol or procedure may be used. For example, in one optional embodiment, the platform 2302 may execute a software application which may connect the platform 2302 to the application server 2304. In another optional embodiment, the platform 2302 may connect to the application server 2304 through a web browser or other communication interface. In yet another optional embodiment, the platform 2302 may connect to the application server 2304 through a connection wrap (in a manner described above). Specifically, in an optional embodiment, a connection wrap may be stored on the platform 2302 which authenticates the platform 2302 at an authentication server 2312 and, upon authentication, connects the platform 2302 to the application server 2304.

In one optional embodiment, the application server 2304 receives 2402 a transaction request from a platform 2302. The transaction request may include a connection request or be associated with a connection request in some manner. In response to the transaction request, the application server 2304 may authenticate the platform 2302. The authentication of the platform 2302 may take any form, including verifying a unique identifier assigned to the platform 2302 upon installing a wrap on the platform 2302. It is contemplated, however, that the platform 2302 may likewise be authenticated in any other manner described herein.

After authenticating 2404 the platform 2302, the application server 2304 may open an application server port identified by an application server port address. As discussed above, the port through which the application server 2304 receives the transaction request may be a "public" port while the application server port opened by the application server 2304 after authentication may be a "secret" port insofar as the application server port address is provided to the platform 2302 only after the platform is authenticated. The application server 2304 and authenticated platform 2302 reconnect 2406 through the application server port identified by the application server port address and the application server 2304 communicates with the authenticated platform 2302 via the application server port.

In an optional embodiment, the application server 2304 generates 2408 a transaction code. The transaction code is transmitted to an authorization server 2306. The authorization server 2306 authenticates 2410 the transaction code. Again, the transaction code may be authenticated in any manner. Upon authenticating the transaction code, the transaction code may be recorded in a database of records. In an optional embodiment, the database of records may be housed at the authorization server 2306, a custodian server 2308 (described in greater detail below), and/or a data server 2310. In recording the transaction code, the authentication server 2308 may only open the current record and leave past records locked such that the past records cannot be altered, erased, or otherwise manipulated.

After the transaction code is authenticated, the application server 2304 may be connected to one or more custodian servers 2308. In one optional embodiment, the custodian servers 2308 are separated from the application server 2304 by the authorization server 2306 such that the custodian servers 2308 connect to the application server 2304 through the authorization server 2306. In another optional embodiment, the application server 2304 may connect directly to the custodian servers 2308.

In an optional embodiment, multiple custodian servers 2308 are provided in the system, with custodian servers 2308 distributed in different geographic areas. In an optional embodiment, one custodian server 2308 (referred to as a master custodian server) connects to the application server 2304. In an optional embodiment, any of the custodian servers 2308 can serve as a master custodian server on any transaction, with the first custodian server 2308 to connect to the application server 2304 acting as the master for that particular transaction.

The custodian servers 2308 receive the transaction request. In one optional embodiment, the transaction request is received from the application server 2304. In another optional embodiment, the transaction request is received from the authorization server 2306. In an optional embodiment, a transaction request includes a transaction. As discussed above, the transaction and transaction request could embody any type of data, including a connection request, communication request, download or upload request, access request (to data or the like), or any other type of request. In one optional embodiment, the transaction request includes a financial transaction to be conducted in an account stored and secured at the data server 2310.

The custodian servers 2308 verify 2412 the transaction request. In an optional embodiment, verification of the transaction request includes verifying the transaction. For example, if the transaction includes the transfer of funds from one account to another, verifying the transaction request may include verification that the funds available in an account stored at the data server 2310 are sufficient to satisfy the funds transfer. Thus, in one such optional embodiment, the custodian servers 2308 may have access to the data server 2310. In an optional embodiment, the connection between the custodian servers and the data server is a SRSC as described in greater detail above. Thus, in one optional embodiment, the data server 2310 issues a polling signal. In response to a reply from one or more custodian servers 2308, the data server 2310 may open a secure random socket connection ("SRSC") with a randomly selected secure random socket connection address that is hidden from the custodian servers 2308 until provided to the custodian servers 2308 (or, in an optional embodiment, the master custodian server for that particular transaction) by the data server 2310. The custodian servers 2308 connect to the data server 2310 at the port identified by the SRSC address provided by the data server 2310 and communicate with the data server 2310 via the SRSC. As discussed in greater detail below, the communication with the data server 2310 may include accessing data stored at the data server 2310 by the custodian servers 2308, recording data at the data server 2310 by the custodian servers 2308, and the like. In an alternate optional embodiment, the custodian servers 2308 connect to the data server 2310 on a predetermined event at a predetermined port address. For example, in an optional embodiment, the custodian servers 2308 may store a predetermined port address for the data server 2310 and connect to the data server upon a predetermined event, such as the receipt of a transaction request, verification of a transaction request, or the like.

The custodian servers 2308 generate 2414 a transaction authorization key after verifying the transaction request. In an optional embodiment, the transaction authorization key includes multiple parts, with different custodian servers 2308 each generating a part of the transaction authorization key. In this manner, multiple custodian servers must each verify the transaction request and generate part of the transaction authorization key for a valid transaction authorization key to be generated. For example, in one optional embodiment, a transaction authorization key includes five parts, with each part coming from a different custodian server 2308. Thus, in such an example, five different custodian servers 2308 must verify the transaction request and generate one of the five parts of the transaction authorization key for a valid five-part transaction authorization key to be generated.

In an optional embodiment, the custodian servers 2308 record the transaction authorization key. In one such optional embodiment, the custodian servers 2308 receive the transaction code and transaction request and record the transaction authorization key along with the transaction code and transaction request. In one optional embodiment, the transaction code and transaction request are received from the application server 2304 which, in turn, received the transaction code from the authorization server 2306. In another optional embodiment, the custodian servers 2308 receive the transaction code from the authorization server 2306. Optionally, the transaction authorization key, transaction code, and transaction request are recorded at the data server 2310. In one such optional embodiment, the database of records in which the transaction authorization key, transaction code, and transaction request are stored is organized chronologically with only the current record unlocked. In such an optional embodiment, all past records are locked to prevent alteration, erasure, modification, or other tampering with the records. In a further optional embodiment, each record includes a reference to chronologically adjacent records (whether before, after, or both before and after) to thereby create a "chain" of records. In this manner, alteration of one record would be detectable insofar as the altered record would not match up with the adjacent records in the chain.

In one optional embodiment, the transaction contained within the transaction request is conducted 2416 at the data server 2310. For example, if the transaction is a money transfer, data representing a withdrawal may be written to the transferring account and data representing a deposit may be written to the receiving account, both of which are stored at the data server 2310. In one optional embodiment, the transaction is conducted in response to the transaction authorization key. In one optional embodiment, the transaction authorization key is received at the data server 2310 from the custodian servers 2308. In an other optional embodiment, the custodian servers 2308 communicate the transaction authorization key to the application server 2304, either directly or via the authorization server 2306. The application server 2304 then communicates with the data server via a SRSC. Specifically, in one optional embodiment, the data server 2310 issues a polling signal. In response to a reply from the application server 2304, the data server 2310 may open a secure random socket connection ("SRSC") with a randomly selected secure random socket connection address that is hidden from the application server 2304 until provided to the application server 2304 by the data server 2310. The application server 2304 connects to the data server 2310 at the port identified by the SRSC address provided by the data server 2310 and communicates with the data server 2310 via the SRSC.

The connection between the application server 2304 and the data server 2310 may be used to communicate the transaction request and, thereby, conduct the transaction. That is, in an optional embodiment, the application server 2304 may conduct the transaction by accessing data stored and secured at the data server 2310 or transmitting the transaction request to the data server 2310 which conducts the transaction by accessing data stored and secured at the data server 2310.

In an alternate optional embodiment, illustrated in FIGS. 25-29, a system may include a platform 2502 (also referred to in the figures as client device platforms) communicating with an application server 2504 (also referred to in the figures as an account application server or E Teller server, depending on the use). In an optional embodiment, the platform 2502 includes a software application that contains a secure vault (as described above) that secures data, custom libraries for executable actions, and a software application for transaction record (e.g., electronic receipt) storage. In an optional embodiment, the platform 2502 communicates to an authentication server 2506 to open libraries and install keys to open the encrypted vault(s), wrap(s), or the like.

For example, in one optional embodiment, the platform 2502 communicates with an authentication server 2506. The platform 2502 includes a platform processor and a data storage readable by the platform processor. In an optional embodiment, the data storage stores a vault which secures data and at least one executable wrap which secures an executable controller and secures an executable sensor.

In an optional embodiment, the wrap includes instructions executable by the platform processor to (a) contact a remote server separate from the platform to prompt the remote server to transmit an executable authentication driver to the platform, (b) install the authentication driver into the memory and authenticate the platform using the authentication driver, and (c) only when the platform is authenticated using the authentication driver, install the executable sensor to the memory. In an optional embodiment, the authentication driver in the memory cooperates with the executable controller in the data storage to automatically and continuously permit or deny access by the platform processor to the secure data. In one such optional embodiment, the authentication driver and executable controller are configured to only permit the platform processor to access the secure data protected by the vault when both the authentication driver in the memory and the executable controller in the data storage are accessible and to otherwise deny access. In such an optional embodiment, the platform processor can execute only the authentication driver and is prevented by the at least one wrap from executing the executable controller directly.

The executable sensor is operative to monitor at least one of the platform and the data storage for anomalies and, upon detecting an anomaly, deny access to the secure data secured by the vault. In an optional embodiment, access is denied by the executable sensor deleting the authentication driver from the memory upon detecting an anomaly thereby rendering the secure data inaccessible to the platform processor.

The system also includes at least one, and optionally a plurality of, custodian servers 2512, an authorization server 2510, a data server 2514 (also referred to in the figures as a central data server system), and an application server 2504 (also referred to as an interface server service, e-teller server, or account application server, depending on the use). In an optional embodiment, the authorization server 2510 is configured to verify components of the system and transaction requests. For example, in one such optional embodiment, the authorization server 2510 stores identification keys, verifies identification keys for various components of the system in response to a transaction request, and compares custodian server transactions to verify consistency across the custodian servers. For example, in an optional embodiment, keys are required for all server startups and validated by a software-based identification manager to obtain valid keys for specific communications. In an optional embodiment, the custodian servers 2512, data server 2514, and application server 2504 communicate via a continuously connected secure random socket connection as described above in greater detail.

The data server 2514 optionally serves as a shared data storage for all data files. For example, in an optional embodiment, accounts and account histories are stored in a data server data storage. In an optional embodiment, accounts are referred to as lock accounts because they are locked except for transactions associated with a transaction authorization key. Similarly, in an optional embodiment, account histories may be referred to as lockchain account histories because the account histories are made up of a series of transaction records which are serially locked in chronological order, thereby forming a chain of records, all of which are locked except for a current record associated with a current transaction. In a further optional embodiment, the data server data storage further stores a transaction registry for all accounts.

Figure 25:
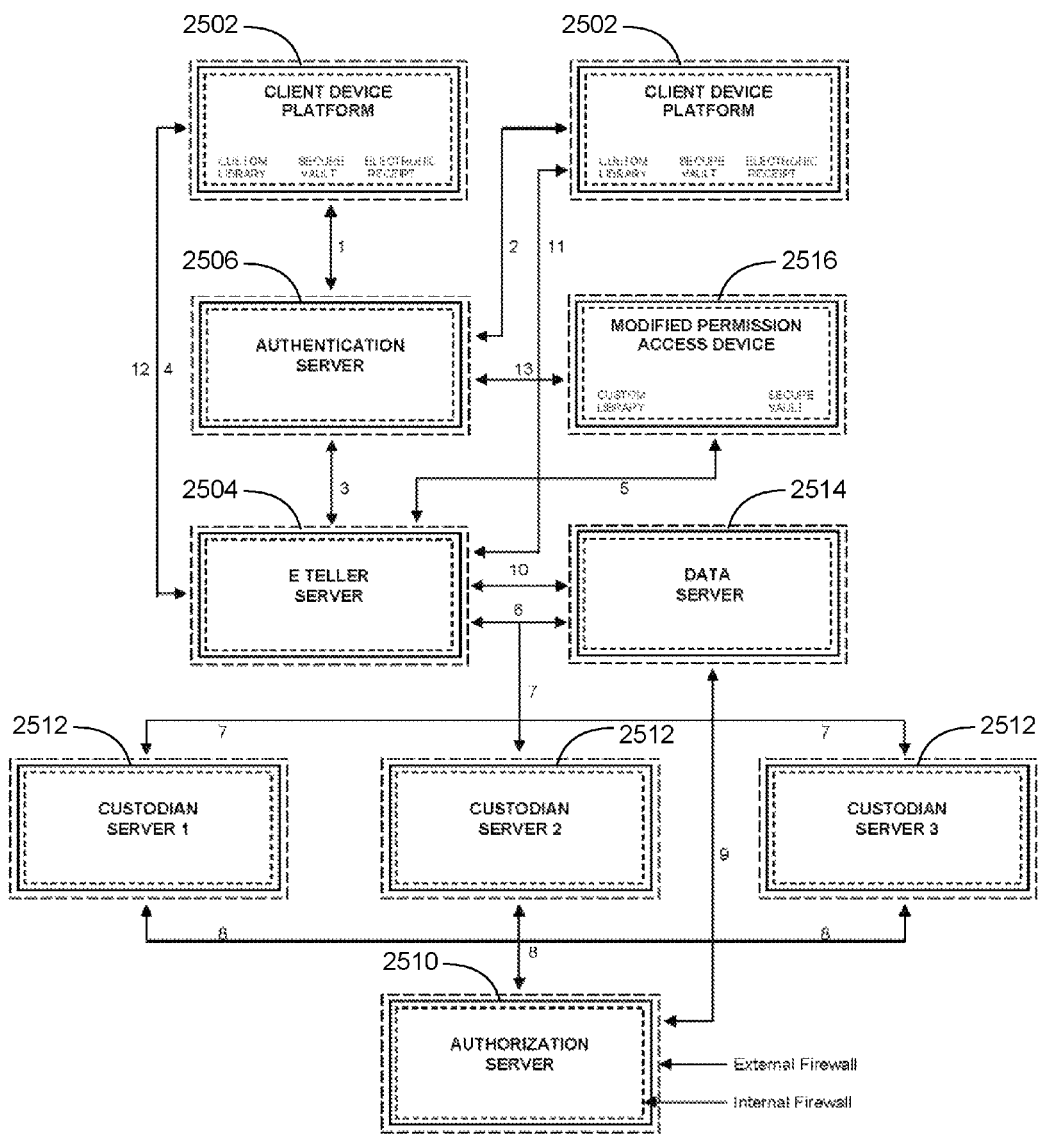
FIG. 25 is a block diagram of a system according to an embodiment of the present invention.
Figure 28:
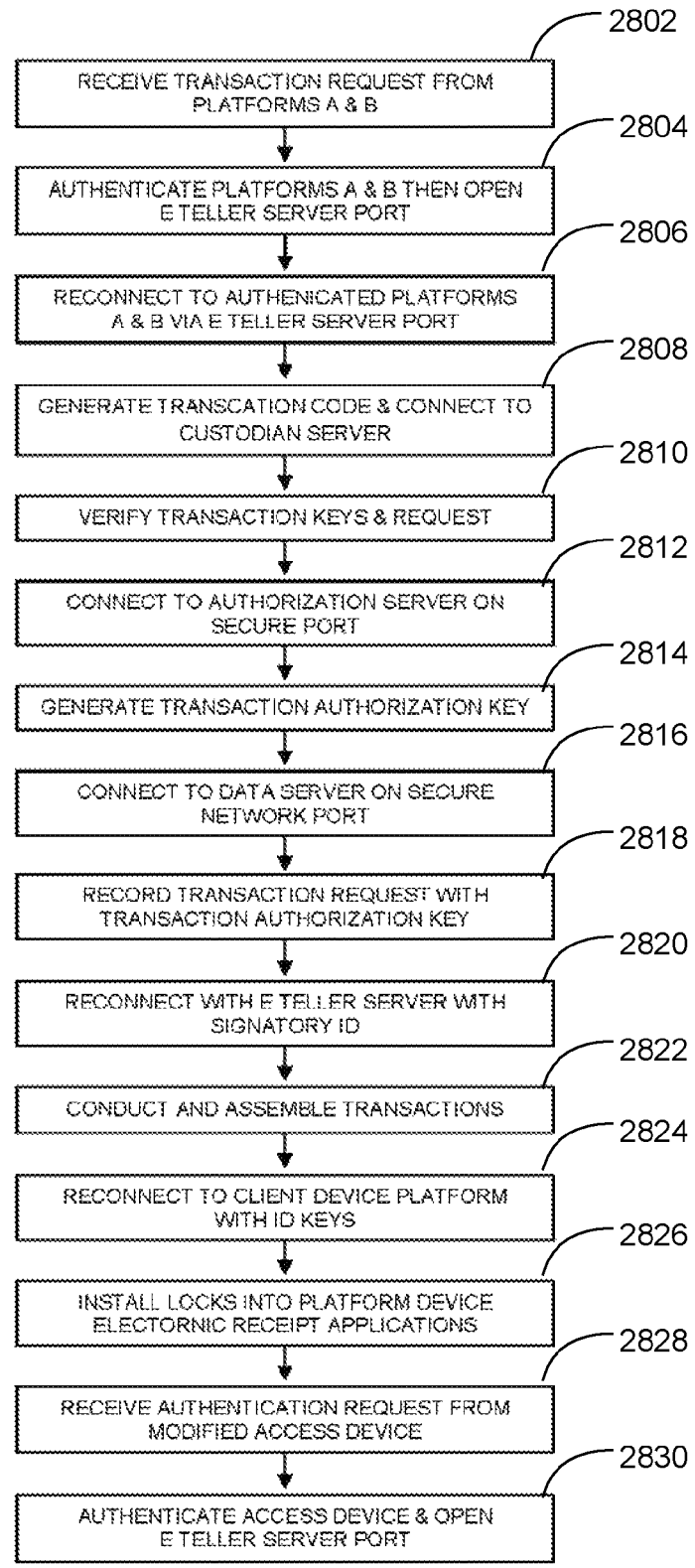
FIG. 28 is a flow chart of a process according to an embodiment of the present invention.

As illustrated in FIGS. 25 and 28, in use, the platform(s) 2502 associated with a transaction generate a transaction request and contacts 2802 the authentication server 2506 with a transaction request. The authentication server 2506 authenticates the platform 2502 and, optionally, assists in accessing the secure data in the vault. In one such optional embodiment, the secure data in the vault provides information necessary to connect to the application server 2504. In one such optional embodiment, the authenticated platform 2502 contacts 2804 the application server 2504 (in this example, referred to as an E-Teller interface service server) to open a new secure random socket connection port for the platform 2502 through which a new transaction may be conducted. Once the new secure random socket connection port is opened, the authenticated platform(s) 2502 reconnect 2806 to the application server 2504 through the secure random socket connection port.

The application server 2504 receives a transaction request from the platform 2502. The application server 2504 initiates the process of generating a transaction authorization key as well as distributing the pertinent information for the transaction (e.g., a fund transfer between parties or the like).

The transaction request is transferred to at least one (or, optionally, multiple) custodian servers 2512. In one optional embodiment, the transaction request is associated with a transaction code generated 2808 by the application server 2504 and transmitted to the custodian servers 2512. In an optional embodiment, the custodian servers 2512 and application server 2504 form a mesh network. As used herein, a mesh network, or multiple logical graph data mesh, is an organization of data, which has dynamic properties, and a consistent shared state. In a mesh network, the multiple peers of the mesh network, e.g., the application server 2504 and custodian server(s) 2512, all share consistent view of data. In such an optional embodiment, the transaction request from the application server 2504 is shared, via the mesh network, with the custodian server(s) 2512 in a parallel stream for verification.

As described above, in one optional embodiment, the data server 2514, custodian server(s) 2512, and authorization server 2510 share the same mesh network, while the application server 2504 and custodian server(s) 2512 share a different mesh network. In an optional embodiment, the connections among and between the data server 2514, custodian server(s) 2512, and authorization server 2510 are secure random socket connections that are continuously connected. In an optional embodiment, the platform 2502 does not connect to either mesh network. In an optional embodiment, the data transferred through the system (e.g., keys, transaction requests, and the like) are encrypted. In one such optional embodiment, a software-based identification manager is stored on, and executed by, the devices within the mesh network (e.g., the application server, custodian server(s) 2512, and/or the data server 2514). The identification manager serves to generate server identification keys for the devices within the mesh network (e.g., an application server identification key, a custodian server identification key, and so forth), as well as randomly assign and manage port addresses for the secure random socket connections that connect the devices of the mesh network. Because the identification manager is executed by the devices within the mesh network, any device could execute the identification manager and assign identification keys. In an optional embodiment, the first device to start up within the mesh network initializes the identification manager. Thus, in an example in which the data server starts up first within the mesh network, the identification manager is initialized on the data server 2514 and identification keys are initially generated by the data server 2514 executing the identification manager.

In an optional embodiment, the custodian server(s) 2512 receive a single transaction request even when the transaction requested relates to multiple different accounts and originates from multiple different platform devices 2502. For example, a transaction request to transfer funds from a first account to a second account (e.g., accounts associated with platform A and platform B) may be contained in a single transaction request (with a single transaction identification). In an optional embodiment, each custodian server 2512 has one or more of the previous account histories available through the mesh network to verify 2810 the transaction request (by, for example, determining that the transferring account is valid and contains available funds and is directed to a valid and correct recipient account, and so forth). When the transaction request is verified, a transaction authorization key is generated 2814. In an optional embodiment, a different transaction authorization key is generated for each account and its corresponding account history. In an optional embodiment containing multiple custodian servers 2512, multiple custodian servers 2512 generate a portion of the transaction authorization key in parallel. In an optional embodiment, transaction authorization keys (or portions of transaction authorization keys) are randomly generated by identification managers within the system and passed to an authorization server independently along with the server signatory keys to verify the transaction authorization keys (or portions thereof). In an optional embodiment, each completed step in the process is date and time stamped as it moves toward final completion. As each custodian server finishes its work for each side of the transaction the transaction request moves to the second mesh network to the authorization server 2510 for final validity check against the application server identification keys and custodian server identification keys, status of time stamps, and generated transaction authorization keys. In an optional embodiment, the custodian server(s) 2512 may connect 2812 to the authorization server 2510 in the course of, or after, verifying the transaction request.

Figure 26:
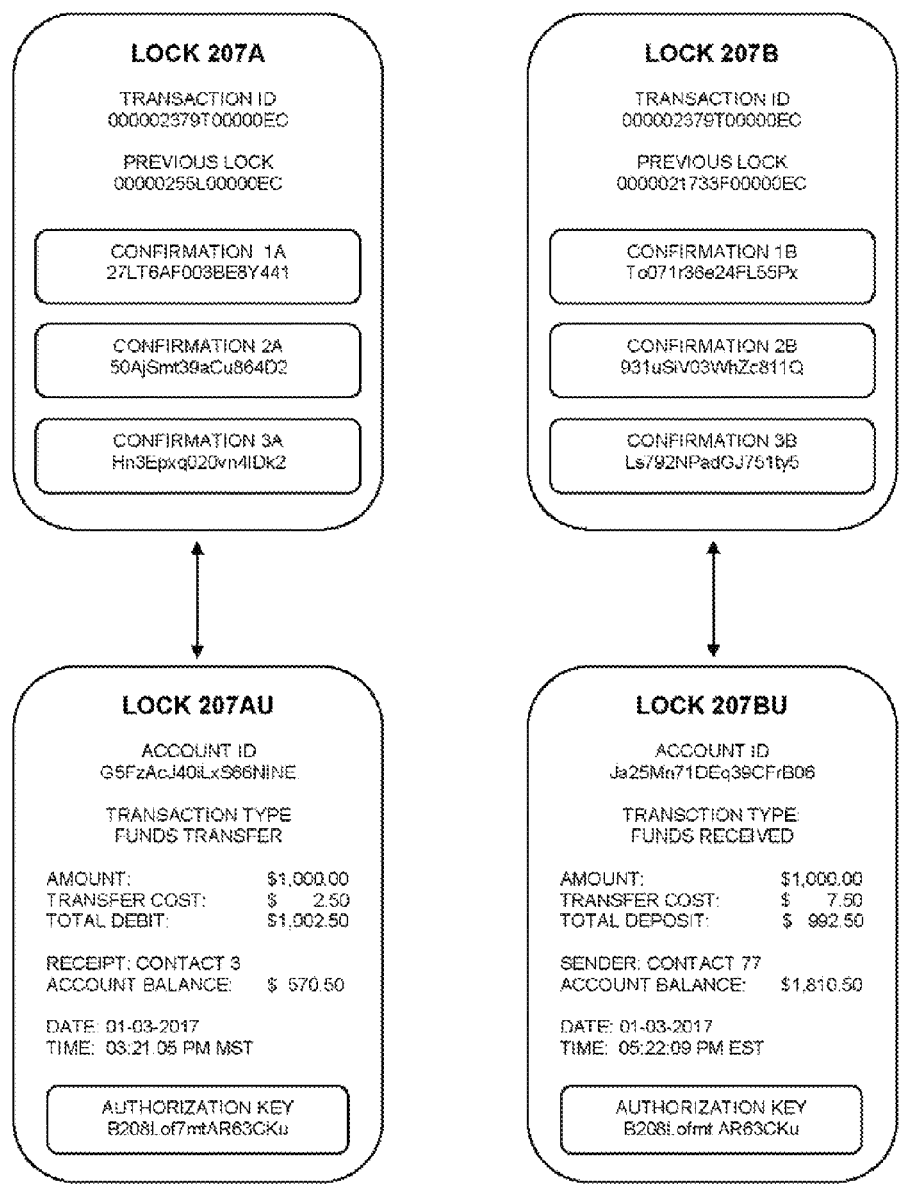
FIG. 26 is a block diagram of account histories according to an embodiment of the present invention.

In an optional embodiment, an identical transaction authorization key is assigned each side of the transaction with date and time stamp and forwarded in the mesh network to the data server 2514 for storage in an account history for each account (as illustrated in FIG. 26) as well as the custodian server(s) 2512 for recording in a transaction history for both accounts. In one optional embodiment, the custodian server(s) 2512 may connect 2816 to the data server 2514 each time a transaction is requested. Alternatively, the custodian server(s) 2512 may have an always-on secure random socket connection to the data server 2514. In one such optional embodiment, the identification manager may randomly assign the ports for the connection between the custodian server (s) 2512 and data server 2514.

Figure 27:
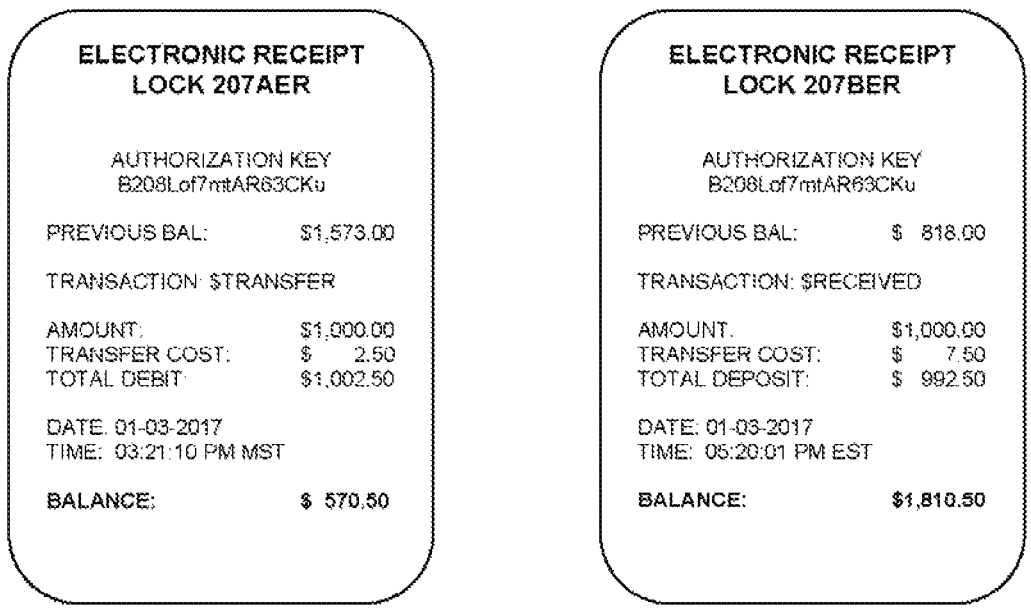
FIG. 27 is a block diagram of electronic receipts according to an embodiment of the present invention.

In an optional embodiment, the data server 2514 conducts and assembles 2822 the transaction and stores 2818 a record of the transaction in both the account histories corresponding to each of the various accounts associated with a transaction and an overall transaction registry for proof of ownership and funds history. The data server 2514 forwards one or more confirmations of the transaction request authorization back to application server 2504 in the mesh network. Again, the data server 2514 may reconnect 2820 to the application server 2504 for each transaction request or may have an always-on connection to the application server 2504 via ports randomly assigned by the identification manager. In an optional embodiment, each platform 2502 associated with a transaction (e.g., a transferring platform and a receiving platform) receives 2824 confirmation of the transaction request authorization, which has been date and time stamped and moved out of the mesh network to each platform 2502 via a secure random socket connection. As illustrated in FIG. 27, such confirmations may take the form of, or may be used to generate, electronic receipts of the transaction for each platform 2502 and account associated with the transaction. In an optional embodiment, the transaction record is locked 2826 in sequential order, such that past transactions are not alterable. In an optional embodiment, the transaction ends with the recording of the hand shake records and receiving time stamps at the data server 2514 via the application server 2504 and breaking the connections with each platform 2502.

Figure 29:
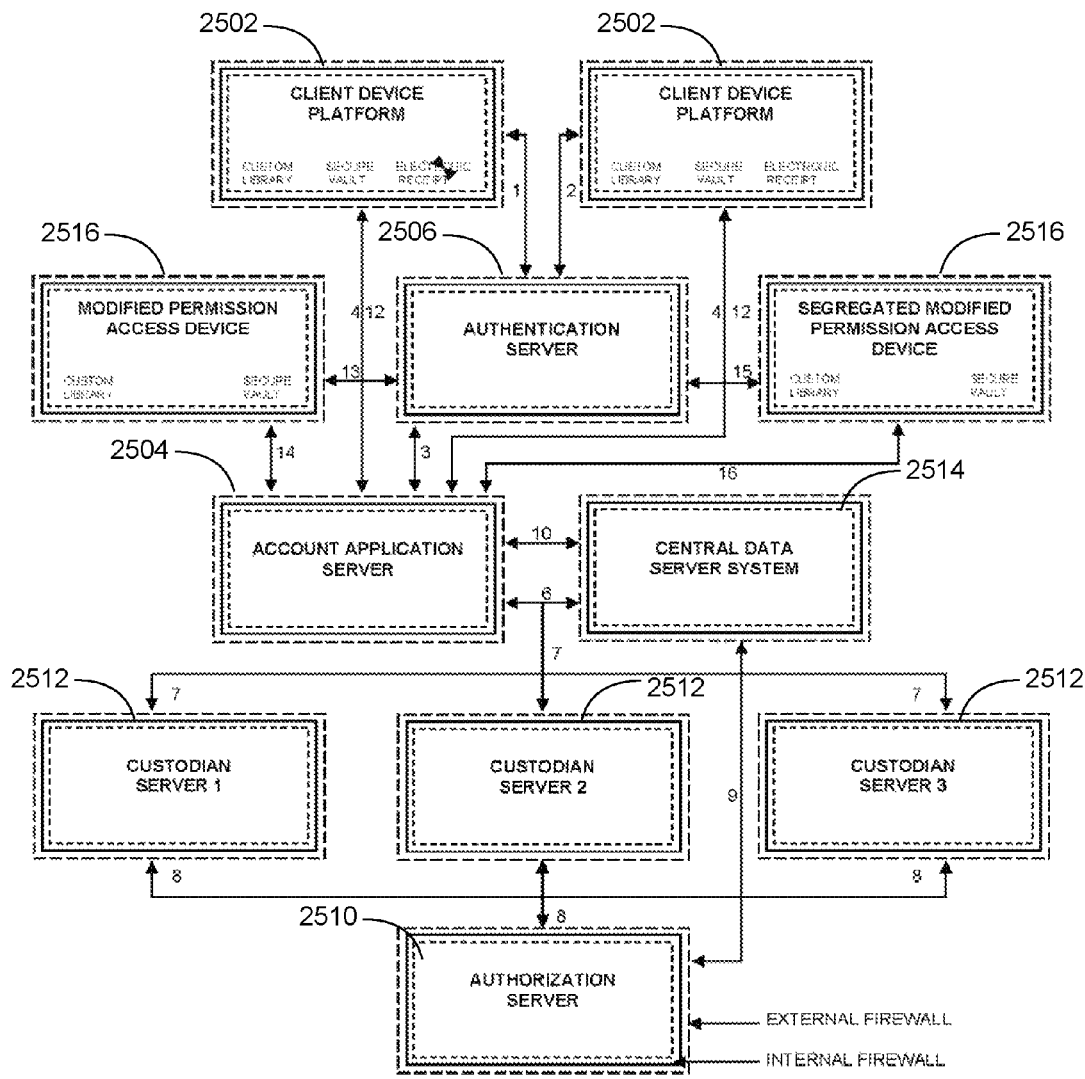
FIG. 29 is a block diagram of a system according to an embodiment of the present invention.

In an optional embodiment illustrated in both FIG. 25 and FIG. 29, a platform may also take the form of a modified permission access device 2516 which is authorized to have a specific interaction with the application server 2504. An example of a modified access permission device 2516

(which is illustrated in the figures as both a segregated modified permission access device and a non-segregated modified permission access device) may be an embedded computing device, i.e., a non-computing device with an embedded data processor, or a specific-use device. As used in this description, a segregated modified permission access device is a modified permission access device that is isolated from other modified permission access devices insofar as it is not permitted to view transactions initiated or conducted by other modified permission access devices. Conversely, a non-segregated modified permission access device is permitted to view transactions initiated or conducted by other modified permission access devices, as defined in a permissions file (described in greater detail below). A modified permission access device 2516 has a secure application with custom libraries and predetermined connection vault. In an optional embodiment, a modified permission access device 2516 goes through the same authentication process as platforms 2502. That is, an authentication request is received 2828 from the modified permission access device 2516, the modified permission access device 2516 is authenticated and connected 2830 to the application server 2504, and so forth. In an optional embodiment, the software application executed by a modified permission access device 2516 is limited to work on only one device and interaction with server network is recorded both on the modified permission access device 2516 and a data server 2514 in vault-protected files that require administrative keys to view or move.

Figure 30:
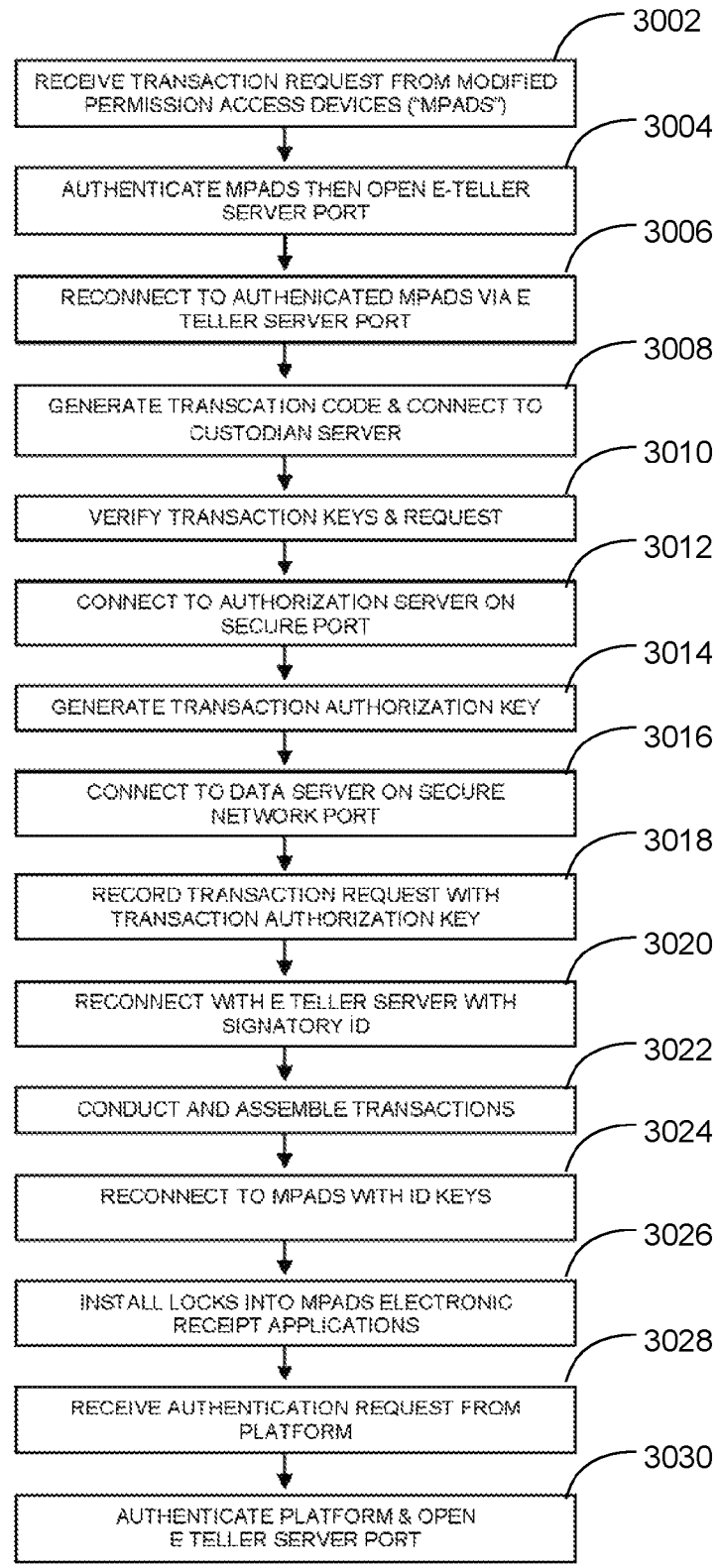
FIG. 30 is a flow chart of a process according to an embodiment of the present invention.

More specifically, in the example of FIGS. 29 and 30, a modified permission access device 2516 could take the form of either a computer or mobile terminal that has a secure executable application installed into its operating system that is unique to that modified permission access device 2516. Inside this application is a vault. In an optional embodiment, the vault is expandable in size, i.e., additional space can be allocated to the vault within the data storage. The vault stores in non-volatile storage certain identification characteristics and specific data associated with the modified permission access device 2516 and purpose of the application. Also included is at least one executable wrap, optionally protected and encrypted as described elsewhere in this application. The executable wrap encompasses an executable controller for operating self-contained custom operating libraries to communicate to an outside authentication server 2506 and with the modified permission access device's 2516 operating system at different operating levels. For example, in an optional embodiment, the custom operating libraries contain an instruction in the form of an executable function that directs the modified permission access device 2516 to contact a remote authentication server 2516 for initiating authentication of the modified permission access device 2516 when a transaction is requested 3002. In an optional embodiment, authentication 3004 of the modified permission access device 2516 comprises authenticating the application and vault on the modified permission access device 2516. In this embodiment, this process requires opening the application on the modified permission access device 2516 and entering a password, PIN, biometric data, or the like. The authentication server 2506 will validate the information entered on this prompt and download an authentication driver into the modified permission access device 2516 to open the vault on the modified permission access device 2516 and trigger the modified permission access device 2516 to run an executable controller. The authentication server 2506 will direct the modified permission access device 2516 to connect 3006 to another secure port belonging to an application server 2504. In an optional embodiment, the modified permission access device 2516 is allowed to connect to the application server 2504 only after certain security steps are taken between the authentication server 2506 and application server 2504 and the modified permission access device 2516. In an optional embodiment, only an encrypted sister copy of portions of permissioned executable controller will open on one of the modified permission access device's drives to communicate to application server 2504. Upon closing of the secure connection between modified permission access device and application server 2504, the sister copy of the executable controller will be deleted or made inoperable and will require a new authentication driver to open the vault and start the executable controller.

In an optional embodiment, the data secured by the vault on a modified permission access device 2516 includes an executable detector. In such an optional embodiment, the executable detector confirms the integrity of at least a portion of the data secured by the vault and, if the integrity cannot be confirmed, renders the executable controller inoperable for the unconfirmed data. That is, in such an optional embodiment, the executable controller is inoperable to utilize any data which has unconfirmed integrity. In one optional embodiment, vault data is confirmed by the executable detector comparing the vault data (or at least a portion thereof) to confirmation data stored at the application server 2504. In one such example, data templates stored in a vault of a modified permission access device 2516 for smart contracts may be compared to data templates for that type of smart contract transaction stored at the application server 2504. In the event that the data templates and/or the data entered into the data templates fails to match the data templates and/or the expected data as defined by the application server 2504, the executable controller is unable to utilize the unconfirmed data template and/or data stored at the modified permission access device 2516 until the data template and/or data can be confirmed.

Different modified permission access devices 2516 may have specific varying read and write capabilities to and from the application server 2504, other modified permission access devices 2516, and/or platforms 2502. For example, in one optional embodiment, the varying read and write capabilities may be defined in a permissions file stored at the modified permission access devices 2516. In one such optional embodiment, the permissions file is stored among the data secured in the vault of a modified permission access device 2516. Optionally, different modified permission access devices 2516 within a system may have different or unique permissions files. Thus, in one such example, some modified permission access devices 2516 will be able to start a transaction with application server 2504, such as currency transfers between accounts associated with two or more platforms 2502, initiate a smart contract between parties based upon a specific use template stored in the modified permission access device's 2516 vault and affix the modified permission access device's 2516 certified electronic signature identification, view accounts and/or account histories as defined by the permissions file (including such limitations as viewing certain data within an account history, but not other data within an account history), or the like. Modified permission access devices 2516 may also have direct contact with platforms 2502. In an optional embodiment, contact with servers, platforms, and modified permission access devices may be conducted through different vaults controlled by the executable controller such that the number of servers, platforms, and modified permission access devices that may be contacted depends on the number of vaults controlled by the executable controller.

After connecting to the application server 2504, the process proceeds substantially as described above, while observing any limitations imposed by the permissions file regarding the types of transactions that may be requested, account histories and/or data that may be viewed, devices and/or servers that may be contacted, and so forth. Thus, in one optional embodiment, the application server 2504 generates 3008 a transaction code for the transaction. In an optional embodiment involving multiple users, accounts, steps, or the like, a single transaction code is used for each transaction by all the platforms 2502 and/or modified permission access devices 2516 involved in the transaction. An authorization server 2510 verifies 3010 the transaction code and, optionally, the transaction request. A transaction authorization key is generated. Optionally, the authorization server 2510 is connected 3012 to a network of one or more custodian servers 2512 and, in response to verification of the transaction request by the custodian server(s) 2512, the custodian server(s) 2512 generate a transaction authorization key. As described above, the transaction authorization key may be a multi-part key with each part generated at a different custodian server 2512.

A secure connection 3016 is established to a data server 2514. The transaction request is recorded 3018 at the data server 2514 and the custodian server(s) 2512, along with the transaction authorization key. The application server 2504 is contacted 3020 by the data server 2514 using its signatory identification to inform the application server 2504 that the transaction has been authorized. The application server 2504, in turn, informs all the platforms 2502 and/or modified permission access devices 2516 involved in the transaction. The transaction is conducted 3022 and the application server 2504 is informed. The application server 2504 connects 3024 to the modified permission access devices 2516 and/or platforms 2502 associated with the transaction and a record is stored 3026 in the electronic receipt applications at the modified permission access devices 2516 and/or platforms 2502. As described above, a transaction may involve both platforms 2502 and modified permission access devices 2516, with the platforms 2502 moving through the process substantially as described above (i.e., platforms 2502 transmit 3028 an authentication request, the authentication server 2506 authenticates 3030 the platform(s) 2502 and directs the platform(s) to connect to the application server 2504, and so forth).

In another such example, a permission file may create a high security modified permission access device 2516 to connect through the application server 2504 to a data server 2514. In one such optional embodiment, a high security modified permission access device 2516 may be permitted to view or move transaction records, account histories, or the like. In an optional embodiment, a record, optionally encrypted, of each entry would be recorded in an account history format in which each completed transaction is locked when completed such that only an incomplete transaction may be altered. In an optional embodiment, the account history is stored in an expanding vault within the data server 2514 that will require a modified permission access device with administration permissions if any change is to be made.

In an optional embodiment, modified permission access devices 2516 form part of a centralized and decentralized system. Specifically, where transaction records are stored in each public node associated with a transaction, the system is referred to as decentralized. Where transaction records are stored in servers outside of the control of users, the system is referred to as centralized. In one optional embodiment of the present invention, a record of at least the most recent transaction (and, optionally, more records of older transactions) is stored at each modified permission access device 2516 and each platform 2502 associated with a transaction. This combination creates a decentralized system. Additionally, a conventional ledger of accounts and account histories is stored in a data server 2514 and/or custodian server(s) 2512. This simultaneously creates a centralized system. In an optional embodiment, each modified permission access devices 2516 may have access to the records stored at that modified permission access device 2516 as well as limited access to the conventional ledger of accounts and account histories stored centrally. Such a system, combined with a vault history stored at each platform 2502 and/or modified permission access device 2516 creates an automated conflict resolution that deters conflicting transactions, such as, two or more attempts to spend the same balance on different transactions and never becomes part of the final confirmed transaction record.

In one example application of the present invention, smart contracts contain secure computer codes that execute a contract between two or more parties. The computer codes are configured to generate instructions for downstream processes when certain reference conditions are met, such as moving collateral or specific payment instructions to individual parties. The modified permission access devices 2516 can control which users can access data of other users through their permissions file. For instance, a bank may have permission to view its client's address and, for example, a funds transfer received by its client, but may not have permission to view the address, account balance, or other private information of the user who sent the funds transfer who is not the bank's client.

Figure 15:
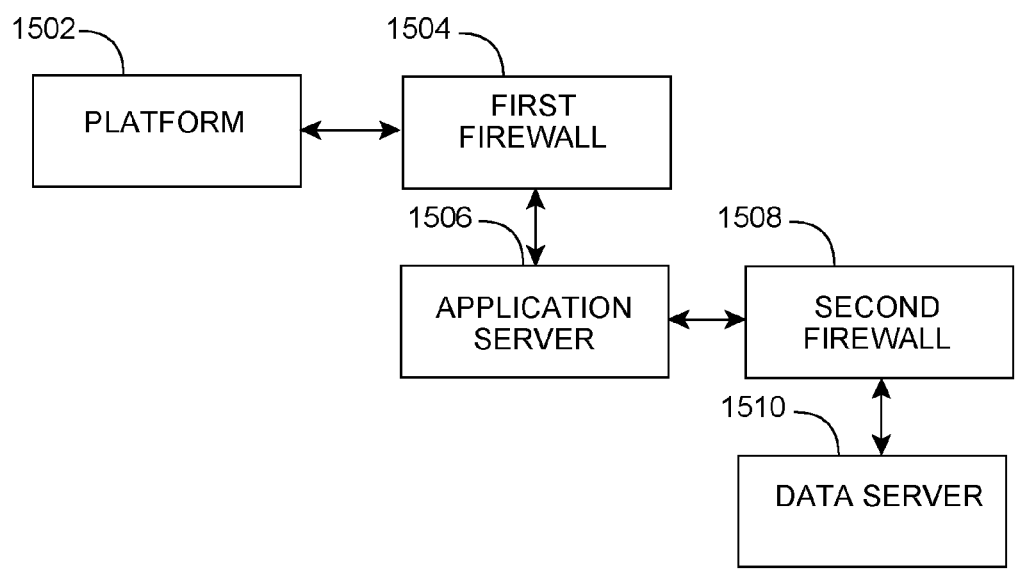
FIG. 15 is a block diagram of a system according to an embodiment of the present invention.
Figure 16:
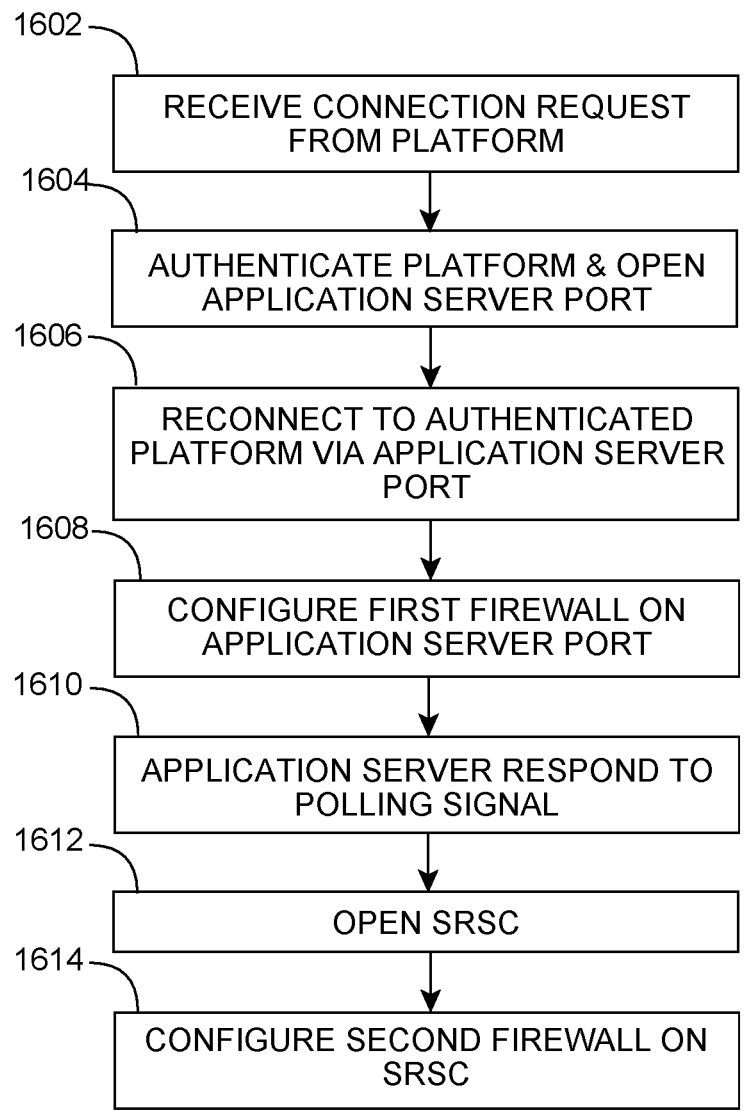
FIG. 16 is a flow chart of a process carried out by a system and device according to an embodiment of the present invention.

In an optional embodiment, any of the systems described herein may incorporate one or more firewalls. For example, in one optional embodiment illustrated in FIG. 15, a first firewall 1504 may be established and configured dynamically between an authenticated platform 1502 and an application server 1506. As described in FIG. 16, in one such optional embodiment, an application server 1506 receives 1602 a connection request from a platform 1502. In an optional embodiment, the connection request may be received at a server address that was stored securely inside a vault, hidden from the user, as described in greater detail above. In response to the connection request, the application server 1506 authenticates the platform and opens 1604 an application server port having an application server port address. In an optional embodiment, the application server port address may be randomly selected. In a further optional embodiment, the application server port address is hidden from the platform 1502. The application server 1506 reconnects 1606 to the authenticated platform 1502 using the application server port at the application server port address. As may be appreciated, the reconnection may be initiated by the application server 1506 or by the authenticated platform 1502 (keeping in mind that if the application server port address is hidden from the authenticated platform 1502, the application server 1506 would initiate the reconnection.

A first firewall 1504 is configured 1608 dynamically on the connection between the authenticated platform 1502 and application server 1506. The first firewall 1504 may be software, firmware, or hardware. If the first firewall 1504 is hardware, the first firewall 1504 may be separate from the application server 1506 and/or the platform 1502 or may be embedded in the application server 1506 or the platform 1502. In one optional embodiment, the first firewall 1504 is software running on the application server 1506. In one such optional embodiment, the application server 1506 configures the first firewall 1504 dynamically for the application server port that is used to reconnect to the authenticated platform 1502. In one such optional embodiment, the first firewall 1504 drops all connection requests to the application server port opened for the authenticated platform 1502, without replying to the connection request. That is, any connection request is merely dropped so that no bandwidth or computing time is used in replying to the connection request. In a further optional embodiment, the first firewall 1504 drops all communication commands directed to the connection port from any device other than the authenticated platform 1502, without replying to the commands. Again, any commands from any source other than the authenticated platform is merely dropped without using bandwidth or computing time to reply to the command. As may be appreciated, a first firewall 1504 configured in such a manner could reduce the impact of denial of service attacks on the application server 1506.

In addition, a first firewall 1504 may conceal the application server port that was opened by the application server 1506 for the authenticated platform 1502. In one such optional embodiment, the first firewall 1504 may merely conceal the application server port by concealing the application server port address. In another optional embodiment, the first firewall 1504 may actively misrepresent the status of the application server port. For example, the first firewall 1504 may indicate that the application server port is closed even though it is, in fact, open to the authenticated platform 1502. These examples are merely intended to be illustrative and not limiting, since it is contemplated that the first firewall 1504 could be configured to conceal the application server port in many other ways.

In an optional embodiment, a second firewall 1508 could be configured between the application server 1506 and the data server 1510. The second firewall 1508 may be dynamically configured on the SRSC opened between the application server 1506 and data server 1510. In one such optional embodiment, the application server 1506 may respond 1610 to a polling signal, the data server 1510 may, in response, open 1612 an SRSC for connection to the application server 1506, and a second firewall 1508 may be dynamically configured 1614 on the SRSC. Again, the second firewall 1508 may be software, firmware, or hardware. In one optional embodiment, the second firewall 1508 is software running on the data server 1510. As above, the second firewall 1508 may be configured to drop without reply all connection requests to the SRSC and drop without reply all commands or communications from any source other than the application server 1506. As with the first firewall 1504, the second firewall 1508 may conceal the port address of the SRSC and/or actively misrepresent the status of the SRSC port as closed even though it is, in fact, open to the application server 1504.

In an optional embodiment, the first firewall 1504 and/or the second firewall 1508 may be configured to be dynamically extinguished when the application server port and/or the SRSC are closed. In one such optional embodiment, when the SRSC is closed, a first firewall 1504 and a second firewall 1508 (in an optional embodiment including such a second firewall 1508) are dynamically extinguished. In an alternate optional embodiment, the first firewall 1504 and/or second firewall 1508 may be reconfigured when an SRSC is closed to allow connection requests from all sources or connection requests from authorized platforms.

In an optional embodiment, a first firewall 1504 and/or a second firewall 1508 may also be commanded to erase any trace data that may exist on the application server 1506 when an SRSC and/or application server port is closed. For example, in an optional embodiment, a first firewall 1504 and/or second firewall 1508 may erase the application server port address, the SRSC address, and/or any other data or communications that may have been stored permanently or temporarily on the application server 1506. In a further optional embodiment, a first firewall 1504, a second firewall 1508, or any other process may be configured to remove the application server port address, SRSC address, or any other trace data from the platform and/or data server after each disconnection. In an optional embodiment, certain types of disconnections may be treated differently than other disconnections. For example, different actions may be undertaken if the SRSC is closed due to software sensors in the application server 1506 and/or data server 1510 cause the disconnection due to unauthorized activity than if the disconnection was merely due to a user-initiated termination. For example, commands from the platform 1502 to the application server 1506 would pass through a first firewall 1504. In an optional embodiment, the first firewall 1504 monitors the commands and closes the application server port if any unauthorized commands are received. In one such optional embodiment, the first firewall 1504 erases the application server port address from the application server 1506, as well as any data in transit (or temporarily cached) from the data server 1510 at the time of the disconnection. Additionally, to the extent that an SRSC address is stored at the application server 1506, the SRSC address may also be erased.

In an optional embodiment, a pre-connection layer of authentication may also be provided. Such a step could occur before the platform attempts to connect to an application server, i.e., could occur before the state illustrated in FIG. 10A. In one such optional embodiment illustrated in FIG. 12, an analysis may be made by a verification server 1202 (which may be an application server 1002 or data server 902, or may be a separate device) of the nature of the communication from the platform 1102. For example, in one optional embodiment, a verification server 1202 may store user profile records and the communication from the platform 1102 may be compared to a user profile record to determine whether to permit the access. The communication from the platform 1102 that is analyzed may simply be the communication between the platform 1102 and the application server 1002 or a specific verification request may be transmitted from the platform 1102 to the verification server 1202. The user profile record may contain any number and type of data points, some of which are static and some of which may be dynamic. For example, a user profile record could contain the most recent connection time and location (e.g., based on ISP address, GPS, cellular tower location, or the like). If an anomaly is detected in the current connection time and location compared to the most recent connection time and location, verification may be denied. Thus, if a user logged in from Miami at 2:00 p.m. and attempted to log in from Seattle twenty-seven minutes later, an anomaly would be detected and verification may be denied. It is noted that the user profile record could include multiple data points and verification granted, if a portion of the data points are satisfied, even if other data points are not satisfied. For example, if a user always checks his or her email between the hours of 7:00 a.m. and midnight, and a connection is requested to check the user's email at 3:00 a.m., this data point may count against the user. However, verification may be granted and the connection may be allowed if other data points are satisfied such as the user's location, browsing habits, ISP address, GPS and/or cell tower location, and so forth. In an optional embodiment, verification may be granted and a connection may be allowed if a defined percentage, such as 80%, of the data points stored in the user profile record are satisfied. Because the verification server 1202 determines whether the platform 1102 is allowed a network connection, the platform 1102 in such an optional embodiment may be termed a server-managed device, at least concerning the network connection of the platform 1102.

Figure 12:
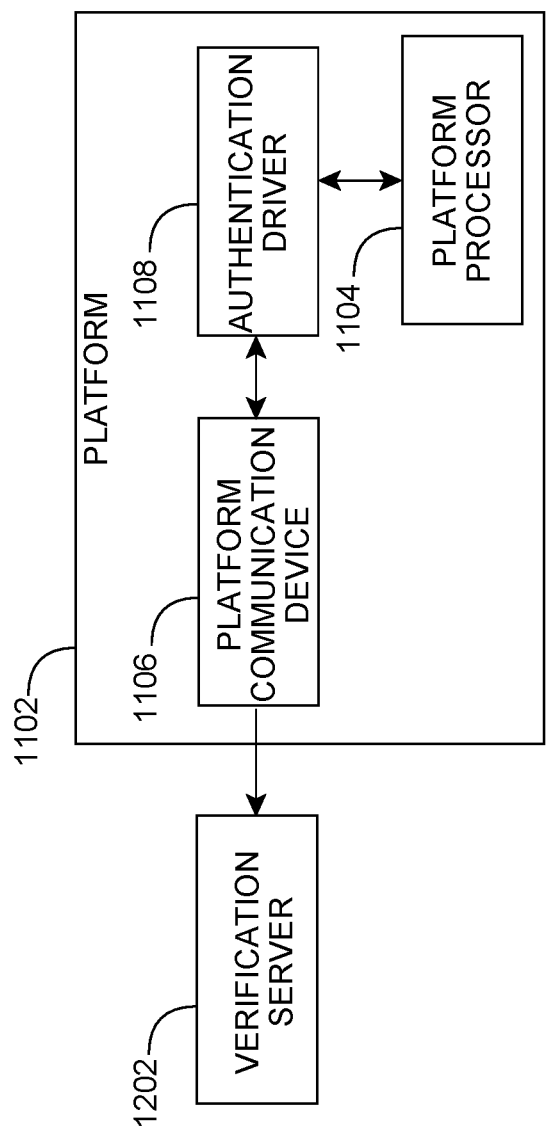
FIG. 12 is a block diagram of a system according to an embodiment of the present invention.

In one example of the present invention illustrated in FIG. 12, a platform 902, such as a cellular telephone or other mobile device, may include software, firmware, or hardware to serve as an authentication driver for the cellular telephone or other mobile device. In such an optional embodiment, the authentication driver 1108 serves as a go-between for the platform processor 1104 and the platform communication device 1106. Again, this could be a hardware device physically interposed between the platform processor 1104 and the platform communication device 1106, or an application or operating system function that regulates communication between the platform processor 1104 and the platform communication device 1106. In one such optional embodiment, a user may initiate a connection. The authentication driver may create a verification request and transmit the verification request to a verification server 1202 using the platform communication device 1102. The verification server 1202 compares the verification request, which could also include the nature and characteristics of how, when, and/or where the verification request was transmitted, to a user profile record. If the verification request is granted, the authentication driver permits the connection to be made using the platform communication device 1102. In the example above, this could lead to a third code or third part of a code, necessary to use the interface to access the data server 902 via the application server 1002. Alternatively, this could just lead to the platform 1102 establishing a connection to any web server, VPN, or other network, depending on the application. That is, it is contemplated that the verification server and authentication driver described herein could be included in the systems, methods, and devices disclosed and claimed, or any other systems, methods, and/or devices.

Figure 22:
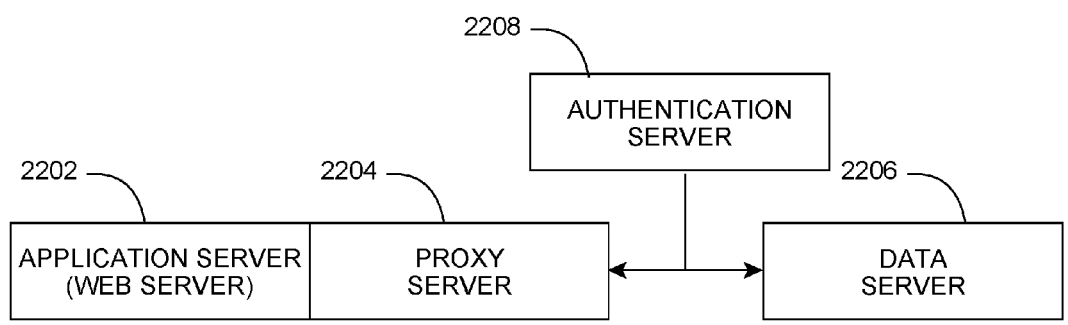
FIG. 22 is a block diagram of a system according to an embodiment of the present invention.

In another example of the present invention, illustrated in FIG. 22, the application server may be a web server 2202. In the optional embodiment of FIG. 22, a proxy server 2204 is interposed between a web server 2202 and a data server 2206.

In one such optional embodiment, an authentication server 2208 authenticates a client device and/or web server 2202 before allowing a connection to the data server 2206. Once authenticated, the proxy server 2204 requests a secure connection from the data server 2206. The data server 2206 provides a connection on a random port (such as the SRSC described above) to allow the authenticated web server 2202 to connect and request data. With the data server connection available, the proxy server 2202 can connect to data (such as databases) through a serious of secure, encrypted connections, hidden completely from the web server 2202.

In an optional embodiment, the web server 2202 is configured to use the proxy server 2204 as its source of data. That is, the web server 2202 queries the proxy server 2204 for data rather than the data server 2206 and does not communicate directly with the data server 2206, thereby keeping the data server 2206 hidden from the web server 2202 and any hackers that may access the web server 2202.

For example, all in one optional embodiment, login information would point to the proxy server 2204 rather than the actual data server 2206 and the data server connection would be handled behind the scenes, invisible to the web server 2202. In another optional embodiment, the proxy server 2204 could be installed on an existing cloud service by placing the proxy server 2204 between the web servers 2202 and data servers 2206.

In another optional embodiment, the present invention may be applied to a secure and private data platform that is both a peer to peer and international social media platform. On the peer to peer side, users may be enabled to send private messaging and data or invite other users to a controlled group format where the creator is the captain of the group. Each invited contact may be provided the option to accept or decline the invitation to participate. Individual users may be able to create as many groups as they wish and then can delete any entire group at any time.

In the open international social media side of the platform there may be group public chats. However, in an optional embodiment, the public chats are still privacy controlled by the fact that these open forums do not have the contact addresses of all users insofar as the only entity that has all user contact addresses is the service provider.

In one such optional embodiment, users must register and download a software application at a web server 2202. A proxy server 2204 sits between the web server 2202 and the data server 2206 that stores all registration data there. The proxy server 2204 (alone or in cooperation with an authentication server 2208) will authenticate the client device and/or the web server 2202 before allowing a connection to the data server 2206. Once authenticated, the proxy server 2204 requests a secure connection from the data server 2206, optionally using an encrypted request. The data server 2206 provides connection on a random port (such as an SRSC as described above) to allow the authenticated site (hosted on the web server 2202) to connect and request data.

With the data server connection available, the proxy server 2204 can now connect to the data server 2206 through a serious of secure, encrypted connections, hidden completely from the web server. As above, the data server connection is handled behind the scenes, invisible to the web server 2202.

In an optional embodiment, the client device runs a client device application, that includes multiple wraps for storing and using data. In an optional embodiment, one of the wraps is an encrypted vault that does not contain a key to unlock itself. In one such optional embodiment, the secure vault storage cannot be accessed by the client device without first being authorized. In the client device application, multiple wraps may be provided. In an optional embodiment, only the authentication server knows the proper keys to correctly access the vault storage areas. In an additional or alternate embodiment, a user-supplied key can be provided with each use of the application to further encrypt any sensitive data. In such an optional embodiment, when this user-supplied key is implemented by the user, only the user can access and decrypt data and no one, including the service provider, cannot access or decrypt the data.

In various optional embodiments, the client device application may store login data on the client device or require login data entered with every use. In an optional embodiment, the login data is encrypted, however, the device has no information on how to decrypt the login information that is stored locally. Rather, the encrypted data is passed to the authentication server, allowing the authentication server to authorize and connect the client device. In an optional embodiment, this login data is unique to a particular client device and any use of this login information on a different client device will fail the authorization process. In an optional embodiment, various sensors may be executed on the client device to minimize screen shots, debugging of software, and other attacks on the client device application. In an optional embodiment, data may be copied and pasted to outgoing messages from files stored in normal fashion on the client device or the Internet but not from incoming messages from a contact. In an optional embodiment, the incoming and outgoing messages or data is deleted from the application after a preset time. In one optional embodiment, the amount of time before deleting messages or data may be set by the sender or sending client device.

In an optional embodiment, an additional secure channel to the communication between the client device and data server. In one optional embodiment, a single channel remains open (after authorization) between the client device and data server, providing real-time data transfers during heavy-use periods. For example, in one optional embodiment, a client device may transmit messages instantly from one user to the other through such an open channel, all while keeping a secure connection from all points of access.

In an optional embodiment, the present system causes the various servers appear as though they are disconnected or invisible to the remote client device(s). As discussed above, in an optional embodiment, the system only opens ports when necessary, and only for authorized users at a specific time. The remaining time, the data server appears invisible and closed, emulating a computer that has been "unplugged."

In an optional embodiment, to send a message, access data, video, or images, or participate in a group chat, a client device is authorized by an authentication server that has no access to any of the login data, but can only authorize access. Without authorization the client device cannot access the data server. In an optional embodiment, data for authorization may be collected at enrollment into the service. For example, authorization data include geolocation and biometric data collected through the client device or elsewhere. After authorization, the client device may connect to an application server (e.g., an application server) that can communicate with the data server and pass on any requested data back to the client device.

When a client device has been authorized, the data server opens a random port or socket to receive the request and then closes the port, as discussed above. For port security, firewall blocking may be implemented in real-time. When a client device is authorized, a firewall may be notified and a port opened for the specific IP address of the client device requesting service. The data server creates a package of the requested data payload to transmit to the client device that is protected with executable malware sensors.

In one optional embodiment, the data server opens a random port and sends this package to the user and then closes the port (unless the data server is operating with an open channel as discussed above). The client device receives the package and, through the application software, executes the data to render the package to the user. When the user interfaces with the package to, for example, request a different communication or data, the package returns. Should the sensors detect a response which indicates the attempted insertion of malware, the package may be destroyed. If the return package is cleared it registers with an SRSC.

As discussed above, the data server, with its closed ports, cannot receive requests for data. Therefore, the data server itself, initiates a secure and authorized connection to the application server (e.g., application server), and asks if the application server needs any data. In a situation in which the application server is authorized and trusted, the data server can respond to any data requests upon authentication of a client device. However, in an optional embodiment, the data server responds to data requests for that single connection only. In an optional embodiment, a messaging service may provide protection against attacks by monitoring for suspicious behavior, such as scanning for ports, abnormal authorization requests, abnormal geolocation information, denial-of-service attacks, excessive communications, as well as other points of interest.

In an optional embodiment, communication between the client device and data server is encrypted. In an optional embodiment, the system may utilize an OpenSSL encryption with a second layer of random encryption to further enhance the security. In one such optional embodiment, each connection may receive a random length encryption key to continue communications, so even if one connection or key is successfully attacked, that key cannot be used on another device or connection.

While certain embodiments of the present invention have been shown and described it is to be understood that the present invention is subject to many modifications and changes without departing from the spirit and scope of the claims presented herein.

We claim:

1. A system comprising:
an authentication server; and
a modified permission access device in communication with said authentication server, said modified permission access device comprising:
a modified permission access device processor physically associated, and in communication, with memory; and
a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data.

2. The system of claim 1 further comprising:
an application server in communication with said modified permission access device having an application server processor operative to execute program instructions to conduct the steps of:
  receiving a transaction request from said modified permission access device, wherein said data secured by said wrap includes instructions for said modified permission access device to transmit said transaction request from said modified permission access device to said application server only if said transaction request is permitted by said permissions file;
  authenticating said modified permission access device;
  generating a transaction code after authenticating said modified permission access device;
  opening an application server port identified by an application server port address;
  reconnecting to said authenticated modified permission access device via said application server port at said application server port address; and
  communicating between said application server and said authenticated modified permission access device via said application server port;
an authorization server in communication with said application server, said authorization server having an authorization server processor operative to execute program instructions to conduct the steps of:
  receiving said transaction code from said application server; and
  authenticating said transaction code received from said application server;
a data server in communication via a connection with said application server, said data server comprising:
  a data server processor;
  a data server communication device controlled by said data server processor and operative for selective communication with said application server; and
  a data server data storage readable by said data server processor, wherein said data server data storage is operative to store, in non-volatile storage, at least one account, an account history for each said account, and program instructions executable by said data server processor to conduct the steps of:
    conducting a transaction for at least one account in response to said transaction request; and
    recording said transaction in said account history for said account.

3. The system of claim 2 wherein said application server stores confirmation data and said step of confirming the integrity of said data secured by said vault comprises comparing at least a portion of said data secured by said vault to said confirmation data stored at said application server.

4. The system of claim 2 further comprising at least one custodian server in communication via a connection with said application server and said data server, said custodian server having a custodian server processor operative to execute program instructions to conduct the steps of:
  receiving said transaction request from said application server after said authorization server has authenticated said transaction code;
  verifying said transaction request;
  generating a transaction authorization key after verifying said transaction request; and
  transmitting said transaction authorization key to said application server authorizing said transaction request after verifying said transaction request.

5. The system of claim 4 comprising a plurality of custodian servers each having a custodian server processor, wherein said step of generating a transaction authorization key comprises generating a transaction authorization key having a plurality of components with at least two of said plurality of custodian servers adding a component to said transaction authorization key after verifying said transaction request.

6. The system of claim 2 wherein said data server data storage further stores a transaction registry for all accounts and said program instructions executable by said data server processor further comprise recording said transaction in said transaction registry.

7. The system of claim 6 wherein said modified permission access device further comprises a display, wherein said permissions file defines the transactions, if any, in said transaction registry accessible by said modified permission access device, and wherein said modified permission access device processor and said application server cooperate to display at said modified permission access device only said transactions permitted by said permissions file.

8. A system comprising:
an authentication server;
a modified permission access device in communication with said authentication server, said modified permission access device comprising:
  a modified permission access device processor physically associated, and in communication, with memory;
  a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data;

an application server in communication with said modified permission access device having an application server processor operative to execute program instructions to conduct the steps of:
  receiving a transaction request from said modified permission access device, wherein said data secured by said wrap includes instructions for said modified permission access device to transmit said transaction request from said modified permission access device to said application server only if said transaction request is permitted by said permissions file;
  authenticating said modified permission access device;
  generating a transaction code after authenticating said modified permission access device;
  opening an application server port identified by an application server port address;
  reconnecting to said authenticated modified permission access device via said application server port at said application server port address; and
  communicating between said application server and said authenticated modified permission access device via said application server port;

an authorization server in communication with said application server, said authorization server having an authorization server processor operative to execute program instructions to conduct the steps of:
  receiving said transaction code from said application server; and
  authenticating said transaction code received from said application server;

a data server in communication via a connection with said application server, said data server comprising:
  a data server processor;
  a data server communication device controlled by said data server processor and operative for selective communication with said application server; and
  a data server data storage readable by said data server processor, wherein said data server data storage is operative to store, in non-volatile storage, at least one account, an account history for each said account, and program instructions executable by said data server processor to conduct the steps of:
    conducting a transaction for at least one account in response to said transaction request; and
    recording said transaction in said account history for said account.

9. The system of claim 8 wherein said application server stores confirmation data and said step of confirming the integrity of said data secured by said vault comprises comparing at least a portion of said data secured by said vault to said confirmation data stored at said application server.

10. The system of claim 8 further comprising at least one custodian server in communication via a connection with said application server and said data server, said custodian server having a custodian server processor operative to execute program instructions to conduct the steps of:
  receiving said transaction request from said application server after said authorization server has authenticated said transaction code;
  verifying said transaction request;
  generating a transaction authorization key after verifying said transaction request; and
  transmitting said transaction authorization key to said application server authorizing said transaction request after verifying said transaction request.

11. The system of claim 10 comprising a plurality of custodian servers each having a custodian server processor, wherein said step of generating a transaction authorization key comprises generating a transaction authorization key having a plurality of components with at least two of said plurality of custodian servers adding a component to said transaction authorization key after verifying said transaction request.

12. The system of claim 8 wherein said data server data storage further stores a transaction registry for all accounts and said program instructions executable by said data server processor further comprise recording said transaction in said transaction registry.

13. The system of claim 12 wherein said modified permission access device further comprises a display, wherein said permissions file defines the transactions, if any, in said transaction registry accessible by said modified permission access device, and wherein said modified permission access device processor and said application server cooperate to display at said modified permission access device only said transactions permitted by said permissions file.

14. A system comprising:
  an authentication server;
  a plurality of modified permission access devices in communication with said authentication server each having a unique modified permission access device identification, each said modified permission access device comprising:
    a modified permission access device processor physically associated, and in communication, with memory;
    a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data;

an application server in communication with said modified permission access devices having an application server processor operative to execute program instructions to conduct the steps of:

receiving a transaction request from at least one of said modified permission access devices, wherein said data secured by said wrap includes instructions for each said modified permission access device to transmit said transaction request from said modified permission access device to said application server only if said transaction request is permitted by said unique permissions file stored at said modified permission access device, wherein said transaction request includes the unique modified permission access device identification for each modified permission access device associated with said transaction request;

authenticating said modified permission access device from which said transaction request was received;

generating a single transaction code after authenticating said modified permission access device from which said transaction request was received such that each modified permission access device associated with said transaction request utilizes the same transaction code;

opening an application server port identified by an application server port address;

reconnecting to said authenticated modified permission access device via said application server port at said application server port address; and communicating between said application server and said authenticated modified permission access device via said application server port;

an authorization server in communication with said application server, said authorization server having an authorization server processor operative to execute program instructions to conduct the steps of:

receiving said transaction code from said application server; and authenticating said transaction code received from said application server;

a data server in communication via a connection with said application server, said data server comprising:

a data server processor;

a data server communication device controlled by said data server processor and operative for selective communication with said application server; and a data server data storage readable by said data server processor, wherein said data server data storage is operative to store, in non-volatile storage, at least one account, an account history for each said account, and program instructions executable by said data server processor to conduct the steps of:

conducting a transaction for at least one account in response to said transaction request; and recording said transaction in said account history for said account.

15. The system of claim 14 wherein said application server stores confirmation data and said step of confirming the integrity of said data secured by said vault comprises comparing at least a portion of said data secured by said vault to said confirmation data stored at said application server.

16. The system of claim 14 further comprising at least one custodian server in communication via a connection with said application server and said data server, said custodian server having a custodian server processor operative to execute program instructions to conduct the steps of:

receiving said transaction request from said application server after said authorization server has authenticated said transaction code;

verifying said transaction request;

generating a transaction authorization key after verifying said transaction request; and transmitting said transaction authorization key to said application server authorizing said transaction request after verifying said transaction request.

17. The system of claim 16 comprising a plurality of custodian servers each having a custodian server processor, wherein said step of generating a transaction authorization key comprises generating a transaction authorization key having a plurality of components with at least two of said plurality of custodian servers adding a component to said transaction authorization key after verifying said transaction request.

18. The system of claim 14 wherein said data server data storage further stores a transaction registry for all accounts and said program instructions executable by said data server processor further comprise recording said transaction in said transaction registry.

19. The system of claim 18 wherein said modified permission access device further comprises a display, wherein said permissions file defines the transactions, if any, in said transaction registry accessible by said modified permission access device, and wherein said modified permission access device processor and said application server cooperate to display at said modified permission access device only said transactions permitted by said permissions file.

20. The system of claim 14 wherein said vault is expandable in size such that additional space within said data storage may be allocated to said vault.

21. A system comprising:
an authentication server;
a modified permission access device in communication with said authentication server, said modified permission access device comprising:
  a modified permission access device processor physically associated, and in communication, with memory; and
  a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data;

an application server in communication with said modified permission access device having an application server processor operative to execute program instructions to conduct the steps of:
  receiving a transaction request from said modified permission access device, wherein said data secured by said wrap includes instructions for said modified permission access device to transmit said transaction request from said modified permission access device to said application server only if said transaction request is permitted by said permissions file;
  authenticating said modified permission access device;
  storing confirmation data, such that said step of confirming the integrity of said data secured by said vault comprises comparing at least a portion of said data secured by said vault to said confirmation data stored at said application server;
  generating a transaction code after authenticating said modified permission access device;
  opening an application server port identified by an application server port address;
  reconnecting to said authenticated modified permission access device via said application server port at said application server port address; and
  communicating between said application server and said authenticated modified permission access device via said application server port;
an authorization server in communication with said application server, said authorization server having an authorization server processor operative to execute program instructions to conduct the steps of:
  receiving said transaction code from said application server; and
  authenticating said transaction code received from said application server; and
a data server in communication via a connection with said application server, said data server comprising:
  a data server processor;
  a data server communication device controlled by said data server processor and operative for selective communication with said application server; and
  a data server data storage readable by said data server processor, wherein said data server data storage is operative to store, in non-volatile storage, at least one account, an account history for each said account, and program instructions executable by said data server processor to conduct the steps of:
    conducting a transaction for at least one account in response to said transaction request; and
    recording said transaction in said account history for said account.

22. A system comprising:
an authentication server; and
a modified permission access device in communication with said authentication server, said modified permission access device comprising:
  a modified permission access device processor physically associated, and in communication, with memory;
  a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data; and a display in communication with said modified permission access device processor;

an application server in communication with said modified permission access device having an application server processor operative to execute program instructions to conduct the steps of:

receiving a transaction request from said modified permission access device, wherein said data secured by said wrap includes instructions for said modified permission access device to transmit said transaction request from said modified permission access device to said application server only if said transaction request is permitted by said permissions file;

authenticating said modified permission access device;

generating a transaction code after authenticating said modified permission access device;

opening an application server port identified by an application server port address;

reconnecting to said authenticated modified permission access device via said application server port at said application server port address; and communicating between said application server and said authenticated modified permission access device via said application server port;

an authorization server in communication with said application server, said authorization server having an authorization server processor operative to execute program instructions to conduct the steps of:

receiving said transaction code from said application server; and authenticating said transaction code received from said application server; and a data server in communication via a connection with said application server, said data server comprising:

a data server processor;

a data server communication device controlled by said data server processor and operative for selective communication with said application server; and a data server data storage readable by said data server processor, wherein said data server data storage is operative to store, in non-volatile storage, at least one account, an account history for each said account, a transaction registry for all accounts, and program instructions executable by said data server processor to conduct the steps of:

conducting a transaction for at least one account in response to said transaction request;

recording said transaction in said account history for said account; and recording said transaction in said transaction registry, wherein said permissions file defines the transactions, if any, in said transaction registry accessible by said modified permission access device, and wherein said modified permission access device processor and said application server cooperate to display at said modified permission access device only said transactions permitted by said permissions file.

23. A system comprising:

an authentication server;

a modified permission access device in communication with said authentication server, said modified permission access device comprising:

a modified permission access device processor physically associated, and in communication, with memory;

a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data;

an application server in communication with said modified permission access device, said application server storing confirmation data and having an application server processor operative to execute program instructions to conduct the steps of:
  receiving a transaction request from said modified permission access device, wherein said data secured by said wrap includes instructions for said modified permission access device to transmit said transaction request from said modified permission access device to said application server only if said transaction request is permitted by said permissions file;
  authenticating said modified permission access device;
  providing access by said modified permission access device to said confirmation data, such that said step of confirming the integrity of said data secured by said vault comprises comparing at least a portion of said data secured by said vault to said confirmation data stored at said application server;
  generating a transaction code after authenticating said modified permission access device;
  opening an application server port identified by an application server port address;
  reconnecting to said authenticated modified permission access device via said application server port at said application server port address; and
  communicating between said application server and said authenticated modified permission access device via said application server port;

an authorization server in communication with said application server, said authorization server having an authorization server processor operative to execute program instructions to conduct the steps of:
  receiving said transaction code from said application server; and
  authenticating said transaction code received from said application server;

a data server in communication via a connection with said application server, said data server comprising:
  a data server processor;
  a data server communication device controlled by said data server processor and operative for selective communication with said application server; and
  a data server data storage readable by said data server processor, wherein said data server data storage is operative to store, in non-volatile storage, at least one account, an account history for each said account, and program instructions executable by said data server processor to conduct the steps of:
    conducting a transaction for at least one account in response to said transaction request; and
    recording said transaction in said account history for said account.

24. A system comprising:
an authentication server;
a modified permission access device in communication with said authentication server, said modified permission access device comprising:
  a modified permission access device processor physically associated, and in communication, with memory;
  a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data; and
  a display in communication with said modified permission access device processor;

an application server in communication with said modified permission access device having an application server processor operative to execute program instructions to conduct the steps of:
    receiving a transaction request from said modified permission access device, wherein said data secured by said wrap includes instructions for said modified permission access device to transmit said transaction request from said modified permission access device to said application server only if said transaction request is permitted by said permissions file;
    authenticating said modified permission access device;
    generating a transaction code after authenticating said modified permission access device;
    opening an application server port identified by an application server port address;
    reconnecting to said authenticated modified permission access device via said application server port at said application server port address; and
    communicating between said application server and said authenticated modified permission access device via said application server port;
an authorization server in communication with said application server, said authorization server having an authorization server processor operative to execute program instructions to conduct the steps of:
    receiving said transaction code from said application server; and
    authenticating said transaction code received from said application server;
a data server in communication via a connection with said application server, said data server comprising:
    a data server processor;
    a data server communication device controlled by said data server processor and operative for selective communication with said application server; and
    a data server data storage readable by said data server processor, wherein said data server data storage is operative to store, in non-volatile storage, at least one account, an account history for each said account, a transaction registry for all accounts, and program instructions executable by said data server processor to conduct the steps of:
        conducting a transaction for at least one account in response to said transaction request;
        recording said transaction in said account history for said account;
        recording said transaction in said transaction registry;
        determining from said permissions file the transactions, if any, in said transaction registry which are accessible by said modified permission access device; and
        cooperating with said modified permission access device processor and said application server to display at said modified permission access device only said transactions permitted by said permissions file.

25. A system comprising:
an authentication server;
a plurality of modified permission access devices in communication with said authentication server each having a unique modified permission access device identification, each said modified permission access device comprising:
    a modified permission access device processor physically associated, and in communication, with memory;
    a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data;
an application server in communication with said modified permission access devices having an application server processor operative to execute program instructions to conduct the steps of:
    receiving a transaction request from at least one of said modified permission access devices, wherein said data secured by said wrap includes instructions for each said modified permission access device to transmit said transaction request from said modified permission access device to said application server only if said transaction request is permitted by said unique permissions file stored at said modified permission access device, wherein said transaction request includes the unique modified permission access device identification for each modified permission access device associated with said transaction request;
authenticating said modified permission access device from which said transaction request was received;
providing access by said modified permission access device from which said transaction request was received to said confirmation data, such that said step of confirming the integrity of said data secured by said vault comprises comparing at least a portion of said data secured by said vault to said confirmation data stored at said application server;
generating a single transaction code after authenticating said modified permission access device from which said transaction request was received such that each modified permission access device associated with said transaction request utilizes the same transaction code;
opening an application server port identified by an application server port address;
reconnecting to said authenticated modified permission access device via said application server port at said application server port address; and
communicating between said application server and said authenticated modified permission access device via said application server port;
an authorization server in communication with said application server, said authorization server having an authorization server processor operative to execute program instructions to conduct the steps of:
receiving said transaction code from said application server; and
authenticating said transaction code received from said application server;
a data server in communication via a connection with said application server, said data server comprising:
a data server processor;
a data server communication device controlled by said data server processor and operative for selective communication with said application server; and
a data server data storage readable by said data server processor, wherein said data server data storage is operative to store, in non-volatile storage, at least one account, an account history for each said account, and program instructions executable by said data server processor to conduct the steps of:
conducting a transaction for at least one account in response to said transaction request; and
recording said transaction in said account history for said account.

26. A system comprising:
an authentication server;
a plurality of modified permission access devices in communication with said authentication server each having a unique modified permission access device identification, each said modified permission access device comprising:
a modified permission access device processor physically associated, and in communication, with memory;
a data storage physically separate from said memory and readable by said modified permission access device processor, wherein said data storage is operative to store, in non-volatile storage, an executable sensor and a vault which secures data, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data; and
a display in communication with said modified permission access device processor;
an application server in communication with said modified permission access devices having an application server processor operative to execute program instructions to conduct the steps of:
receiving a transaction request from at least one of said modified permission access devices, wherein said data secured by said wrap includes instructions for each said modified permission access device to transmit said transaction request from said modified permission access device to said application server only if said transaction request is permitted by said unique permissions file stored at said modified permission access device, wherein said transaction request includes the unique modified permission access device identification for each modified permission access device associated with said transaction request;
authenticating said modified permission access device from which said transaction request was received;
generating a single transaction code after authenticating said modified permission access device from which said transaction request was received such that each modified permission access device associated with said transaction request utilizes the same transaction code;
opening an application server port identified by an application server port address;
reconnecting to said authenticated modified permission access device via said application server port at said application server port address; and
communicating between said application server and said authenticated modified permission access device via said application server port;
an authorization server in communication with said application server, said authorization server having an authorization server processor operative to execute program instructions to conduct the steps of:
receiving said transaction code from said application server; and
authenticating said transaction code received from said application server;
a data server in communication via a connection with said application server, said data server comprising:
a data server processor;
a data server communication device controlled by said data server processor and operative for selective communication with said application server; and
a data server data storage readable by said data server processor, wherein said data server data storage is operative to store, in non-volatile storage, at least one account, an account history for each said account, a transaction registry for all accounts, and program instructions executable by said data server processor to conduct the steps of:
conducting a transaction for at least one account in response to said transaction request; and
recording said transaction in said account history for said account;
recording said transaction in said transaction registry;
determining from said permissions file the transactions, if any, in said transaction registry which are accessible by said modified permission access device; and
cooperating with said modified permission access device processor and said application server to display at said modified permission access device only said transactions permitted by said permissions file.

27. A system comprising:
an authentication server;
a plurality of modified permission access devices in communication with said authentication server each having a unique modified permission access device identification, each said modified permission access device comprising:
a modified permission access device processor physically associated, and in communication, with memory; and
a data storage physically separate from said memory and readable by said modified permission access device processor, wherein said data storage is operative to store, in non-volatile storage, an executable sensor, a vault which secures data wherein said vault is expandable in size such that additional space within said data storage may be allocated to said vault, an executable detector, and at least one executable wrap which secures an executable controller, wherein said data secured by said wrap includes a permissions file defining transaction requests permitted by said modified permission access device and wherein said at least one wrap includes instructions executable by said modified permission access device processor to (a) contact a remote server separate from said modified permission access device to prompt said remote server to transmit an executable authentication driver to said modified permission access device, (b) install said authentication driver into said memory and authenticate said modified permission access device using said authentication driver, and (c) only when said modified permission access device is authenticated using said authentication driver, install said executable sensor to said memory, wherein said authentication driver in said memory cooperates with said executable controller in said data storage to automatically and continuously permit or deny access by said modified permission access device processor to only permit said modified permission access device processor to access said secure data protected by said vault when both said authentication driver in said memory and said executable controller in said data storage are accessible and to otherwise deny access, wherein said modified permission access device processor can execute only said authentication driver and is prevented by said at least one wrap from executing said executable controller directly, and wherein said executable sensor is operative to monitor at least one of said modified permission access device and said data storage for anomalies and, upon detecting an anomaly, deny access to said secure data secured by said vault by said executable sensor deleting said authentication driver from said memory upon detecting an anomaly thereby rendering said secure data inaccessible to said modified permission access device processor, and wherein said executable detector is operative to confirm the integrity of said data secured by said vault and, in the event that the integrity of said data is unconfirmed, rendering said executable controller inoperable for said unconfirmed data;
an application server in communication with said modified permission access devices having an application server processor operative to execute program instructions to conduct the steps of:
receiving a transaction request from at least one of said modified permission access devices, wherein said data secured by said wrap includes instructions for each said modified permission access device to transmit said transaction request from said modified permission access device to said application server only if said transaction request is permitted by said unique permissions file stored at said modified permission access device, wherein said transaction request includes the unique modified permission access device identification for each modified permission access device associated with said transaction request;
authenticating said modified permission access device from which said transaction request was received;
generating a single transaction code after authenticating said modified permission access device from which said transaction request was received such that each modified permission access device associated with said transaction request utilizes the same transaction code;

opening an application server port identified by an application server port address;

reconnecting to said authenticated modified permission access device via said application server port at said application server port address; and communicating between said application server and said authenticated modified permission access device via said application server port;

an authorization server in communication with said application server, said authorization server having an authorization server processor operative to execute program instructions to conduct the steps of:

receiving said transaction code from said application server; and authenticating said transaction code received from said application server;

a data server in communication via a connection with said application server, said data server comprising:

a data server processor;

a data server communication device controlled by said data server processor and operative for selective communication with said application server; and a data server data storage readable by said data server processor, wherein said data server data storage is operative to store, in non-volatile storage, at least one account, an account history for each said account, and program instructions executable by said data server processor to conduct the steps of:

conducting a transaction for at least one account in response to said transaction request; and recording said transaction in said account history for said account.

* * * * *